US012580860B2

(12) United States Patent (10) Patent No.: US 12,580,860 B2
Vaccaro et al. (45) Date of Patent: Mar. 17, 2026

(54) SYSTEMS AND METHODS OF ROUTING DATA TRANSACTION MESSAGES FOR DISTRIBUTED SYSTEMS

(71) Applicant: NASDAQ, INC., New York, NY (US)

(72) Inventors: John Vaccaro, New York, NY (US); Kyle Prem, Croton-on-Hudson, NY (US); Hemant Thombre, Warren, NJ (US)

(73) Assignee: Nasdaq, Inc., New York, NY (US)

( * ) Notice: Subject to any disclaimer, the term of this patent is extended or adjusted under 35 U.S.C. 154(b) by 407 days.

(21) Appl. No.: 18/343,571

(22) Filed: Jun. 28, 2023

(65) Prior Publication Data

US 2025/0007837 A1 Jan. 2, 2025

(51) Int. Cl.
| *H04L 12/66* | (2006.01) |
| *H04L 45/76* | (2022.01) |
| *H04L 67/10* | (2022.01) |

(52) U.S. Cl.
CPC .............. *H04L 45/76* (2022.05); *H04L 67/10* (2013.01)

(58) Field of Classification Search
CPC ......... H04L 45/76; H04L 67/10; G06Q 40/04; G06Q 40/06; G06Q 40/03; G06Q 40/00; G06Q 20/10; G06Q 30/0215; G06F 16/22; G06F 16/284; G06F 16/27; G06F 9/467
See application file for complete search history.

(56) References Cited

U.S. PATENT DOCUMENTS

| 8,605,132 B1 | 12/2013 | Swanson et al. | |
| 9,712,606 B2 | 7/2017 | Färnlöf et al. | |
| 10,467,250 B2 | 11/2019 | Baird et al. | |
| 11,503,108 B1 | 11/2022 | Prem et al. | |
| 2016/0373588 A1* | 12/2016 | Raleigh ............... | H04L 12/1407 |
| 2018/0349999 A1* | 12/2018 | Brandon ............... | G06F 40/205 |
| 2020/0394710 A1* | 12/2020 | Konduru ............... | G06Q 40/04 |
| 2023/0036293 A1* | 2/2023 | Prem ...................... | G06F 9/466 |

OTHER PUBLICATIONS

Notice of Allowance for related U.S. Appl. No. 18/343,533, eight pages, dated Nov. 1, 2023.
Office Action issued in U.S. Appl. No. 18/343,552, 14 Pages, Sep. 24, 2024.
RASHport^SM Version 1.1, Nasdaq North American Markets, Nasdaq. com, pp. 1-21, Jul. 29, 2021.

* cited by examiner

*Primary Examiner* — Kharye Pope

(74) *Attorney, Agent, or Firm* — Nixon & Vanderhye, PC

(57) ABSTRACT

A distributed computing system is provided that communicates with a routing computer system. A routing module that is internal to the distributed computing system controls how and when data transaction requests are sent to the routing computer system for routing to destination systems.

20 Claims, 19 Drawing Sheets

SYSTEMS AND METHODS OF ROUTING DATA TRANSACTION MESSAGES FOR DISTRIBUTED SYSTEMS

CROSS REFERENCE(S) TO RELATED APPLICATION(S)

This application is one of five related applications, all filed on even date herewith; this application incorporates the entire contents of each of the other four related applications. The related applications are: U.S. patent application Ser. No. 18/343,533; U.S. patent application Ser. No. 18/343,552; U.S. patent application Ser. No. 18/343,571; U.S. patent application Ser. No. 18/343,603; U.S. patent application Ser. No. 18/343,615. This application also incorporates by reference the entire contents of U.S. Pat. No. 11,503,108.

TECHNICAL OVERVIEW

The technology described herein relates to distributed computing systems and routing data transaction requests.

INTRODUCTION

In the area of computer technology, distributed computing is an important area of interest. Distributed computing techniques allow computers to answer or process data that would otherwise be too large (or take too long) to process. Distributed computing can also be helpful in real time-data processing applications by allowing large amounts of data to be processed in a time-efficient manner. For example, systems that involve or relate to traffic information, weather information, electronic market data, operating systems, or internet commerce, as well as other real-time data processes, may be time-bound in some manner.

An area of interest within computer technology and distributed computing is how messages can be routed between different systems in an efficient, valid, or otherwise appropriate manner. The technical complexity of such routing can be further increased when such systems are operating under real-time processing constraints and/or when decisions are made based on continuous data streams of data. Accordingly, it will be appreciated that new and improved techniques, systems, and processes are continually sought after—particularly in the area of computing technology, distributed computing, and/or how messages or other forms of data are routed to/from different computing systems.

SUMMARY

A distributed computer system is provided that communicates with a routing system. Data transaction requests received by the distributed computer system may be routed, by using the routing system, to other computer systems for processing thereon. Notifications back to client computer system that relate to how processing has been performed by the other computer systems is accomplished out via messages communicated to the routing subsystem, back to the distributed computing system that originally received the request, and then the client system.

In some examples, processing for a given data transaction request may occur sequentially—first on the distributed computer system and then to other computer systems or, alternatively, first on other computer system and then the distributed computer system.

In some examples, data stored in a matching engine and/or in connection with a sequencer (which may be part of the matching engine) is used to control how the distributed computer system should handle a request or message that is associated with a data transaction request that has been routed to a destination system.

This Summary is provided to introduce a selection of concepts that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

BRIEF DESCRIPTION OF THE DRAWINGS

These and other features and advantages will be better and more completely understood by referring to the following detailed description of example non-limiting illustrative embodiments in conjunction with the drawings of which:

FIG. 6 shows no match being determined on the first distributed system; FIG. 7 shows a full match being determined on the first distributed system; and FIG. 8 shows a partial match being determined on the first distributed system;

DETAILED DESCRIPTION

In the following description, for purposes of explanation and non-limitation, specific details are set forth, such as particular nodes, functional entities, techniques, protocols, etc., to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Figure 1A:
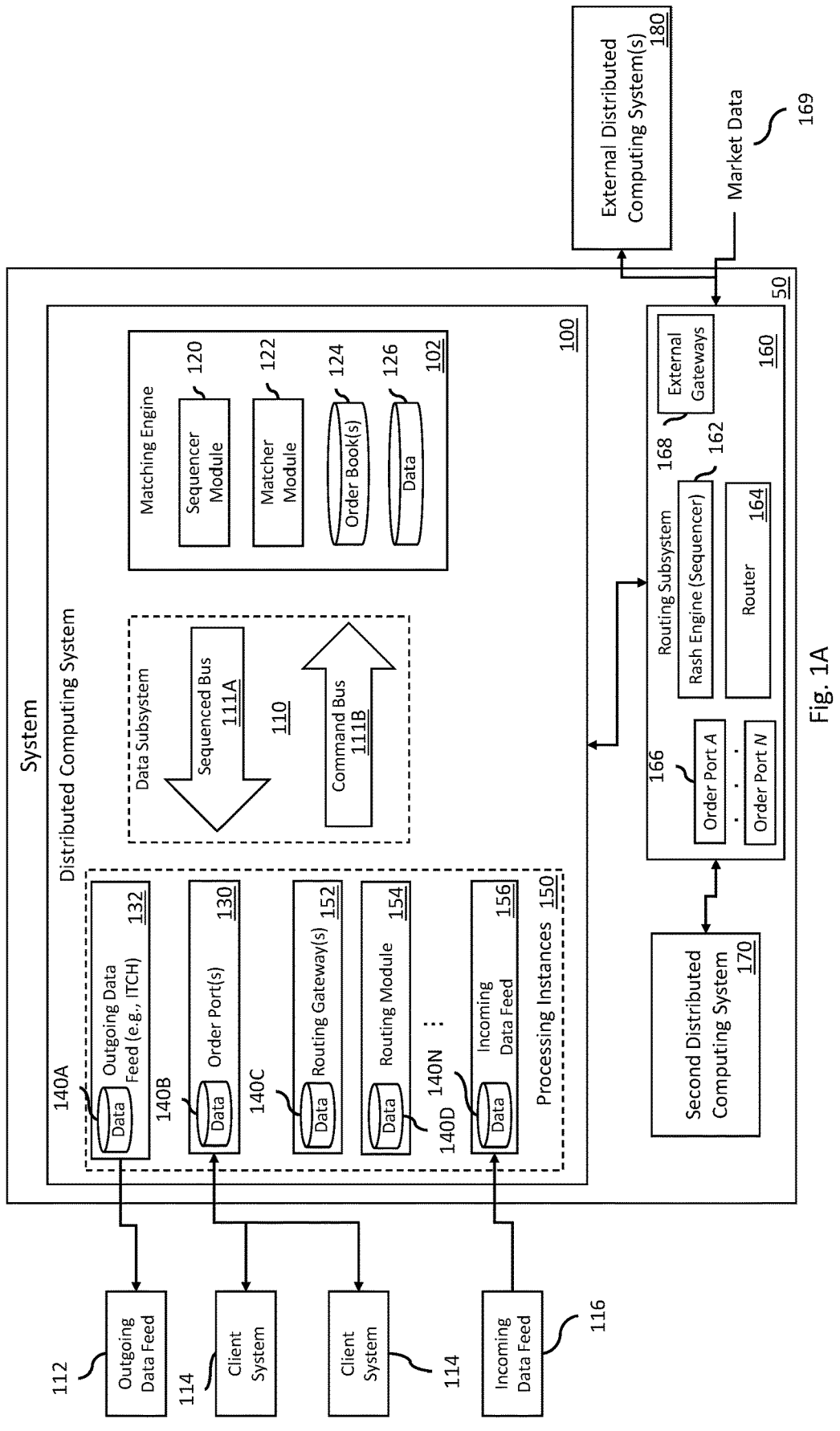
FIG. 1A shows a system that includes multiple distributed computing systems and a routing system that routes requests to such computing systems according to some embodiments.

Sections are used in this Detailed Description solely to orient the reader as to the general subject matter of each section; as will be seen below, the description of many features spans multiple sections, and headings should not be read as affecting the meaning of the description included in any section. Some reference numbers are reused across multiple Figures to refer to the same element; for example, as will be discussed below, the distributed computing system 100 first shown in FIG. 1A is also referenced and described in connection FIG. 1B, and FIGS. 2A-12B.

Overview

Some embodiments described herein relate to distributed computing systems and techniques for implementing distributed processing on such systems. Some embodiments herein also relate to techniques for the routing of data transaction requests to or between such systems. More specifically, this specification describes techniques for routing data transaction requests to destination distributed computing systems by using a routing subsystem to handle the routing decision while also allowing the distributed computing system that initially received the data transaction request to, potentially, handle or process that data transaction request.

Routing is an important aspect of distributed processing as it allows for differently distributed components (including different systems) to appropriately receive data messages related to the processing that will be performed by that component. Broadly speaking, the term routing may refer to activities such as determining that a data message should be transmitted to a particular destination, determining a communications path to use for the transmission of a data message to a particular destination, and/or the transmission of a data message to a particular destination. Routing may be based on the processing logic of a routing system, the properties of the data message (e.g., the attributes of the data message), the state of one or more of the multiple possible destination systems (e.g., where the message is to be routed), or combinations thereof. As an example, a data message may include a property that indicates a specific component or system that is to process the data message. As another example, a routing determination may be based on processing load that is associated with the components or systems to which the data message may be routed.

The techniques for routing that are discussed herein are applicable in different contexts and include, for example, layer-2 routing (e.g., switching or routing for physical addresses), layer-3 routing (e.g., routing for logical addressing), (e.g., of the 7-layer Open Systems Interconnection (OSI) Model), and other routing applications of that may be found at the higher end of the OSI model. The routing techniques discussed herein may also be applicable to "order routing" as used in the context of electronic trading platforms (such as those electronic trading platforms used to operate exchanges such as the Nasdaq Stock Market, and the like). Because there are multiple possible electronic trading platforms that may be able to handle a given order, the determination of which electronic trading platform is to handle the order can be important for the efficient execution of that order. Accordingly, the routing techniques discussed herein can be applied in the context of order routing to improve upon (e.g., over prior techniques) how such orders are routed.

In some instances, the routing decision that is performed by a routing subsystem may be a dynamic process that operates in real-time (or near real-time) based on one or more received data feeds. The data feeds may relate to data from the potential destination systems, any systems that are sending the to-be-routed data message, external third-party data sources, or other systems. In some instances, such data feeds can include thousands, millions, or more messages within a given hour or day that are used to continually update the data that is used to make a routing decision for each given data message. In other words, the routing decision that is made by a routing system for a given message depends on a state (e.g., the cumulative state) of the data that has been received via the data feeds at a given point in time. Thus, the same message may be routed to different destinations depending on when the routing system makes its routing determination (as the state of the data that is used to make the routing determination is different). It will be appreciated that the computational complexity required to make a routing decision quickly (e.g., in real-time—such as less than a minute, less than a second, or even faster) for a particular data message at a given point in time may be substantial. This may be especially true in circumstances where thousands, millions, or more messages are being routed per day based on millions or billions of data messages that are used by the routing system to make a given routing decision.

The routing decisions and functionality discussed herein may be for routing data messages (and/or data transaction requests) between different distributed computing systems. Example distributed computing systems include telecommunication networks, payment processing systems, industrial control systems, parallel scientific computation systems, distributed databases, blockchain-based smart contracts systems, electronic trading platforms, and others. Such distributed computing systems may be configured to process messages that are received. The received messages may include data for specifying operations (e.g., requests) that are to be performed by the receiving distributed computing system in connection with that message. In some instances, such data messages (or the details of the requests or operations to be performed) may be routed to other distributed systems for processing thereon. As an example, a parallel scientific computation system may receive a data message that specifies some operations to be performed in parallel. This message may be received and then passed (or details of that operation) to a routing system to determine which, of multiple possible destination systems, the message (or operation) should be routed to. In some instances, the original receiver of the message may process the message while also forwarding a copy or the like to the routing system for processing. As another example, a distributed database system may receive a data transaction request that specifies a data operation (e.g., the addition, update, or removal of some data) that should be performed. In some instances, that data transaction request may be passed to a routing system that may determine to which distributed database system, of multiple possible distributed database systems, to which the data transaction request should be routed to for processing.

Processing performed within a given distributed computing system is often handled by different nodes, components, or processing instances within the respective system. In some examples, these instances may be configured to (e.g., programmed to) control the distribution of such messages or data transaction requests among various possible destination systems and/or the computing resources within each distributed computing system.

It will be appreciated that while the techniques for routing messages herein include routing between multiple different distributed computing systems, that that the various systems to which messages can be routed may also include non-distributed computing systems (e.g., single device computer systems or monolithic computer systems). It will be appreciated that, unless otherwise specified, the techniques discussed herein in connection with distributed computing systems may be applied to computing systems that include both distributed and non-distributed computing systems.

An example of a distributed computing system is an electronic trading platform. In many implementations, an electronic trading platform includes (a) one or more modules for receiving data transaction requests from external computer systems, (b) one or more modules for transmitting data from the electronic trading platform to recipient systems (via e.g., "data feeds" or "electronic data feeds"), and (c) a matching engine and/or other processing engine, for performing data processing (e.g., match processing) based on data transaction requests received by the electronic trading platform.

An example of a data transaction request that may be received by an electronic trading platform (e.g., via the one or more modules for receiving data transaction request messages) includes, for example, a request to enter an order (e.g., an electronic order) to buy or sell a particular asset that is traded on the platform. The electronic trading platform may be configured to handle (i.e., may be programmed to perform operations for) different types of orders, with each type of order having its own associated set of data attributes and expected behaviors.

In example electronic trading platform implementations, the matching engine can be a module within the platform that is programmed to perform, and performs, the matching of orders against each other. For example, if a data transaction request is received that indicates an order to buy an asset (or some quantity thereof), the matching engine may perform processing to compare the buy order against corresponding/complementary sell orders (e.g., those that are already stored in the platform) to determine whether a match can be made. In some instances, a match may be identified.

In others, no match may be identified. This processing that is performed by matching engine to determine whether a match can be made may be referred to as "match processing" or "match operations," or as performing or executing a "matching process," or similar.

In many implementations, a matching engine maintains and/or has access to an order book data structure (which may also be referred to as an "order book," "central limit order book," "CLOB," "CLOB data structure," or similar) to store pending (e.g., previously received) orders that are available for matching against newly received or incoming orders. A separate order book may be used for each asset that is traded on an electronic trading platform. For example, if two different cryptocurrencies are traded on an electronic trading platform, the platform's matching engine will maintain an order book for each of the two cryptocurrencies. An order book is often structured as including two list data structures, with one of the list data structures for the buy orders and the second list data structure for the sell orders; each list in the order book may be referred to as a "side" of the order book, and the order book data structure can be referred to as a "dual-sided" data structure. Each, or both, of these lists may be sorted using a sorting algorithm that takes into account one or more properties of the orders within the order book—or other data. For example, the orders may be sorted based on timestamps that reflect when an order is received. Other more complex sorting algorithms are also possible. In many electronic trading platforms where an order book for an asset is used, processing performed by a platform's matching engine may include use of the order book, by e.g., comparing the characteristics of a newly received order to the characteristics of contra-side orders stored in the order book for the asset to determine if a match can be made.

Electronic trading platforms, like other types of distributed computing systems, can be subject to challenging technical constraints. For example, many electronic trading platforms are simultaneously expected to be very high-throughput (e.g., be able to handle millions of incoming messages per second), very low-latency (e.g., be able to process each incoming message in a tiny fraction of a second), fault tolerant (e.g., be able to continue to operate if a portion of the platform fails), resilient (e.g., be available and operate as expected when expected, even in the face of challenging conditions), and, in some instances, deterministic (e.g., given the same inputs a platform should always produce the same outputs). Additionally, it is often desirable for the software code that defines an electronic trading platform to be maintainable. For example, software code that it is suitably written to be easier to repair, extend, and/or be adapted to new requirements can be desirable in such systems. Electronic trading platforms-both individual components (e.g., the matching engine) as well as the overall architecture of the distributed computing system (including, for example, how the components within the system interact with each other)—can thus be designed to address such technical challenges.

In the example distributed computing systems described herein, processing logic may be distributed to and across different processing instances that are within the distributed computing system. Different processing instances can provide different types of input data (in the form of data transaction requests, various commands, etc.) to a matching engine (or other component of the distributed computing system) to control operation thereof. This apportionment of logic and processing load achieves a number of benefits, including (a) a more straightforward design for the components (including the matching engine) because, for example, different functionality can be split into separate components, (b) enhanced performance of the components (including the matching engine) because, for example, hardware resources can be dedicated to the functionality associated with a given component, (c) enhanced overall performance of the system (with regards to throughput, latency, fault tolerance, resiliency, and determinism), and (d) maintainability of the system.

In some instances, processing instances of the distributed computing system can be used in connection with handling functionality associated with the routing of data transaction request messages to other distributed computing systems. Different functionalities that may be provided in connection with processing instances (with features modules being an example implementation of processing instances) is described in U.S. Pat. No. 11,503,108, the entire contents of which are incorporated by reference.

Figure 1B:
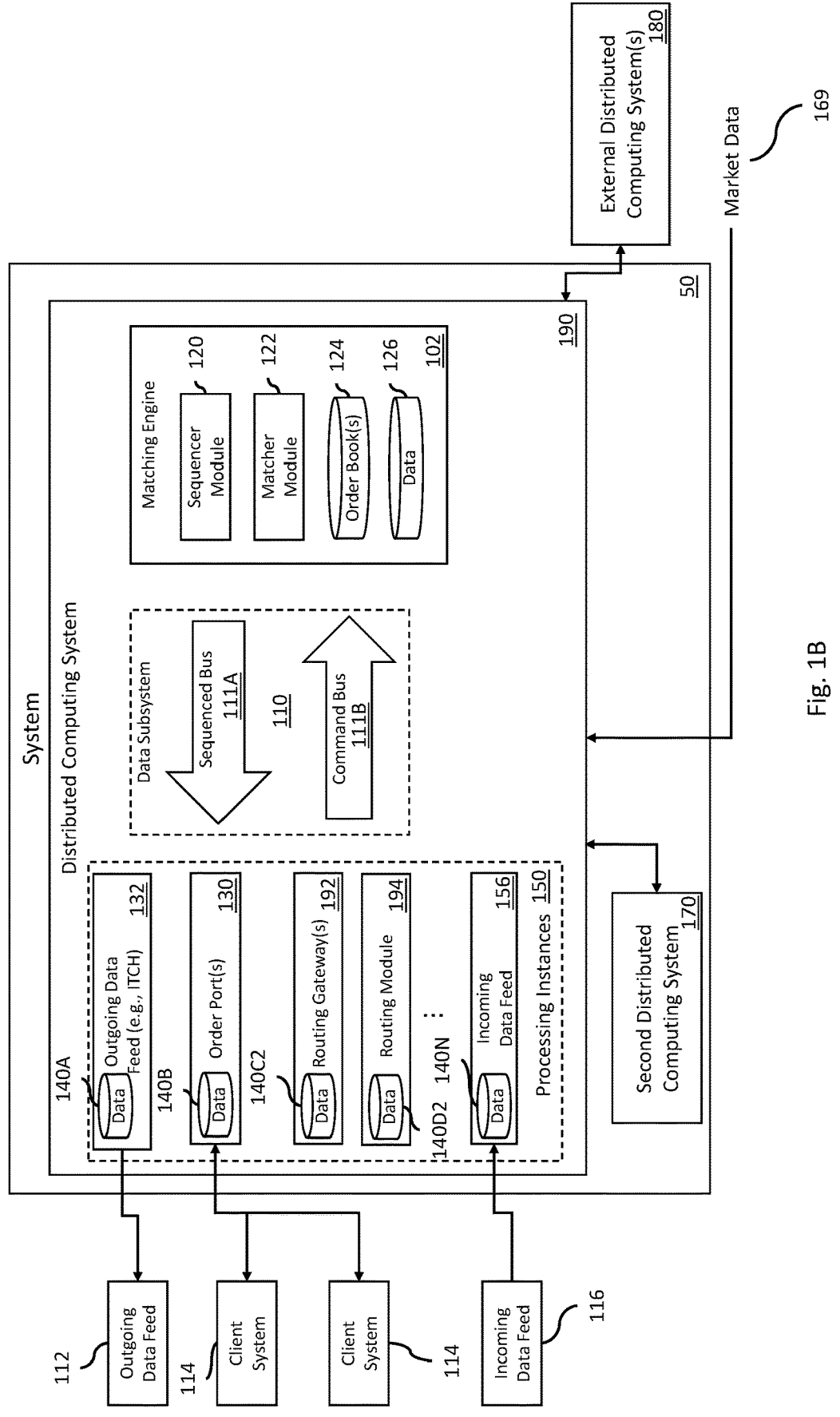
FIG. 1B is another example implementation of a system that includes multiple distributed computing systems where functionality of the routing system that is shown in FIG. 1A is provided within one of the distributed computing systems according to some embodiments.
Figure 2A:
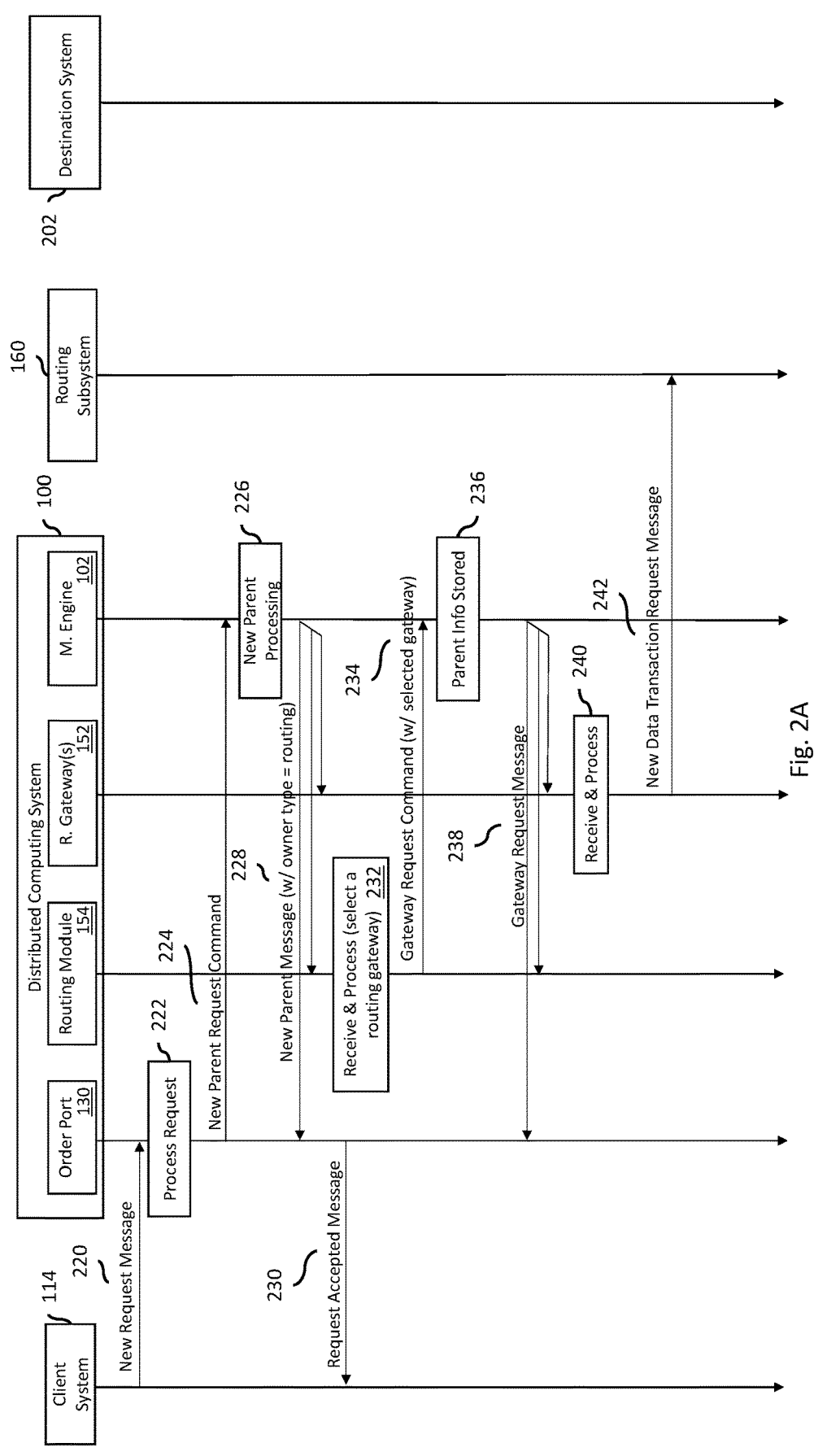
FIGS. 2A-2B are sequence diagrams showing an example of how a data transaction that is received by a distributed computing system is handled and routed using the routing system according to some embodiments.
Figure 2B:
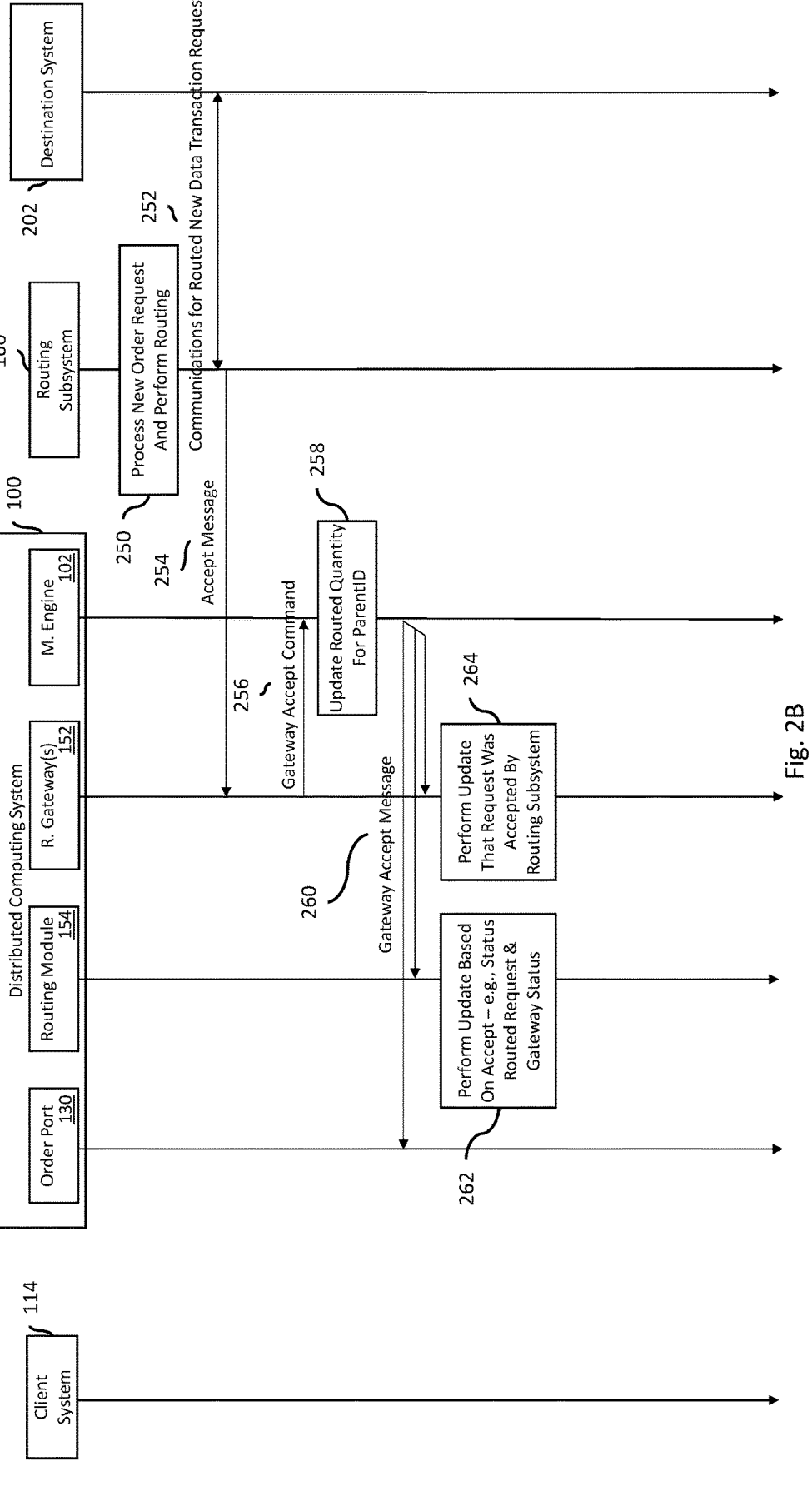
Figure 3:
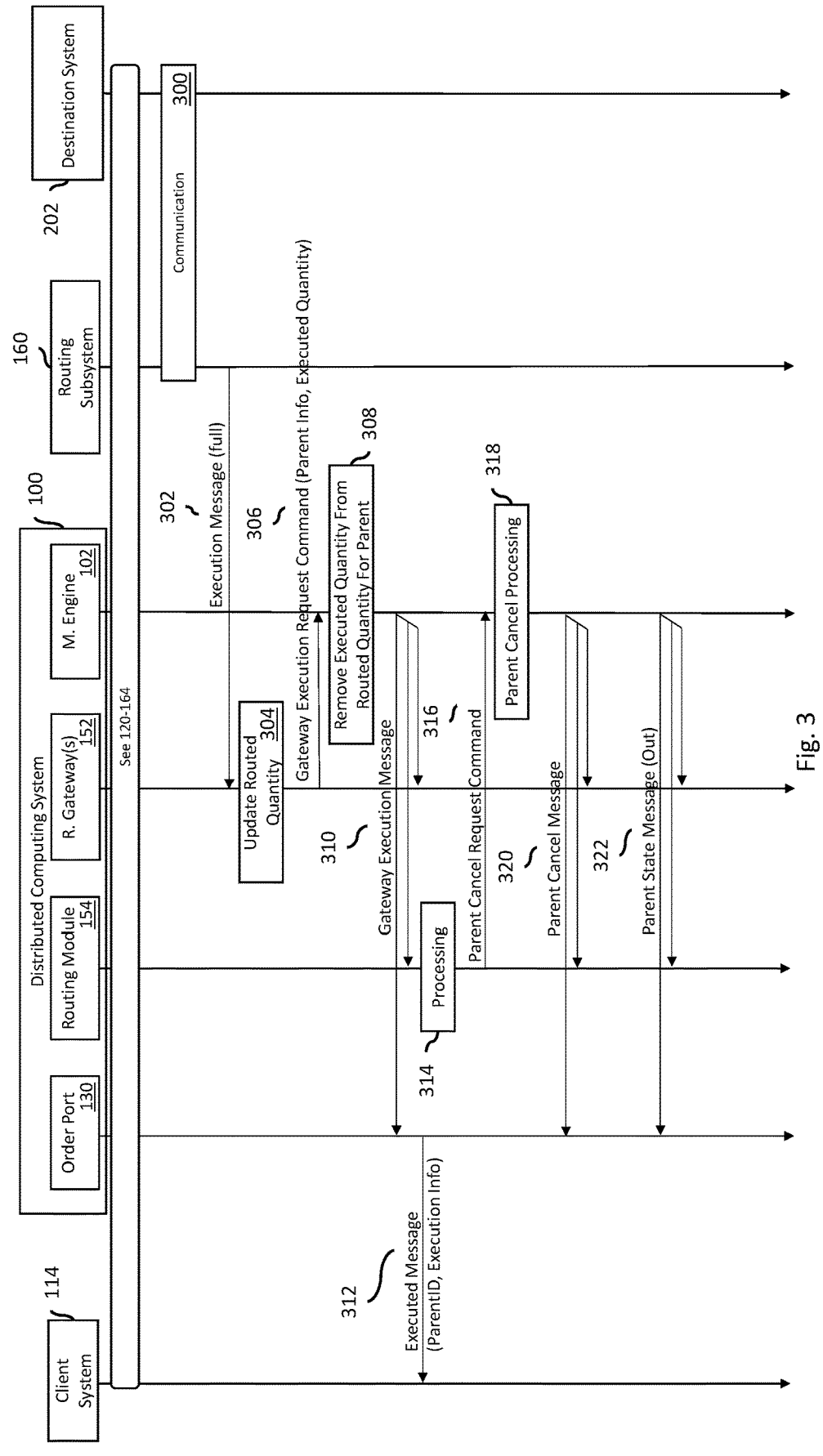
FIG. 3 is a sequence diagram showing an example of how a data transaction request that was previously routed to another distributed computing system and then executed thereon is reported back to a client system according to some embodiments.
Figure 4:
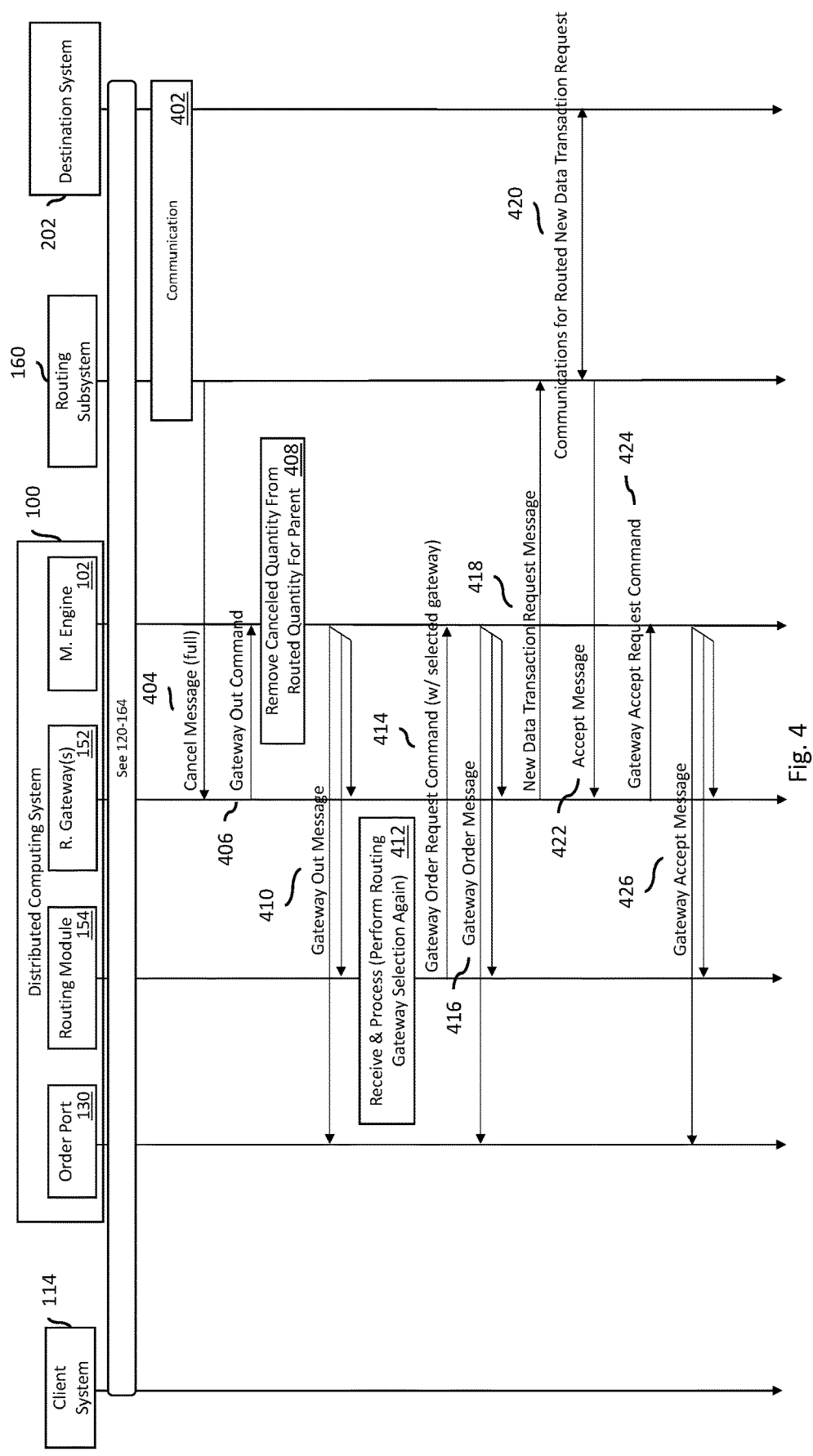
FIG. 4 is a sequence diagram showing an example of how a data transaction request that was previously routed to another distributed computing system and then canceled is handled by a distributed computing system according to some embodiments.
Figure 5A:
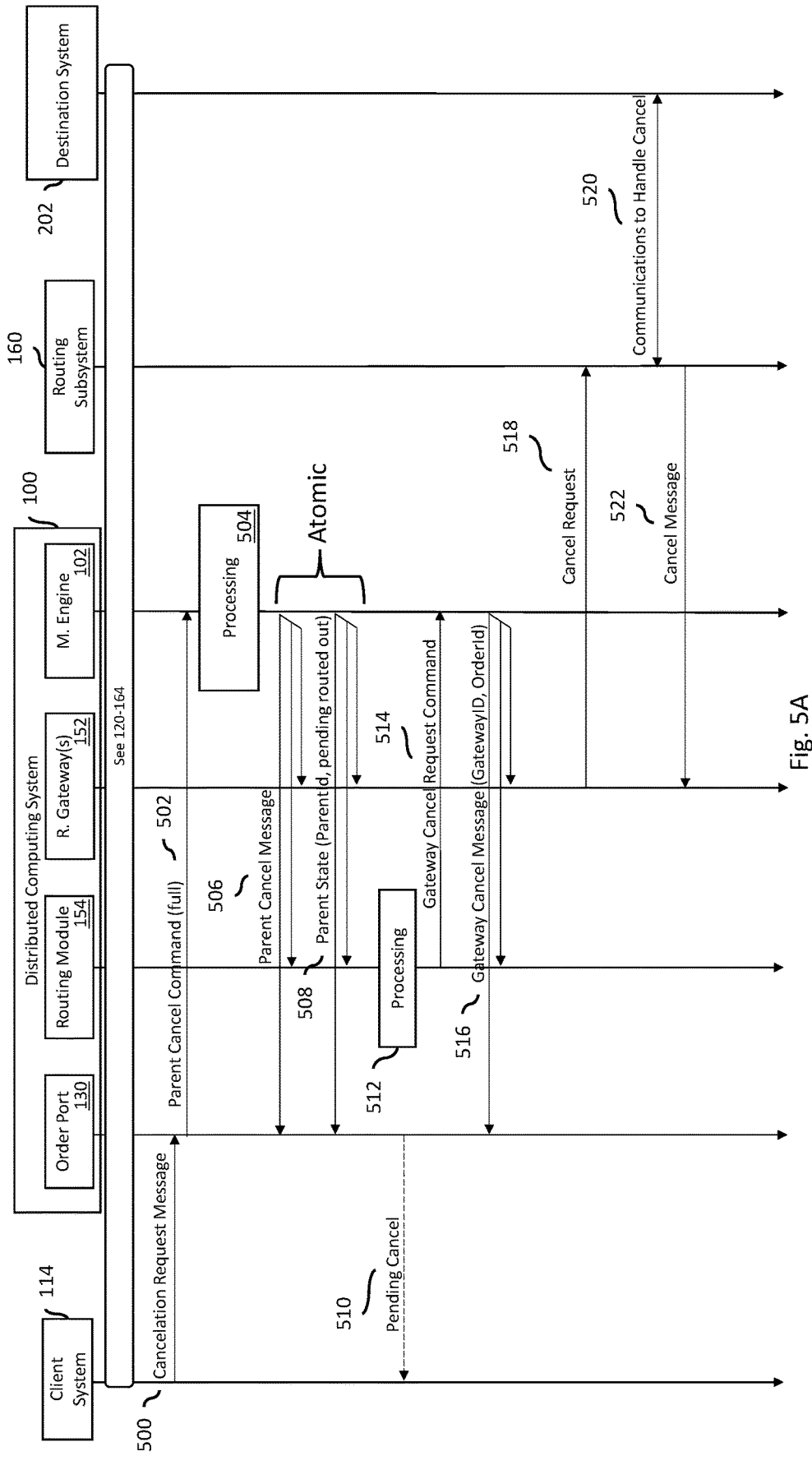
FIGS. 5A-5B are sequence diagrams showing an example of how a previously routed data transaction request that a client computer system requests to be canceled is handled by a distributed computing system according to some embodiments.
Figure 5B:
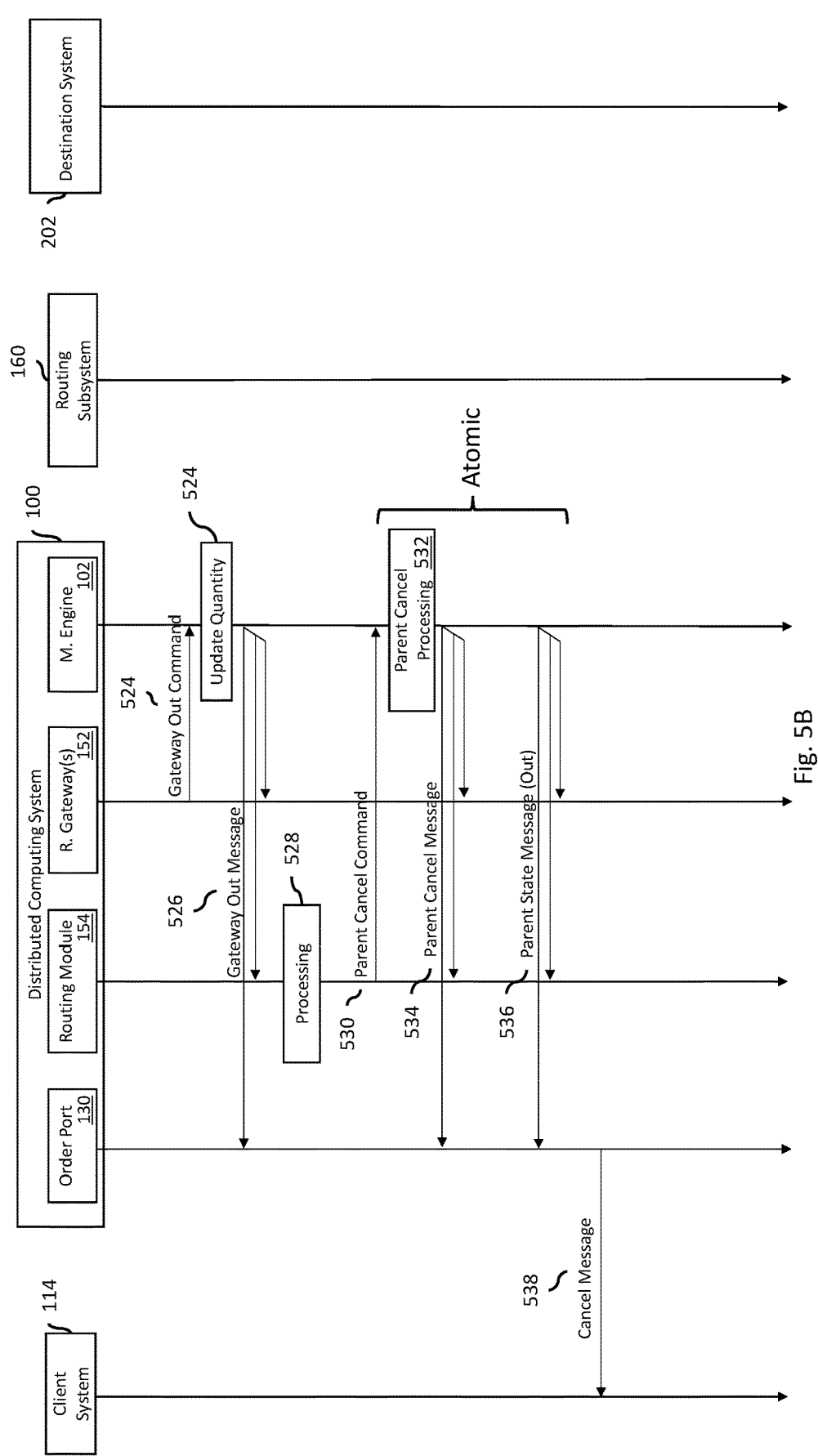
Figure 6:
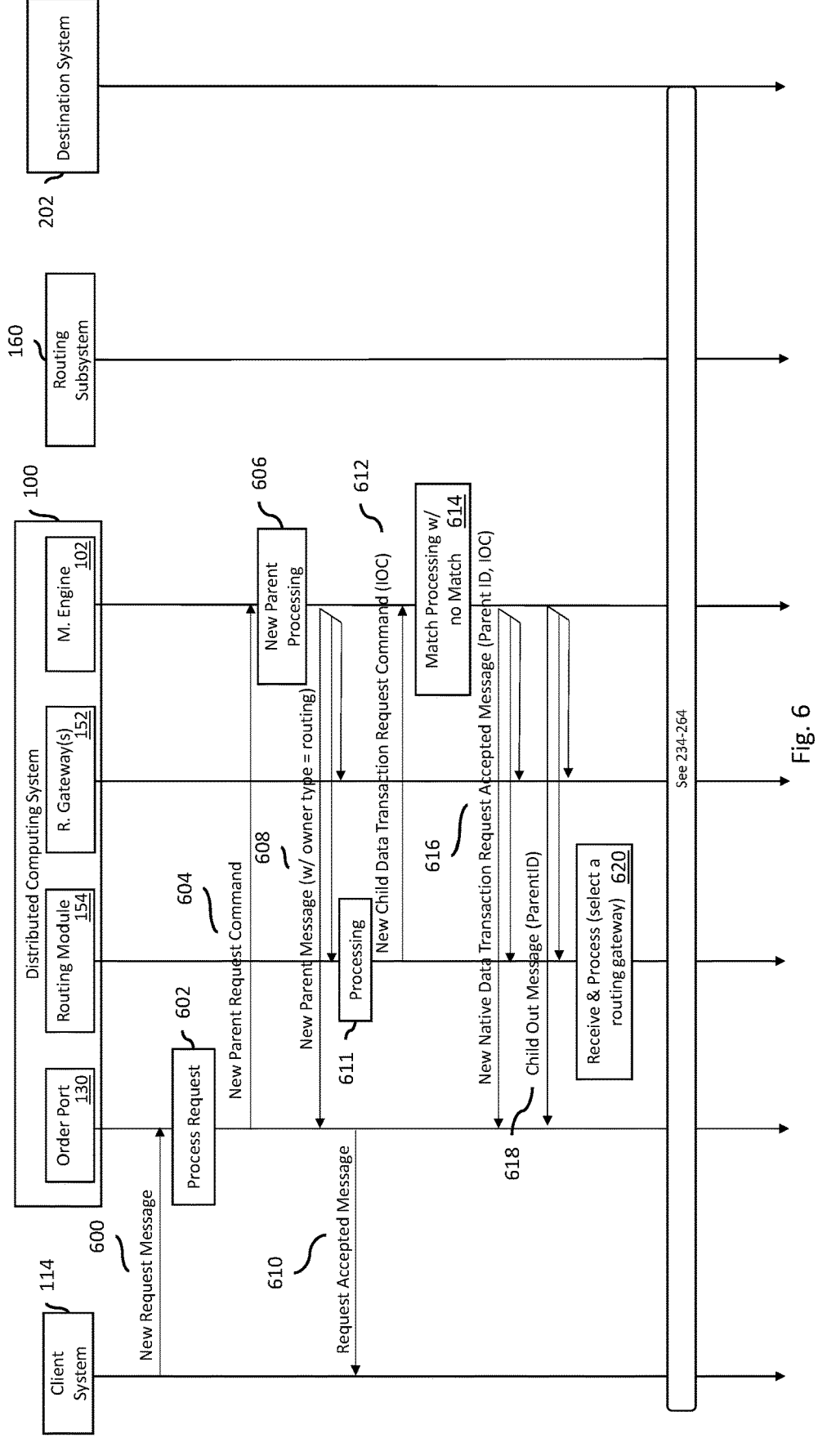
FIGS. 6-8 are sequence diagrams showing examples of how a data transaction request received by a first distributed system may perform a match process before being routed using the routing system according to some embodiments.
Figure 7:
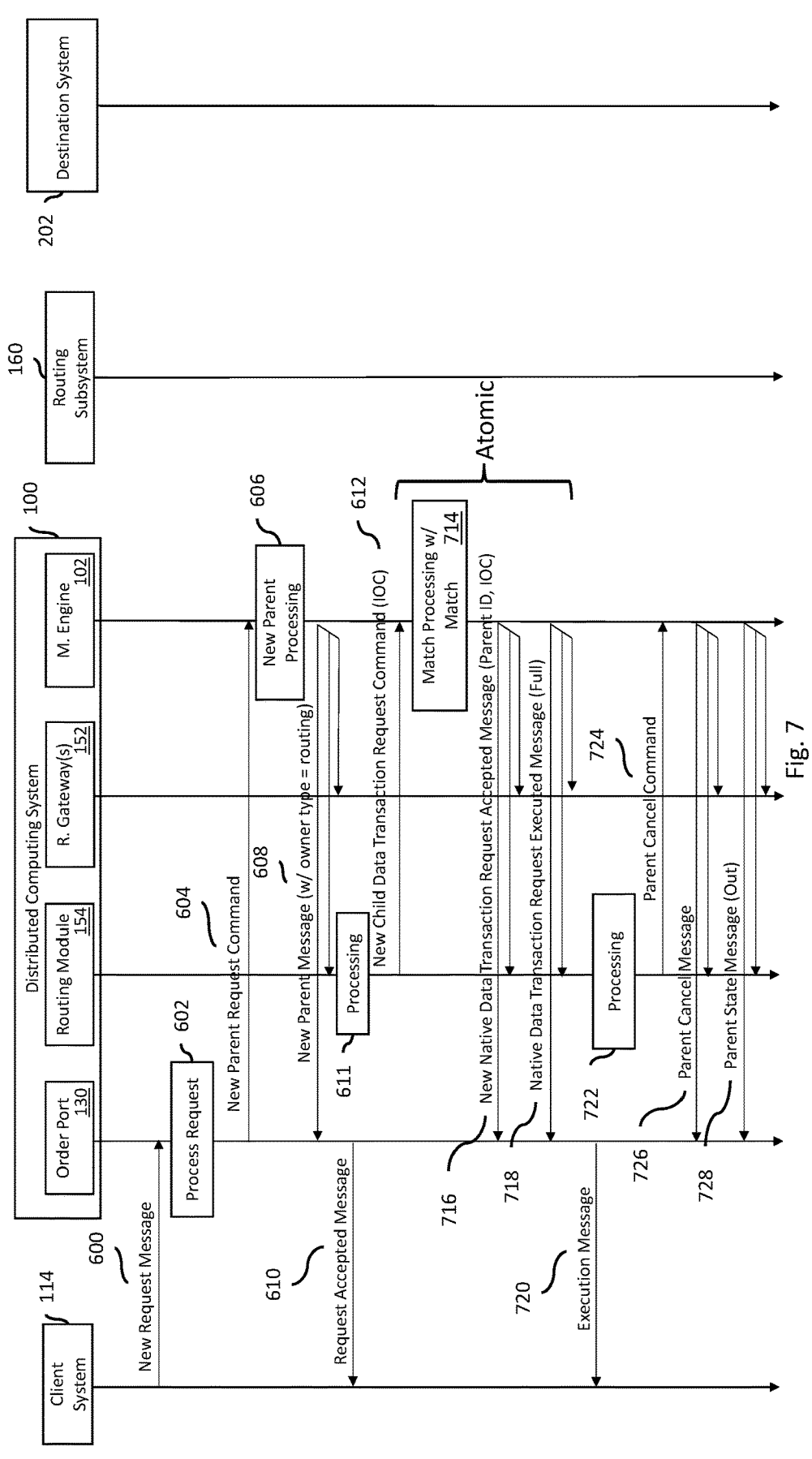
Figure 8:
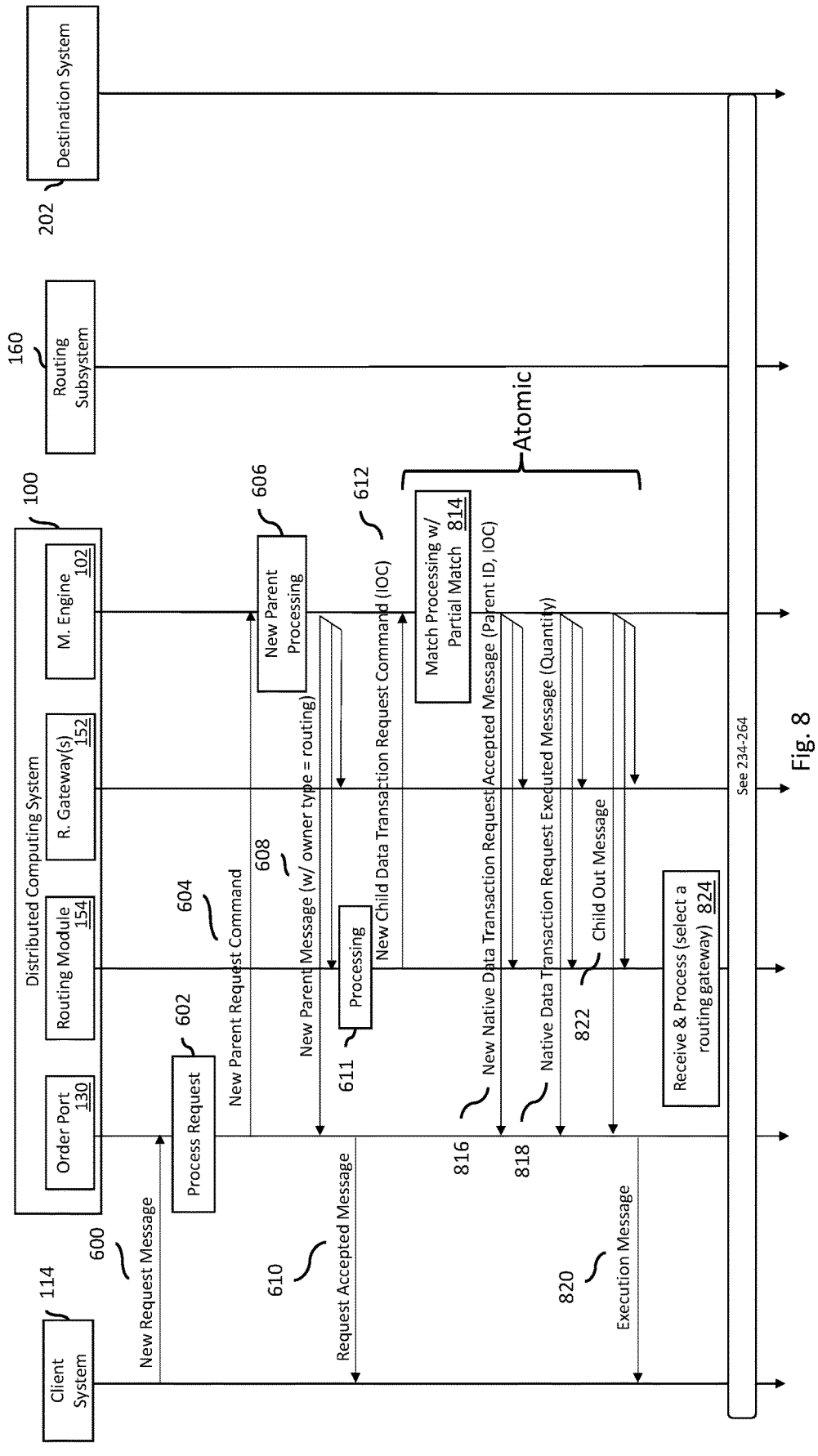
Figure 9:
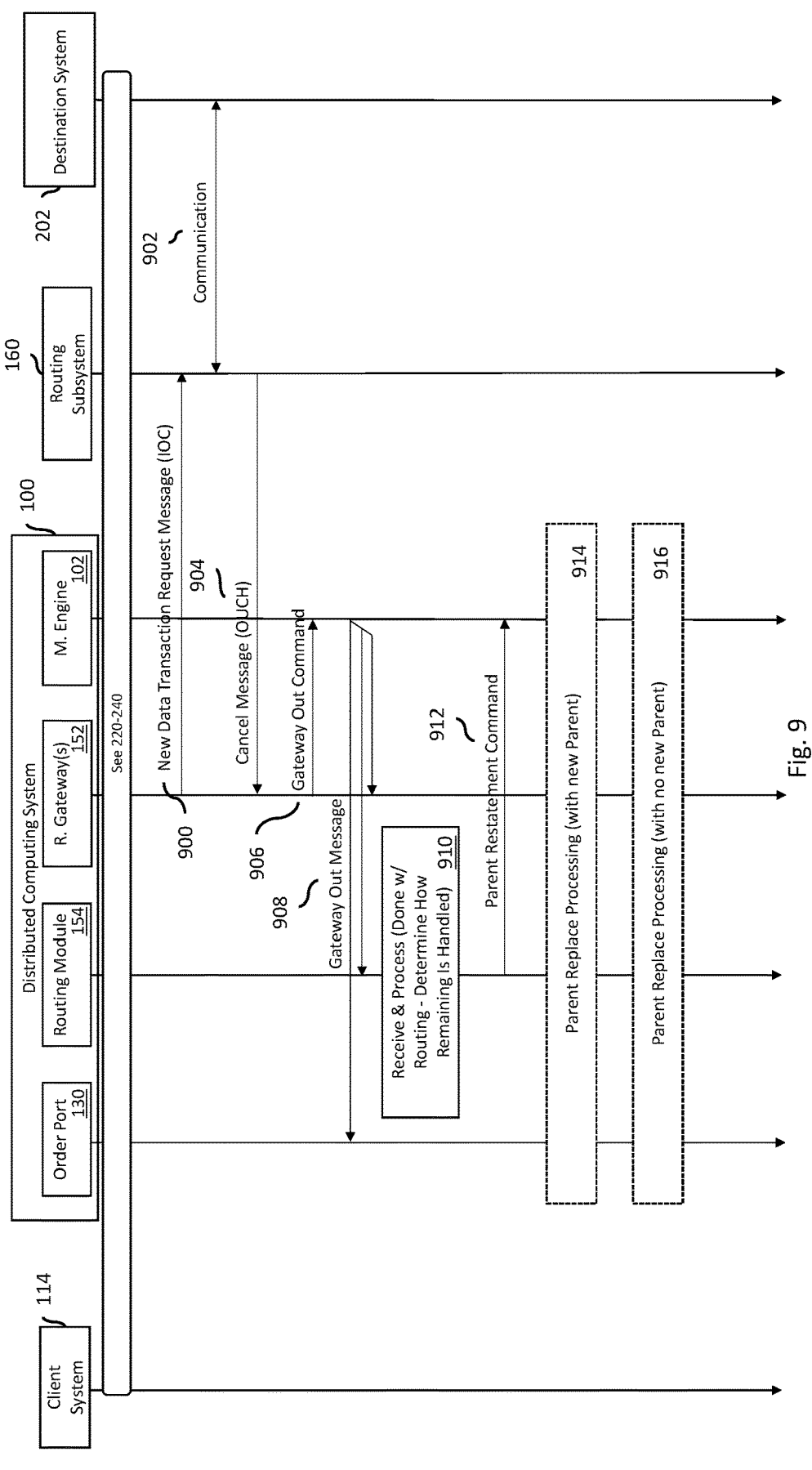
FIG. 9 is a sequence diagram showing an example of how an away data transaction request that is first routed to a destination system before then being processed by the distributed system that initially received the request according to some embodiments.
Figure 10A:
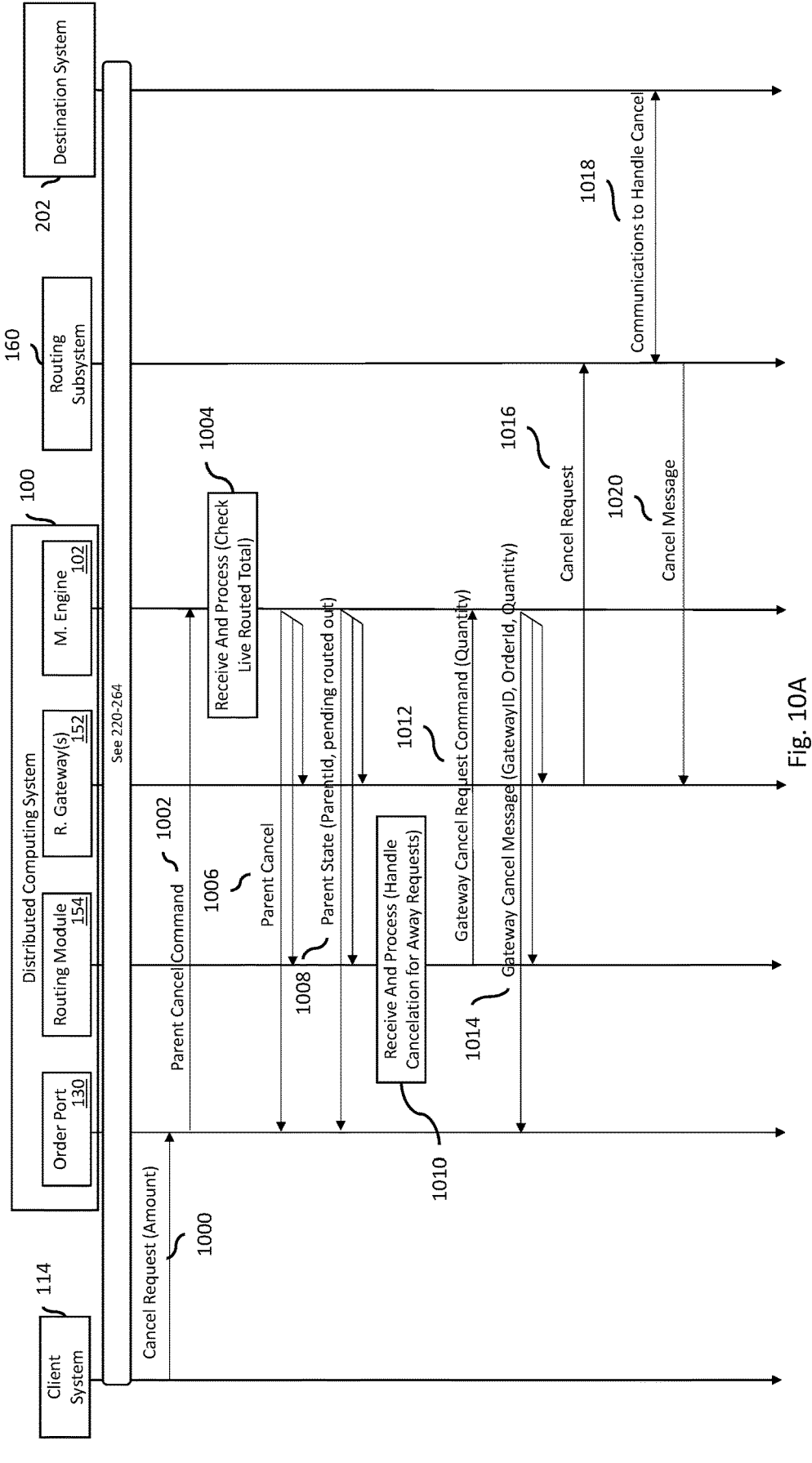
FIGS. 10A-10B are sequence diagrams showing an example of how an existing data transaction request may be partially canceled using the system shown in FIG. 1A according to some embodiments.
Figure 10B:
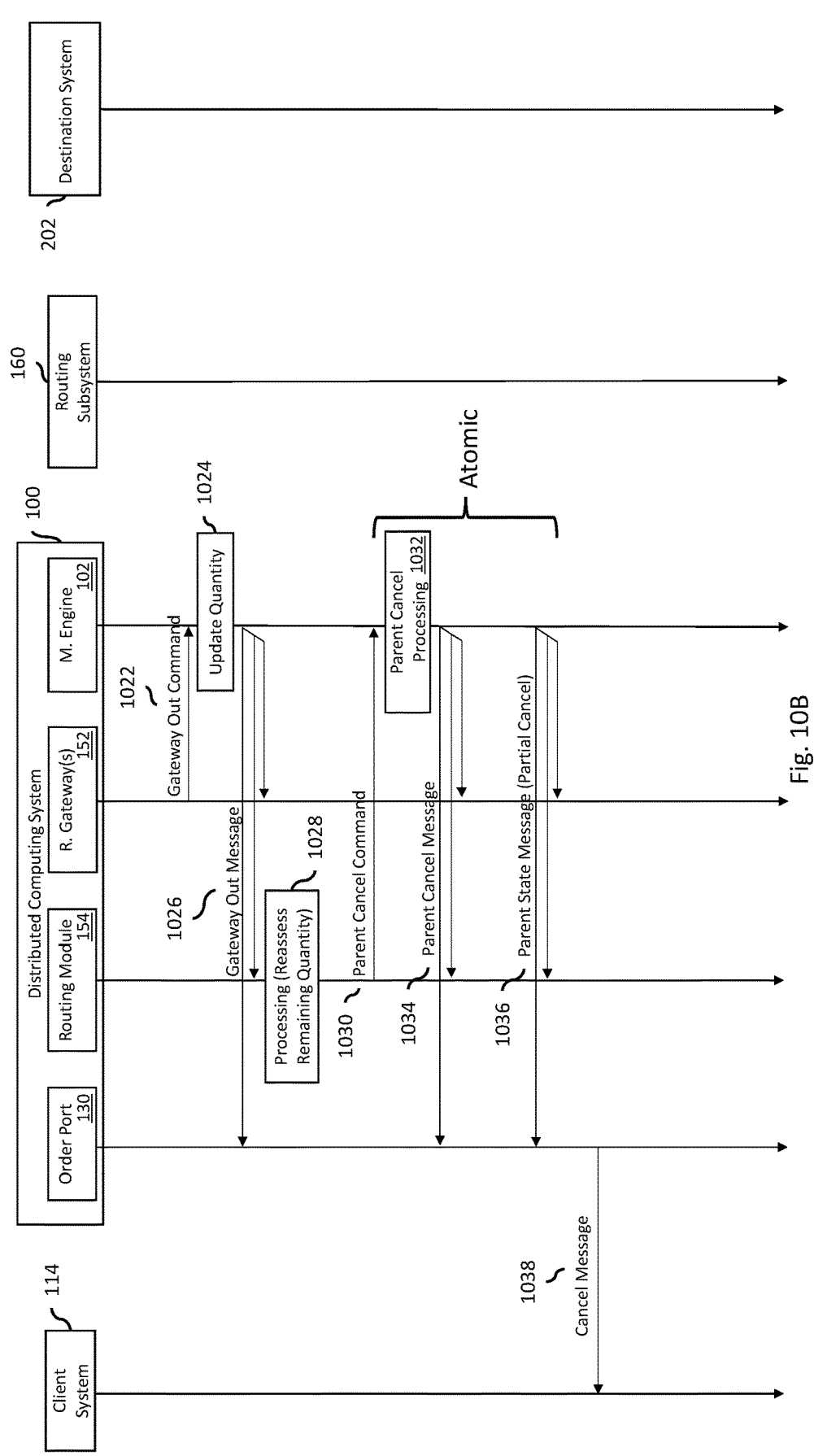
Figure 11A:
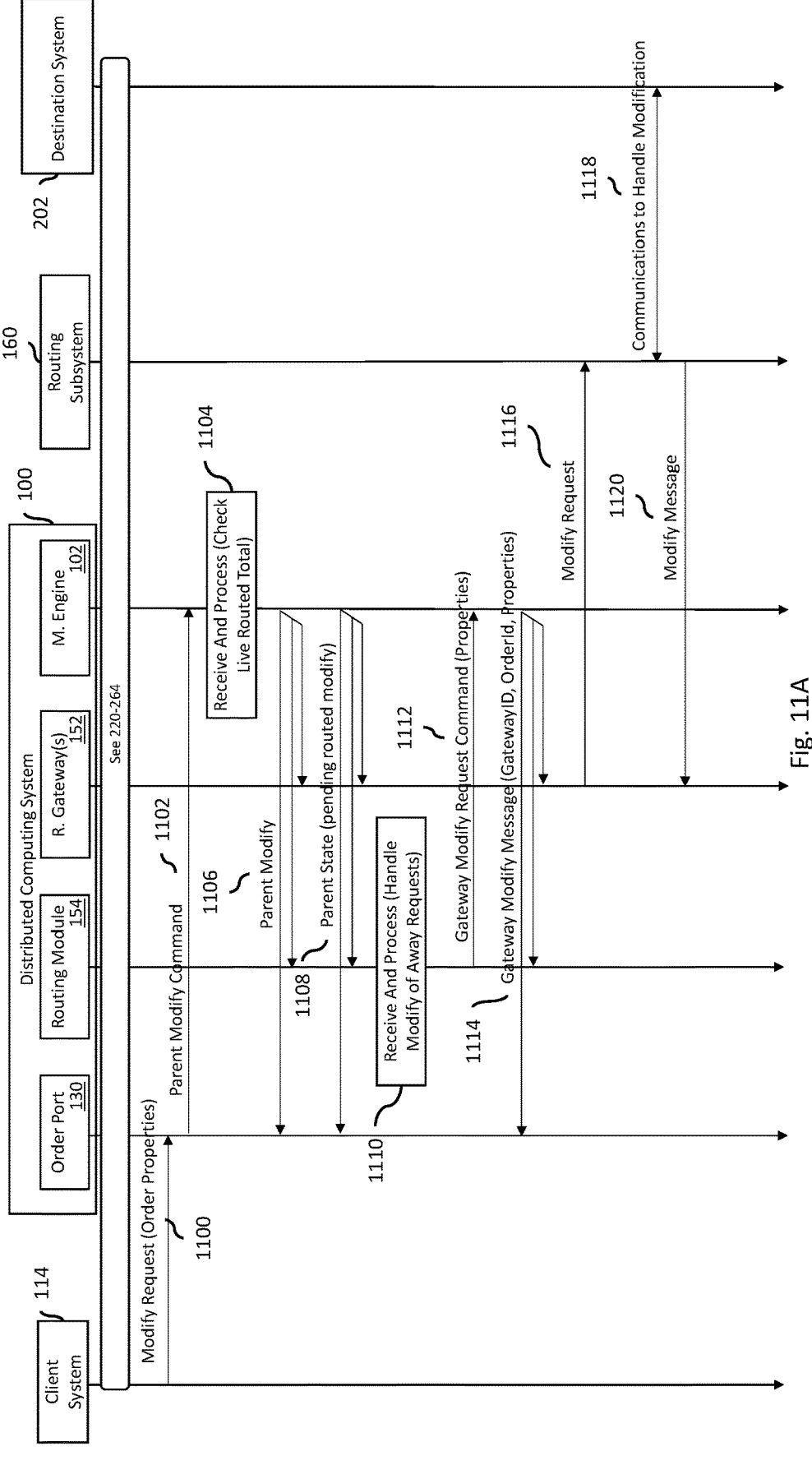
FIGS. 11A-11B are sequence diagrams showing an example of how an existing data transaction request may be modified using the system shown in FIG. 1A according to some embodiments.
Figure 11B:
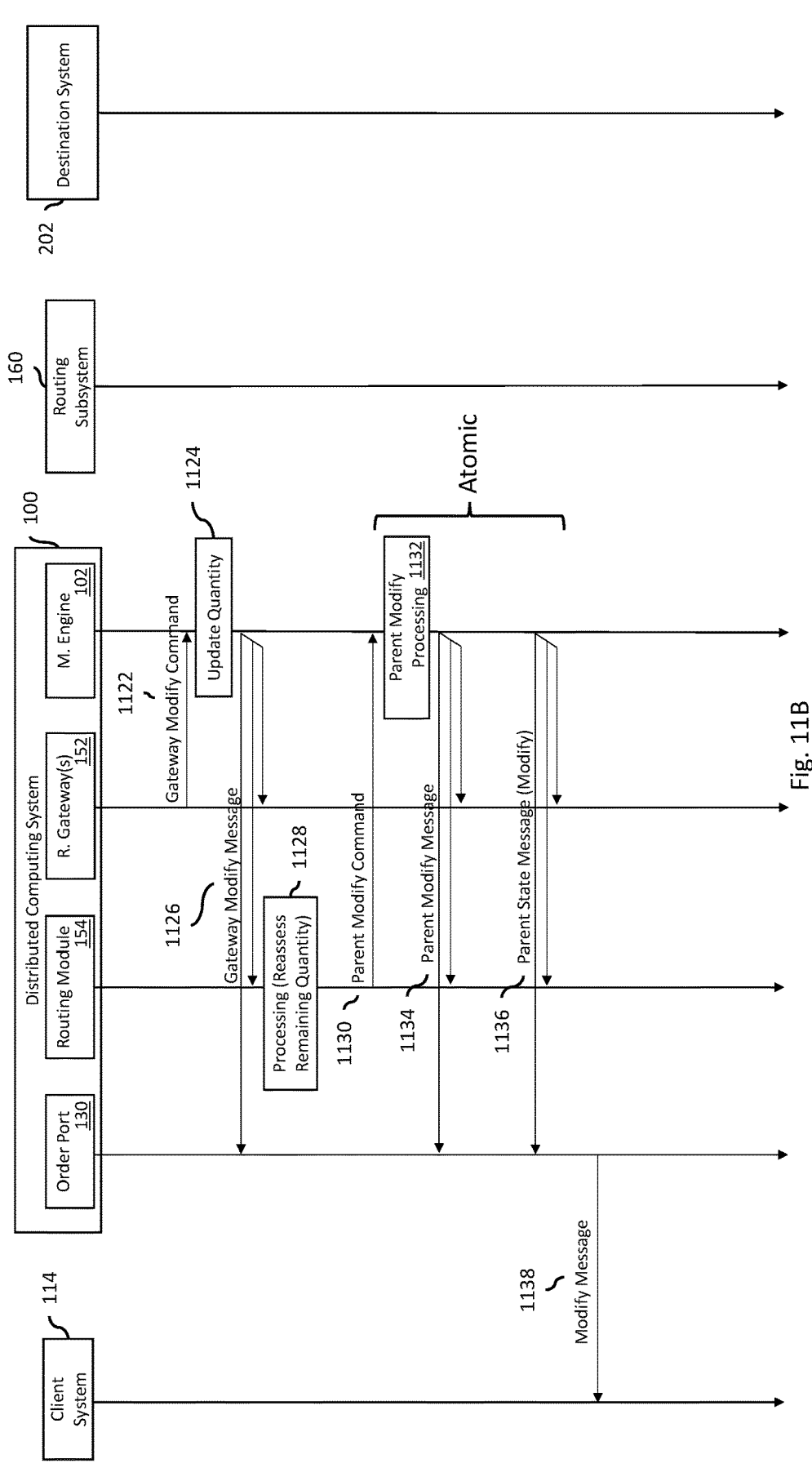
Figure 12A:
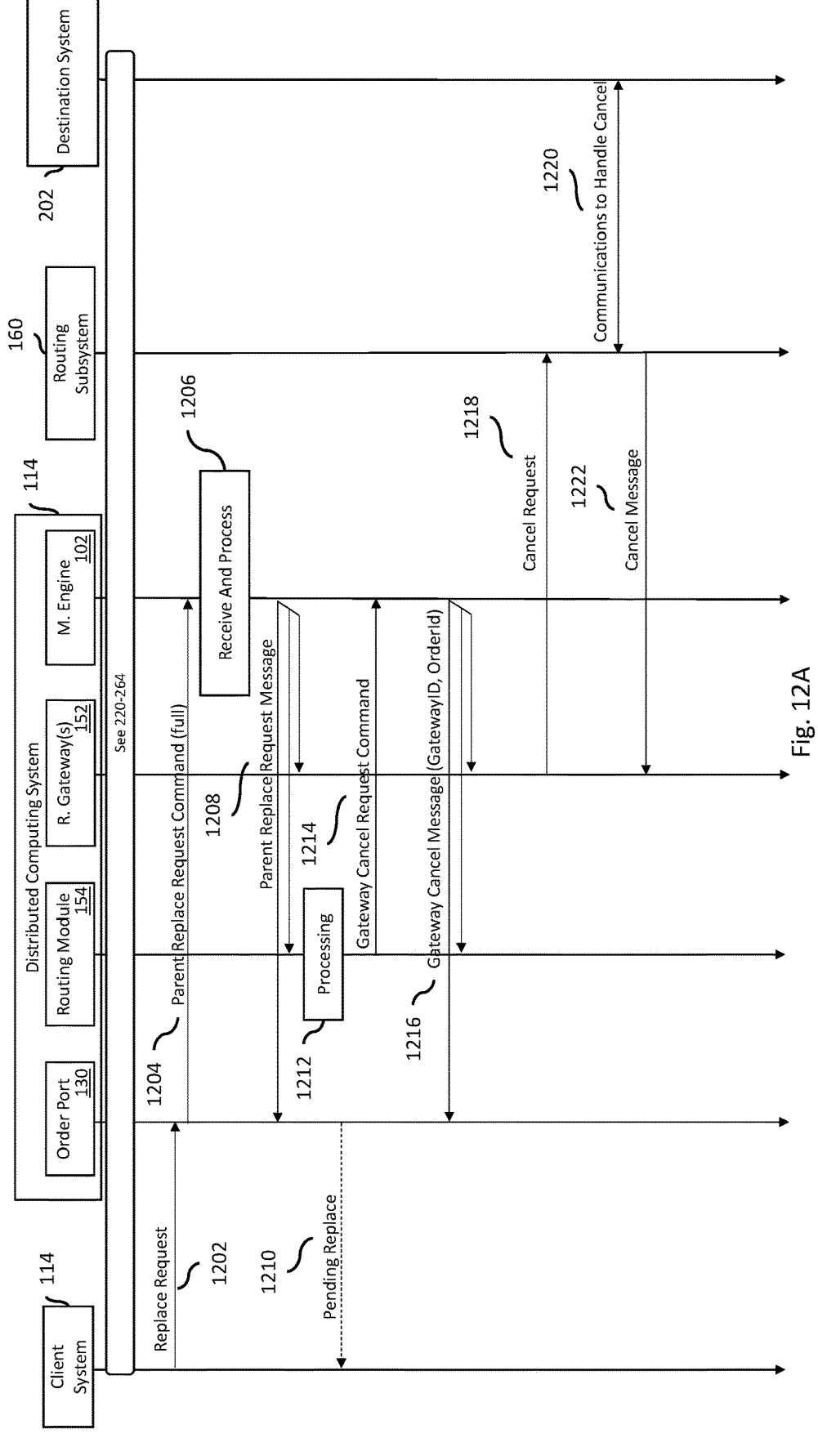
FIGS. 12A-12B are sequence diagrams showing an example of how an existing data transaction request may be replaced using the system shown in FIG. 1A according to some embodiments.
Figure 12B:
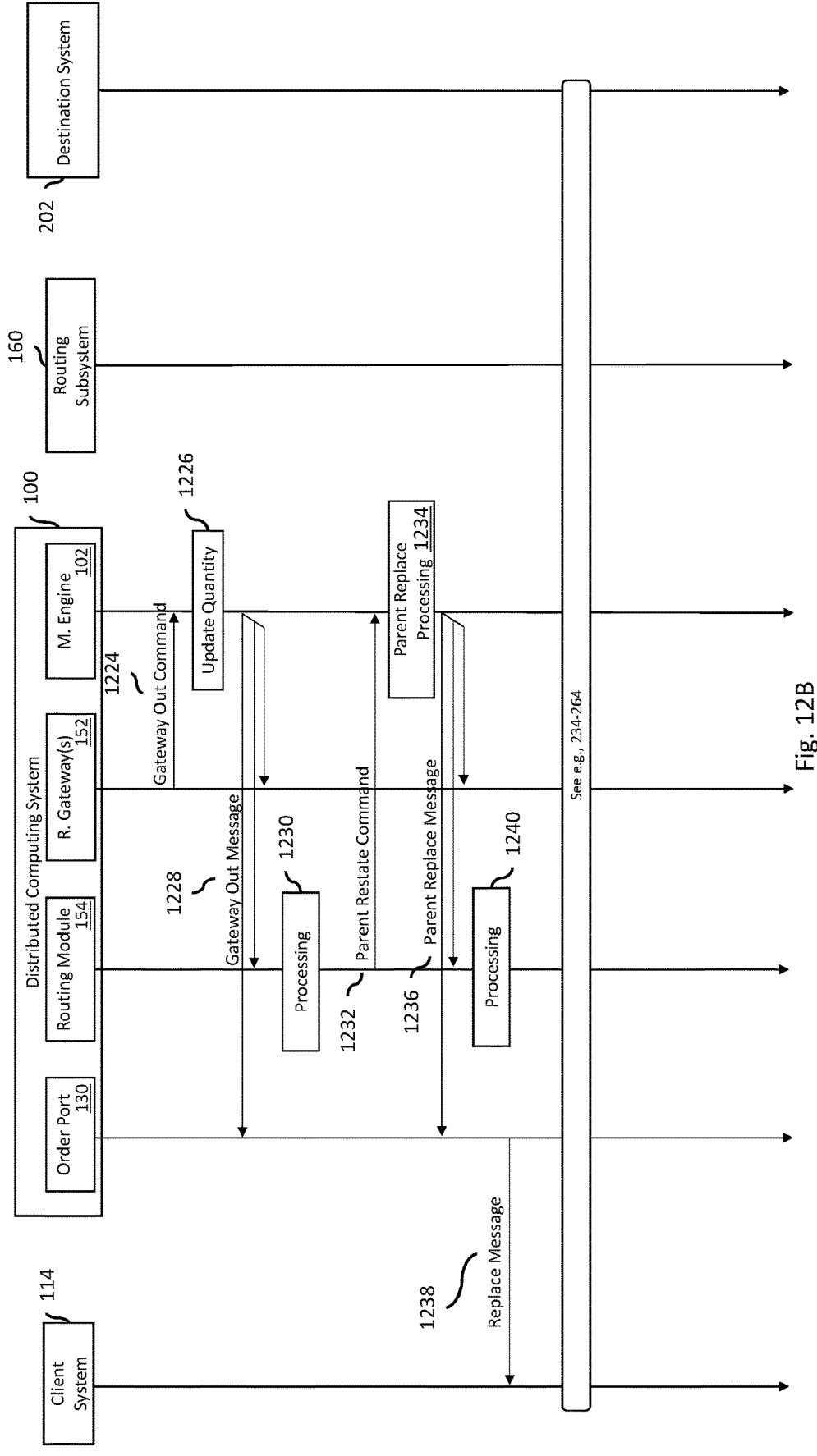
Figure 13:
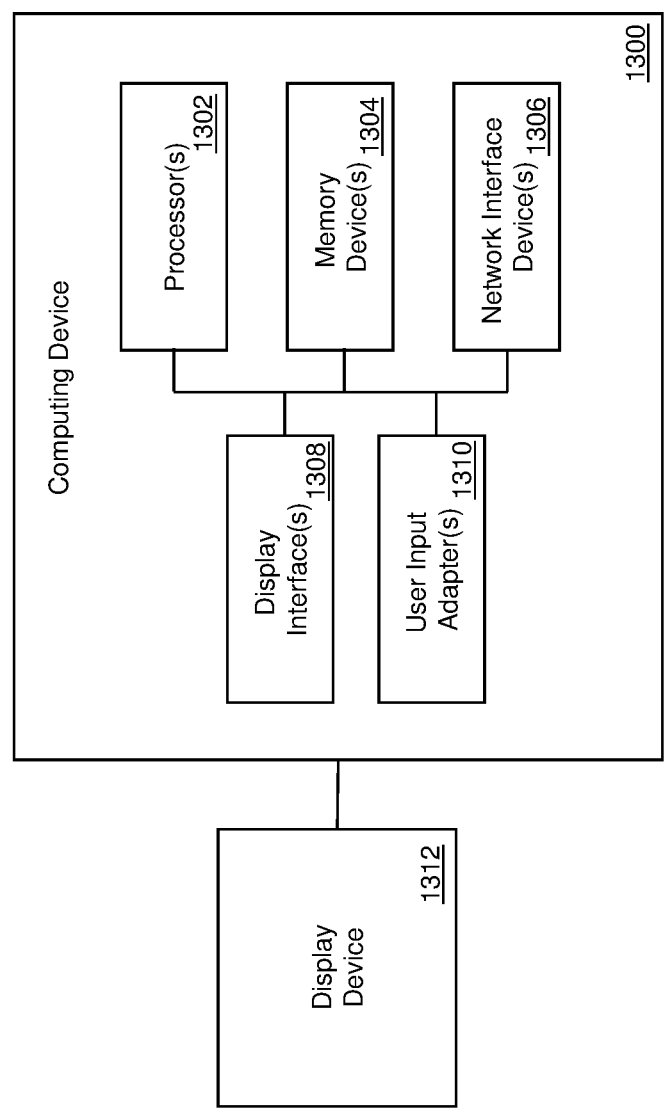
FIG. 13 shows an example computing device that may be used in some embodiments to implement features described herein.

In the figures discussed below, FIG. 1A and FIG. 1B are architecture diagrams showing examples of distributed computing systems that are the subject of this specification, with FIG. 1B showing an example in which the functionality of a routing subsystem is incorporated into one or more processing instance of the distributed computing system. FIG. 2A and FIG. 2B show operations for how a data transaction request received by a distributed computing system can be routed using the routing system according to some embodiments. FIG. 3 shows operations for how execution of a previously routed data transaction request is handled. FIG. 4 shows operations for how cancelation of a previously routed data transaction request is handled. FIGS. 5A-5B show operations for how a cancelation request of a previously routed data transaction request is handled. FIGS. 6-8 show operations for how a first distributed system may perform match processing in combination with use of the routing subsystem. FIG. 9 shows an example of how an away data transaction request is first routed to a destination system before being processed by the distributed system that initially received the request. FIGS. 10A-10B show an example of how a previously received data transaction request may be partially canceled and FIGS. 11A-11B show how a previously received data transaction can be modified. FIGS. 12A-12B show how an existing data transaction request may be replaced. FIG. 13 shows an example computing device that may be used for any of the described systems, including an electronic trading platform, where one or multiple such devices may be used to implement the system.

In many places in this document, software (e.g., modules, software engines (e.g., a matching engine), processing instances, services, applications, and the like) and actions (e.g., functionality) performed by such software are described. This is done for ease of description, and it should be understood that whenever it is described in this document that software performs any action, that the action is in actuality performed by underlying hardware elements (such as a processor and a memory device) according to the instructions that comprise the software. As also discussed herein, such functionality may, in some embodiments, be provided in the form of firmware and/or hardware implementations. Further details regarding this are provided below in, among other places, the description of FIG. 13.

This specification was originally filed with an original claim set comprising claims 1-102. Each claim of this original claim set finds support in many places throughout this specification. However, the following original claims find support in at least the following specified Figures and the description/discussion corresponding to such specified Figures: claims 1-20 in FIG. 2A-2B; claims 21-40 in FIGS.

3-4; claims 41-60 in FIGS. 6-8; claims 61-80 in FIG. 9; claims 81-102 in FIGS. 10A-12B and claims 96-97 in FIGS. 5A-5B.

Description of FIG. 1A

FIG. 1A shows a system 50 that includes a distributed computing system 100, a routing subsystem 160, and a second distributed computing system 170. Another distributed computing system 180, which may be external to system 50, may transmit and receive messages to/from routing subsystem 160 of system 50 (and/or communicate with any other components or the like of system 50). In some examples, each or any of the distributed computing systems discussed herein may be composed of multiple instances of the non-limiting illustrative computing device described in FIG. 13. Thus, for example, the functionality discussed in connection with such systems may be distributed between different instances of the example computing device described in FIG. 13. In some examples, the functionality discussed in connection with any or all of the distributed computing systems herein may be provided for on one instance of the example computing device described in FIG. 13. In such cases, the system may be a non-distributed or monolithic system.

In general, multiple distributed computing systems may communicate (e.g., transmit and/or receive) messages to each other and/or other systems. Such communication is facilitated, at least in part, by using routing subsystem 160. The routing subsystem 160 determines, via router 164, to which of multiple possible distributed computing systems (e.g., 100, 170, 180) a given message or data transaction request should be routed to for processing. In some examples, the routing subsystem 160 may receive and route messages that are provided from a distributed computing system (e.g., 100). In some examples, client systems 114 (or other computing systems) may directly submit messages to (e.g., via order ports 166) routing subsystem 160 to then be routed to any of the multiple possible destination computing systems. In general, and as discussed herein, the system (e.g., any of systems 100, 170, 180, and 160) that initially receives a message from a client system 114 will also handle managing how that message should be further processed and also be responsible for communicating results of such processing (even if performed on/by other systems) back to the client system 114.

Distributed computing systems 100, 170, and/or 180 may each be implemented in some embodiments as an electronic trading platform (which may also be referred to as an "electronic exchange," "electronic trading system," "trading system," "platform," or similar), and may be configured to each receive process, and send messages (which may also be referred to as "electronic messages," "data messages", "electronic data messages," or similar). Some of the messages that are received, processed, or sent may be, include, or relate to data transaction request messages (which may also be referred to as "requests," "request messages," "data transaction messages", "data transaction requests," "order messages," "electronic orders," "electronic order messages," "data operation request messages," "data operation requests," or similar), which indicate a request to take some action. Some of the messages and/or some of the data transaction request messages that are received may be further communicated to routing subsystem 160 for processing (and routing to other systems).

In some examples, each of distributed computing systems 100, 170, and 180 may be configured to handle or process messages in different ways. As a simple example, these three different distributed computing systems may be used to handle travel plans. A first may handle plane tickets, a second train tickets, and a third car rentals or car services. All or some of the distributed systems may be operated by the same organization or entity (or all or some may be operated by different organizations or entities) and all or some may be provided as part of system 50. Routing subsystem 160 may also be used to send requests to one or more of the various distributed systems for processing thereon. For example, the routing subsystem may determine to which distributed system (which may include routing two or more requests to two or more systems in parallel) the requests should be routed (e.g., based on where the person is traveling from, where they are traveling to, other preferences, the type of ticket that is preferred for the purchased, the distance traveling, the processing or availability load of each of the systems, etc.).

As another example, each of the distributed computing systems may be electronic trading platforms, which may be used to operate exchanges or other marketplaces (e.g., exchanges/marketplaces for financial instruments (e.g., securities) or digital assets). Examples of exchanges include the Nasdaq Stock Market, Nasdaq BX, Nasdaq PSX, the New York Stock Exchange, the Tokyo Stock Exchange, and Euronext. When a data transaction request is communicated to the routing subsystem 160, it may then determine to which one (or more than one) of these destination systems the request should be routed to. In some examples, the routing subsystem 160 may automatically transform requests into the appropriate messaging protocol that is used when communicating with a given system. Further details of configuration and operation of illustrative electronic trading platforms, and the routing system, are provided below and herein.

Before discussing the details of the distributed computing system 100, the other systems and components shown in FIG. 1A will be described. In particular, the distributed computing system 100 communicates with client systems 114, outgoing data feed 112, incoming data feed 116, and routing subsystem 160.

1) Client Systems

Client systems 114 may be provided via physical computing systems (e.g., each being a separate instance of the example computing device described in FIG. 13) or may be provided via virtual instances, such as in a cloud computing environment or the like. In some instances, client systems 114 may be provided within the same data center or co-located with system 100. Client systems 114 send and receive data messages to/from the distributed computing system 100 (or any of systems 160, 170, or 180). In some examples, the protocol that is used when communicating may be OUCH (discussed below), FIX, or other protocols used for sending/receiving messages.

In general, communications to system 100 by client systems 114 is performed via order ports 130 (discussed in greater detail below in connection with the components of the distributed processing system 100) or gateways. For ease of description of the technical features described herein, the term "gateway" or similar is used to refer to the component that handles transmitting data messages from a subject system (e.g., routing gateways 152 or external gateways 168) while the term "order port" or similar is used to refer to the component that handles initially receiving data messages that are incoming to the subject system. But, consistent with the above explanation, in some instances the terms gateway and order port may be used in contexts different from this understanding. For example, a system may be configured with "gateways" that are used to initially receive data messages from external systems. It will also be appreciated that both gateways and order ports may be used to send and receive messages. For example, order ports may be used to send acknowledgement messages back to client systems or the like and gateways may receive acknowledgment messages from other external systems. Furthermore, in some instances, a gateway or order port may handle both initial receipt and initial transmission of data transaction requests.

As discussed herein, the distributed computing system that initially receives a data message from a client system may not be the distributed computing system that operates on that request in that message. Instead, the data transaction request may be sent to the routing subsystem 160 that may then make a routing determination for where the data transaction request should be sent for processing (e.g., which may include the same system the received the request in some instances). However, as discussed in greater detail in connection with FIGS. 2A-12B, the distributed computing system that initially receives the request (e.g., via order port 130) may still be responsible for managing that data transaction request and communicating any updates back to the client system 114 that relate to the original request.

2) Outgoing Data Feed

Outgoing data feed 112 may be used to provide updates to other, external systems regarding, for example, the state of the distributed processing system 100 or to report on how each or any of the received data transaction request have been processed by the distributed processing system 100. An illustrative example of an outgoing data feed 112 is an ITCH data feed. The outgoing data feed 112 is generated by the outgoing data feed module 132 that is discussed below in connection with the components of the distributed processing system 100.

3) Incoming Data Feed

Incoming data feed 116 may be used to receive data that is used in processing that is performed by the system 100. Examples of the incoming data feed include feeds for data from a Security Information Processor (SIP). Another illustrative example of an incoming data feed is weather data, location data, or other types of data that may be provided from external sources. Market data 169 is another example of an incoming data feed. In the case of market data 169, this data is provided to the routing subsystem, which then uses the provided data when making routing decisions. In general, the quantity of data included in Market Data 169 may correspond to the type of processing that is to be performed with that data. In the case of routing subsystem 160, the market data 169 may include, for example, 5 or more price level depths in the market data. Such data may then be used in connection with performing routing decisions by the routing subsystem 160. In other examples, less (or more) market data may be included in such data feeds. However, it will be appreciated that the amount of data included in such data feeds can substantial (e.g., gigabytes or terabytes of data over the course of an operation period—such as a trading day) according to certain example embodiments.

4) Routing Subsystem

Routing subsystem 160 (also called a routing computer system herein) is separately provided from the distributed processing system 100 and is responsible for receiving data messages (e.g., data transaction requests) and determining to which one of multiple possible destination systems, the data message should be routed. As discussed in connection with FIG. 1B below, in certain examples, the functionality of the routing subsystem 160 may be incorporated into the distributed processing system 100. Further details of the operation and components of the routing subsystem 160 are provided below.

Now details of the routing subsystem 160 will be discussed. The routing subsystem 160 includes Rash Engine 162, Router 164, Order Port(s) 166, External Gateway(s) 168. Each of these components may be separate computer processes and/or separate computer threads. Each component of the routing subsystem may be provided within its own physical instance, such as the example computing device described in FIG. 13. In some examples, each component is provided within its own virtual instance (e.g., as a virtual machine or container) that is supported by underlying hardware resources such as the example computing device described in FIG. 13. As with the architecture of system 100, the distributed nature of the components of the routing subsystem 160 allow for the same or similar benefits—high-throughput, low-latency, fault tolerant, resilient, deterministic, maintainable, and/or upgradable.

a) Rash Engine

Rash engine 162 may function as a sequencer that is responsible for sequencing newly received messages. This sequencing process is used to ensure that the ordering of messages is maintained while such messages are being processed by the routing subsystem 160. Note, that the ordering of the messages is with respect to when those messages are sequenced by the rash engine 162 and this may be different to when those messages are received by the routing subsystem 160. For example, two requests that are received by the routing system (e.g., at order ports) at nearly identical times (e.g., down to the microsecond level) may be processed in different orders by the rash engine 162 (e.g., due to micro variations in latency between the order port and rash engine). In some examples, the functionality of the Rash engine 162 may be the same or similar to that of the sequencer module 120 of the distributed processing system 100 that is discussed below. In general, each message that is received by the routing subsystem 160 will first be sequenced before further processing is performed (e.g., by router 164).

b) Router

Router 164 is responsible for determining to which one (or more than one) of multiple possible destination distributed computing systems that a given data transaction request received by routing subsystem 160 will be sent. As used herein, the destination distributed computing systems (also referred to as destination systems) may include at least one, or all, of systems 100, 170, and 180. In some examples, the routing decision that is made by router 164 will include the system from which the original data transaction request was received. Thus, for example, a data transaction request may be routed back to system 100 that initially received the data transaction request from client system 114 via order port 130. In other examples, the distributed computing system that communicated the data transaction request to the routing subsystem 160 will automatically be removed as a possible destination system that can be selected. The processing that is performed by router 164 may include processing incoming market data 169 to determine where the data message should be sent.

The market data 169 represents data feeds from other external data sources that may be involved and used to make a routing determination. This may include data feeds from any of the destination computing systems as well as other third-party data feeds (e.g., weather updates, traffic updates, etc.). It will be appreciated that the amount of data included in market data 169 may be substantial and represent thousands, millions, or even billions of messages during an operational period (e.g., a trading day, such as 930 to 4 or the like). The amount of data may represent gigabytes of data, with each message including updates being a few bytes in size. In some examples, the market data is stored in a continually updated data store that is part of the routing subsystem. This processing may also represent significant computational complexity in keeping the data up to date. As a very simple example, the data store may store the total number of open shares for a given ticker symbol. This number may be continually updated as messages for new orders, cancelations, and executions are communicated as part of market data 169 (which may be millions of messages per day). This data store may then be accessed, queried, or otherwise used when the router 164 is used to make a routing decision for a given data transaction request. It will also be appreciated that due to the nature of the routing decision (especially when complex routing strategies are used that contemplate multiple different variables), that the processing for making the routing determination may also be more than trivial.

c) Order Ports

Order ports 166 may be functionally similar (in at least some respects), or the same as, to order ports 130 of distributed processing system 100. Order ports 166 are responsible for initially receiving data messages that have been communicated to the routing subsystem 160. Messages that are received by order ports 166 are communicated to the rash engine 162 for sequencing and further processing. The order ports 166 may also handle communications back to the sending system (e.g., to provide acknowledgements, updates, and the like). Such external computing systems that communicate with the routing subsystem 160 via the order ports 166 may include distributed computing system 100 (as discussed herein), client systems 114, or second distributed computing system 170. Accordingly, routing subsystem 160 may be configured to receive, process, and route messages from a variety of different sources. For example, data transaction requests may be submitted by a client system to system 100. Such data transaction requests may then be sent to routing subsystem for routing. That same client system (or another computing system controlled by the same entity or the like) may also communicate and submit data messages for data transaction requests directly to routing subsystem for processing/routing.

In some examples, each separate instance of an order port 166 corresponds to a separate instance of the above discussed routing gateways 152. For example, 10 different order ports 166 may be provided for receiving data transaction requests that are sent from distributed computing system 100. The distributed processing system 100 may then be configured to similarly include 10 different routing gateways 152 that are responsible for sending data transaction requests (as discussed herein) to routing subsystem 160 for routing.

d) External Gateways

External gateways 168 are used for transmitting/routing data transaction requests to other destination systems for processing thereon. These may be similar in some respects to order ports 166, but instead of being the entry point for new requests, they are the exit point for requests that are transmitted to other systems. Like order ports, different instances of external gateways 168 may be responsible for communicating with different destination systems. Each gateway may maintain or keep track of those data transaction requests that have been routed to other destination systems. This may include storing an order, reference, or sequence identifier that is then used to lookup data regarding the same upon receipt of acknowledgements, status updates, or other messages concerning that transmitted data transaction request.

5) Distributed Computing System

Now details of the distributed computing system 100 will be discussed. It will be appreciated that the components and functionality provided by distributed computing system 100 may also be found in distributed computing systems 170 and/or 180 in certain examples. In some examples, the nature of how data transaction requests are handled by each of the distributed computing systems 100, 170, and 180 (or other such systems) may differ. For example, the matcher module 122 may be programmed differently between the various types of distributed computing systems. Furthermore, different architecture types may be used in connection with each of the different distributed computing systems to which the routing subsystem routes messages. For example, one distributed computing system may use a sequencer, and another distributed computing system may not include a sequencer.

The distributed computing system 100 may be configured to receive (and then process) different types of data transaction request messages. In some embodiments, the data transaction request messages that the distributed computing system 100 may process can include "managed data transaction request messages" and "unmanaged data transaction request messages" (which may also be referred to as "unmanaged orders," "native orders," "unmanaged/native orders," or native data transaction requests). As discussed herein, the distribution of processing load in connection with handling managed data transaction requests allows for the distributed computing system 100 to handle processing such requests in a more efficient manner than in other types of monolithic systems. Unmanaged orders include orders that tend to have less elaborate behaviors; for example, unmanaged orders may include orders such as market orders, limit orders, and immediate-or-cancel orders. In some examples, distributed computing system is programmed to handle data transaction requests that are associated with types of routing in a manner that may be similar or the same as a managed data transaction request. Thus, as discussed below, when a data transaction request includes a routing property, the distributed computing system 100 may be programmed to handle that request (e.g., the requested routing functionality) in a manner similar or the same as other managed data transaction request.

In certain example embodiments, distributed computing system 100 may receive an initial data transaction request and then use the details in that initial request to generate or create (or trigger/cause to be created or generated) so-called child data transaction requests that are then handled by the distributed computing system 100—either internally via matching engine 102 or by sending such requests to routing subsystem 160 for further processing (e.g., to be routed to other systems). These child orders may be similar or identical to the native data transaction requests mentioned above. Such child orders may be referred to as "child/native orders," "child data transaction requests," or similar. Other types of managed orders that can have complex behaviors include orders such as peg orders, discretion orders, and reserve orders. In some examples, the child orders that are caused be generated (e.g., via requests by system 100 from routing subsystem 160 or the like) may include further managed data transaction requests. In cases where the routing subsystem 160 communicates back to the system 100 (e.g., system 100 is the destination system 100), then it will be appreciated that there may be no explicit relationship between the initial parent request that caused the routing request, and the subsequent processing of the routed request that is handled by system 100. In other words, the system 100 may not "know" that the initial parent request is, in fact, related to a request received from the routing subsystem 160. In other examples, the system 100 may recognize such a relationship and store that association in, for example, the parent request data structure of the matching engine upon receipt/processing of the data transaction request that is received from the routing subsystem 160.

Distributed computing system 100 includes a plurality of processing instances 150 that send and/or receive, using a data subsystem 110, data messages to/from a matching engine 102. The data subsystem 110 includes a sequenced bus 111A for handling messages communicated from the matching engine 102 and a command bus 111B for handling messages communicated to the matching engine 102. Examples of different types of processing instances include outgoing data feed module 132, one or more order ports 130, Routing Gateway(s) 152, Routing Module 154, and other processing instances through instance N 156. Each of these components is discussed in greater detail below.

a) Matching Engine

The matching engine 102 (which may also be referred to as a "matching engine module" or similar) is a component of the distributed processing system that, among other functionality, may perform (e.g., executes operations to provide): 1) sequencing of messages, and/or 2) processing of received commands including match processing to determine when one order matches another order.

In some embodiments the matching engine 102 may include a sequencer module 120 (which may also be referred to as the "sequencer" or similar, and/or which may be described as performing a "sequencing process," "sequencer process" or similar) and a matcher module 122 (which may also be referred to as "the matcher," or as a "match processing module," "matching process module," or similar).

The sequencer module 120 is responsible for receiving messages via the command bus 111B of the data subsystem 110, sequencing those messages, and communicating sequenced versions of those messages back out on the sequenced bus 111A of the data subsystem 110. This type of architecture allows for higher levels of fault tolerance.

For ease of description in connection with the example embodiments described herein, messages that are communicated on the command bus 111B (e.g., to the matching engine 102) may be referred to as commands (e.g., a New Parent Request in FIG. 2A) and messages communicated via the sequenced bus 111A (e.g., from the matching engine 102/sequencer 120) may be referred to as messages (e.g., New Parent Message in FIG. 2A). Thus, commands that are to be processed by the matching engine 102 (or the sequencer 120 in connection with certain examples) are received via the command bus 111B and then may be transmitting/echoed back onto the sequenced bus 111A as messages, which have been sequenced by the sequencer module 120.

The messages communicated via the sequenced bus 111A may include a message sequence number that is used to indicate the relative ordering of the message with respect to other messages being handled within the distributed computing system 100. Different message sequence numbers may be generated for each message that is sequenced during an operational period of system 100. For example, the sequencer 120 may receive a command via the command bus 11B to add a new order; in response to that command, the sequence module 120 may generate a corresponding sequenced new order message, and then transmit that sequenced message via the sequenced bus 111A with a message sequence identifier.

The sequencer 120 may include functionality for maintaining a logical clock and annotating or otherwise creating messages that include a message sequence number or identifier that is generated from the logical clock that is maintained by the sequencer 120. Example implementations for sequencing messages and use of a logical clock within a distributed computing system are provided in connection with, for example, U.S. Pat. No. 9,712,606, the entire contents of which are hereby incorporated by reference. In some examples, the sequencer 120 may operate by incrementing/increasing a message sequence number (which may be a "global" message sequence number) for each message that it processes and/or transmits. For example, if the distributed computing system 100 has an operational period within specified hours on particular days, then the sequencer 120 may assign the number "1" to the first message that it sequences on a given day, and then may increment the message sequence number for each subsequent message that is processed on that day by one. Accordingly, as the sequenced messages are communicated out via the sequenced message bus 111A, the various modules in the distributed computing system 100 may be able to determine the order in which the messages were processed by the matching engine 102. This use of message sequence numbers can be used to ensure proper ordering of the messages within the entirety of distributed computing system 100. It also allows other modules (e.g., any of the modules shown in FIG. 1A and/or otherwise described herein) to know the order in which the messages arrived and/or were processed at the matching engine 102 and avoid processing messages out of order. This can be important because of the latency between the matching engine 102 and any other modules operating within the computing system 100. In other words, the matching engine 102 may be the only module that may be considered "current," with all other modules operating based on some unknown or variable delay. The delay may be due to network latency, cache hits or misses, or any other number of various factors that can affect how quickly data can be communicated between the matching engine 102 and any other module within the distributed computing system 100 (or other computing systems).

The matching engine 102 also includes a matcher module 122, one or more order books 124, and additional data store 126. The one or more order books 124 and the additional data store 126 may be stored in local data storage (e.g., memory devices 1506, such as cache memory, DRAM, etc.) or otherwise locally accessible to the matching engine. As used herein, locally accessible includes implementations that do not involve communicating over a data network to access data. Rather, such access is confined to the local hardware resources of the computing system that is performing the operations. Such local hardware resources include registers, cache memory (both on-die/on-chip memory and off-die/off-chip memory), and locally access storage devices that are accessible over internally physical busses of the computing device.

The order book 124 is a data structure that stores pending (e.g., unmanaged/native orders and child/native orders) data transaction requests. Each pending data transaction request may include one or more fields with values specified for some or all of the fields for a corresponding data transaction request. For example, each pending data transaction request may have one or more of the following fields: an order identifier, a listed value (also called a "list value," "list price," or "match value," "book value," "book price", "matching value" or similar—e.g., the price that has been assigned to this data transaction request at which the matching engine 102 will use to determine a match), a quantity value (e.g., how many shares of the security is being listed), a visible attribute, a timestamp, and others. In some embodiments, these pending data transaction requests are data transaction requests that have already been processed by the matching engine 102 (e.g., they have been placed into the order book 124).

Data transaction requests that have been placed in, and are stored in, the order book 124 may be referred to as "pending data transaction requests," "pending orders," "resting data transaction requests," "resting orders," or similar. The order book 124 may be organized as a dual or two-sided data structure that stores both data transaction requests for a first side (e.g., buy orders) and a second side (e.g., sell orders). The data structure may store each of the sides using different lists and/or other data structures as no (e.g., in an array, linked list, graph, binary search tree, and/or other data structure). In some embodiments, the lists may be sorted/ordered based on one or more criteria that includes, the price value of each order, the displayed/hidden value of each order, a timestamp (or a message sequence number) of each order, the quantity value of each value. For example, the lists may be sorted/ordered according to price/time (e.g., each list is sorted by price of the order, then time) or price/display/time, or price/quantity/time, or other combinations.

In some embodiments, a separate instance of the order book 124 may be allocated for each security (e.g., each ticker symbol or other identifier) that is traded or processed by the matching engine 102. Alternatively, or additionally, in some embodiments, multiple different orders books 124 of different types may be used for each of the individual securities processed by the matching engine 102, with the different order books 124 storing different types of orders therein and/or facilitating different types of processing by the matching engine 102. Examples of different types of order books include a continuous book (e.g., that is continuously updated throughout a trading day), an open or cross book, an auction book, and others.

In some embodiments, the matching engine 102 and/or the data subsystem 110 may operate with and/or include input and/or output modules that are designed to facilitate the messaging architecture herein. In some examples, the matching engine 102 includes such input and output modules. In other examples, the input and/or output modules are provided separately from the matching engine (e.g., they may be part of the data subsystem 110). An input module may receive, and process commands communicated via the command bus 111B before such commands are provided for processing by the matching engine and/or sequencer as discussed elsewhere herein. When messages are received, the input module may perform low level validation checks to ensure the message is properly formed and the like and then place the message into a buffer (as discussed below) for further processing by the matching engine 102. The output module may be configured for facilitating communication of the sequenced messages out onto the sequenced message bus 111A. In some embodiments, the output module may be responsible for annotating and/or generating a message sequence number (which is discussed below) to the message that is communicated over the sequenced message bus 111A. In some embodiments, the output module may include some or all of the functionality that is associated with the sequencer module 120. In some embodiments, these input and output modules may operate as separate computer processes, but share/have access to a common memory space with the computer process that is running the matching engine 102 (e.g., by using inter-process communication (IPC), such as by writing/reading from shared memory or using other IPC techniques). Accordingly, additional modules may be provided within the system 100 in order to provide the functionality discussed herein.

Among other operations, the matching engine 102 (or, in some embodiments, more specifically the matcher module 122) may perform match processing, which may involve comparing one or more data transaction requests against one or more contra-side data transaction requests to determine if one or more (full or partial) matches can be made. This match processing may involve comparing an incoming data transaction request against contra-side data transaction requests that are resting in the order book 124 to determine if there is a match. In some instances (depending on the characteristics of the incoming data transaction request), if there is no match, then the matching engine 102 may store the incoming data transaction request in the order book data structure 124 on the side indicated by the incoming data transaction request. Alternatively, or additionally, in some examples, this match processing may involve only resting data transaction requests; this may occur, for example, if the match processing is triggered based on a change in market data versus being triggered by an incoming data transaction request.

In addition to performing "match processing", in certain example embodiments, the matcher engine 102, may also perform other processing (e.g., other can matching) for received commands. For example, if a command is received for canceling a pending data transaction request, the matching engine 102 may perform processing that cancels the indicated data transaction request. Other examples of commands that may be processed by the matching engine 102 are discussed herein and in connection with the various figures.

In various embodiments, the distributed computing system 100 may be configured to process data transaction requests that are (or relate to) the following: market orders (e.g., an order that is specified by a data transaction request is willing to match against the best price on the contra-side of the order book); limit orders; requests to cancel existing/pending orders that are resting in the order book 124; requests to modify existing/pending orders that are resting in the order book 124; immediate or cancel (IOC) orders (which are canceled if no match is immediately found, instead of being placed into the order book 124); and/or other types of data transaction requests that relate to how the distributed computing system, or other systems such as 160, 170, or 180, has handled or is handling orders.

As described in further detail herein, multiple operations may be performed by the matching engine 102 (or other components) in an atomic manner—e.g., in response to reception of commands received via the command bus 111B. For example, the matching engine 102 may perform multiple operations for such commands in an atomic manner or may perform the operations "atomically." Processing that involves performing multiple operations atomically may also be referred to as performing an "atomic transaction" (e.g., the multiple operations are performed as an atomic transaction). In some embodiments, performing operations "atomically" means that there will be no other messages communicated from the matching engine 102, from the output module (discussed herein, but not shown in FIG. 1A), and/or over the sequenced message bus 111A that have message sequence numbers that are between/within the range of message sequence numbers used in connection with the messages generated for the operations being performed within the atomic transaction. In some embodiments (e.g., where multiple matching engine instances operate within the system 100) this may mean that other instances are "blocked" from communicating messages out over the sequenced message bus 111A until the messages associated with the atomic transaction have been communicated. Thus, for example, if operations being performed atomically result in five messages being generated, then there will be no messages communicated in connection with other operations (e.g., by the same matching engine instance or another instance of the matching engine) that have a message sequence number between the "first" message communicated and the "last" message communicated in connection with this atomic transaction.

Alternatively, or additionally, in some embodiments, performing operations atomically means that the matching engine 102 will not switch to performing operations for other commands that are to be processed by that matching engine 102 until all of the operations associated with or for a given command have been completed by the matching engine 102.

Processing of atomic transactions may ensure that, for example, once the matcher module 122 (or more generally the matching engine 102) has begun handling or processing data transaction request A, it will not block and switch to processing data transaction request B prior to completing the operations performed for data transaction request A. Such processing may also ensure that the stream of messages communicated via the sequenced message bus 111A of system 100 in connection with the atomically performed operations is, for example, sequential (e.g., there is no gap in messages communicated for atomically performed operations).

In some embodiments, other operations may be performed during atomically performed operations by, for example, other matching engine instances. However, the sequenced messages for such operations may not be communicated via the sequenced message bus 111A until the completion of an atomic transaction. Additionally, the above discussed input/output modules that work with the matching engine 102 (e.g., to process reception/transmission of messages), and/or other components of system 100 (e.g., data subsystem 110, processing instances 150, etc.) may perform operations during an atomic transaction.

In some embodiments, and even when there are multiple instances of a matching engine, the atomically performed operations in one instance may be atomic with respect to other instances in connection with how the message sequence numbers for the messages associated with those atomically performed operations are generated.

In certain examples, atomic processing of operations may be performed with respect to each matching engine 102 instance. In other words, a single instance of the matching engine 102 may be used to handle processing for multiple types of securities. In such a case, the atomic operations performed by that instance of the matching engine 102 may be with respect to all of the securities handled by that instance (with each security having its own order book for storing native orders therein).

The sequencer 120 and matcher module 122 may be implemented in different ways depending on implementation needs. For example, in some embodiments the sequencer 120 and matcher module 122 are implemented in separate threads or may be on the same thread within an example computer process. In some embodiments, the sequencer 120 and the matcher module 122 are included within the same computer process (e.g., the matching engine 102 operates as a single computer process that includes the functionality of the sequencer 120 and the matcher module 122). Such an implementation may be beneficial from a performance perspective as it may decrease the amount of time the system 100 needs to process new data transaction requests and take action to determine if newly received requests are matchable. This is because the matcher module 122 may operate on a message (e.g., a new data transaction request) in nearly the same instant that that message is sequenced by the sequencer 120. In some embodiments, the process of sequencing a newly received data transaction request message and then performing match processing for that request may be executed atomically by the matching engine 102.

In a variation on what is shown in FIG. 1A, in some embodiments, the sequencer 120 is implemented outside of the matching engine 102, as a separate module (e.g., as a separate computer process or a separate thread). In such an implementation, the matching engine 102 (and the matcher module 122) may receive sequenced messages that have been processed by the sequencer 120 via the sequenced bus 111A, in the same manner that other modules (e.g., processing instances 150) receive sequenced messages via the bus 111A. In other words, the sequencer 120 may receive messages (e.g., via command bus 111B as discussed herein), sequence those messages, and provide such sequenced messages for any interested modules (including the matching engine 102) via the sequenced bus 111A. In such an example, the matching engine 102 and/or matcher module 122 may be provided via one of the processing instances 150.

In some embodiments, the matching engine 102 may be physically co-located with the sequencer 120 on the same computing device or even use the same processor (or core) of a given computing device. This may decrease the latency between when the matching engine 102 receives messages from the sequencer 120 and can act on them (e.g., in comparison to a design where the matching engine 102 is not physically co-located). In other embodiments, the matching engine 102 may be deployed on separate computing hardware and receive messages from the sequencer 120 via, for example, an electronic data network. This design may enhance the speed or throughput at which messages are sequenced by the sequencer, with a trade-off with respect to the latency of when a matching process is performed by the matcher 122 for such messages.

In the example implementation shown in FIG. 1A, the sequencer 120 and the matcher 122 are implemented within the matching engine 102. In some places in this specification, the matching engine 102 will be referred to as a synecdoche for its constituent components (i.e., for the sequencer 120 and/or the matcher 122), and it should be understood that (a) whenever the matching engine 102 is described in this specification as performing operations such as sequencing messages or similar, such operations may be performed in some embodiments by the sequencer 120, and (b) whenever the matching engine 102 is described in this specification as performing operations such as match processing or similar, such operations may be performed in some embodiments by the matcher module 122.

In some embodiments, multiple matching engine 102 instances may be included in the distributed computing system 100. Each instance of matching engine 102 may be used to handle data transaction requests of a given type or types, and/or to handle data transaction requests for particular assets that are traded in the system 100. For example, in an instance where the system 100 is used to trade a set of securities, multiple matching engine 102 instances may be used, with each instance responsible for handling a subset (e.g., one or more, 10 or more, or possibly thousands of different securities—each having thousands or millions, or more transactions per day) of the set of securities. In connection with understanding the scope of system 100, each command that is communicated over the command bus 111B may be considered a "transaction" for purposes of understanding the architecture and/or scope of system 100.

System 100 may be designed to handle a large number of securities (e.g., thousands or tens of thousands), with each instance of the matching engine being tasked with handling the transactions that are associated with a subset of the total number of securities. In some instances, the matching engine instances may be balanced to handle a roughly similar number of transactions per day. Thus, for example, if the system is expected to handle 1 billion transactions per day, and 4 matching engine instances may be configured to such that approximately 250 million transactions are being handled by each instance of the matching engine. It will be understood, however, that the load balance between the instances of the matching engine may fluctuate as the number of transactions for a given security may vary from day to day. In some embodiments, all transactions concerning one security are handled by the same instance of the matching engine. Accordingly, one instance of the matching engine may be assigned fewer total securities than others (e.g., because those securities may tend to have more transactions associated with them—they are more active).

In certain examples, the matching engine 102 may be executed within its own virtual machine (e.g., a Java Virtual Machine (JVM) or the like) and/or virtual container. In some embodiments, multiple virtual machines (e.g., partitions or instances) may be executed on the same underlying physical computing resources (e.g., computing device 1300). For example, multiple JVMs (e.g., 2, 3, 4, or more) may be deployed to the same computing device 1300, with each virtual machine or container being used to execute a corresponding instance of the matching engine 102. In some embodiments, each core of a multi-core processor may be assigned to a given JVM (and the instance of the matching engine 102 that is executing therein).

In some embodiments, instances of the matching engine 102 may be deployed on an ad-hoc basis. For example, an instance of matching engine may be deployed within system 100 to handle an initial public offering (IPO) or other circumstances that could results in a very large amount of transaction being submitted a short amount of time. The system 100 described herein is designed accommodate such deployment scenarios and can thus be configured to meet periods of high demand.

In some embodiments, the matching engine 102 may treat unmanaged/native orders and child/native orders in the same manner when performing match processing. Whenever it is described herein that the matching engine 102 performs some operation/functionality with respect to a native order, it should be understood that, unless it is otherwise noted or should be apparent from the context, the matching engine 102 would treat a unmanaged/native order or a child/native order in the same way with respect to such operation/functionality (i.e., would perform such operation/functionality with a unmanaged/native order or a child/native order in the same manner). Further, when a data transaction request message (e.g., an OUCH message, a FIX message, or the like) is initially transmitted by one of the client systems 114 and received at one of the order ports 130 (discussed elsewhere herein), the fact that the data transaction request message may be categorized and processed by the distributed computing system 100 as a managed order (e.g., with a child order that is routed to another system) or an unmanaged order is entirely internal to the distributed computing system 100. In other words, the fact that the data transaction request message may be categorized and processed by the distributed computing system 100 as a managed order or an unmanaged order can be opaque to the client system 114. From the perspective of the client system 114, the client system 114 may only be "aware" that it transmitted, for example, an OUCH message to the distributed computing system 100.

In some examples, the matching engine 102 may perform processing in connection with handling how (at least partly) managed data transaction requests should be processed. For example, while the matching engine 102 may not "match" parent requests, the matching engine may store data regarding such requests in its data store 126. This data may be stored into a parent request data structure or the like. The data stored in this data structure may include: (a) identifiers of the managed requests and/or the Locate identifier for that managed request; (b) for a given managed request, identifiers of child/native data transactions requests associated with the managed request; (c) for a given managed request, data that identifies or is used to determine which processing instance will handle or manage at least some of the functionality associated with a managed request; (d) for a given managed request, data that identifies which of the processing instances 150 is the "owner" of the parent request; (e) parent request specific sequence numbers that are uniquely calculated/tracked/maintained per parent request and that are used by the processing instances 150 and the sequencer 120 to control which commands or messages sent by the processing instances 150 will be acted upon by the matching engine 102 (e.g., to avoid duplication of work/processing)—an example is a routing sequence number, which is discussed below; (f) for a given parent request, account or customer information to indicate which customer owns or is associated with the request; (g) a reference to the security that a given request is associated with; (h) how many shares are remaining for the request (e.g., order "leaves"); (i) number of shares canceled via AIQ (Anti-Internalization), (j) the side of the order book that the request is associated with (e.g., buy or sell), (k) time in force (threshold value for how long the request is to be active), (l) a pointer or reference into the order book data structure 124 to where at least one of the children associated with the associated parent request is located, (m) a Max Floor field that includes a value to indicate the quantity or number of shares that are to be displayed (e.g., in child orders) for the given parent request, (n) a number of order leaves that have be routed to an away system (e.g., the total quantity that has been routed out via the routing gateways 152—also called "routed shares", "routed quantity", or "away routed quantity" in certain examples), (o) reference to which one of the routing gateways 152 is being used to communicate with routing subsystem 160, and other fields. In some embodiments, every parent request is stored in the data store 126 in an object (e.g., a parent object or parent data structure) with one or more of the above attributes. As used herein, the collection of data that is stored in data store 126 that relates to parent requests may be referred to as a parent data store or a parent request data structure and individual entries (e.g., that are associated with a given parent request) may be referred to as "parent data."

As noted above, the matching engine 102 may maintain, on a per parent request basis, a routing sequence number. This sequence number is used to validate commands received from the routing module 154 and/or the routing gateway 152 (e.g., each time a data transaction request is rejected, accepted, or canceled). Each time a new command is received for a given parent request, the matching engine 102 will compare a provided sequence number in the command to the sequence number that is stored for that parent request in the parent request data structure. If the sequence numbers correspond (e.g., match), then the command is valid, if they do not then the command may be considered invalid and dropped. When such commands are processed, the matching engine 102 will increase (or otherwise modify) the stored routing sequence number (that is part of the parent data structure). The updated sequence number will then be included on sequenced data messages communicated from the matching engine 102. Then, when a command is communicated to the matching engine 102 it may include the sequence number that is "current" for the processing instance 150 that is sending the command. If the sequence number provided in the command does not correspond to the sequence number stored with the matching engine, it may indicate that the command is out of date and the command may be ignored or dropped by the matching engine 102.

b) Data Subsystem

Data subsystem 110 is used to facilitate communication between processing instances, processes, modules, and the like that are part of distributed computing system 100. Such communication is implemented via a sequenced message bus 111A and a command bus 111B. The data subsystem 110 may be an example of an electronic data network in certain example embodiments that may be implemented using different physical and logical communication technologies.

The sequenced message bus 111A communicates messages that have been sequenced by the sequencer 120. Accordingly, whenever a message is discussed herein as being communicated via the sequenced message bus 111A or the like, this also requires sequencing of the message by the sequencer 120 (e.g., using a logical clock or other clock to generate a message sequence identifier/number, annotate the message with that message sequence identifier/number, and then increase the message sequence identifier/number for the next message). Whenever a message is communicated on the sequenced bus 111A, any/all of the modules (e.g., any of processing instances 150) in the system 100 that are listening on the sequenced bus 111A will receive the message; and it is up to each module that received a message to determine if the message is relevant to the module and if it should take action/perform some operation in response to/based on the message.

As discussed herein, sequenced messages allow for a logical ordering of the state of the distributed computing system 100. In general, prior to a message being sequenced it is not considered to be "within" the distributed computing system 100. As an example, consider an implementation where a client system 114 transmits a message (via the order port 130) with data indicating whether a particular light is red, yellow, or green. Once the order port 130 receives the message, it will (a) communicate (e.g., via command bus 111B) the message to the sequencer 120 for processing or (b) generate a corresponding message in a format that is internal to/understood by the distributed computing system 100 and components within it, and then communicate (e.g., via command bus 111B) the corresponding message to the sequencer 120 for processing. In either case, the sequencer 120 will receive a message from the order port, sequence that message, and then communicate a sequenced message back out via the sequenced message bus 111A to be received by the order port 130 and/or other processing instances that are part of distributed computing system 100. With this type of implementation, a report for a color yellow light is not acknowledged by the system 100 (including, potentially, the order port that initially received the message) until a sequenced version of that message is communicated from the sequencer 120 back to the order port, and then back to the client system. Accordingly, for example, if the order port 130 crashes after sending the message to the sequencer, it may still resume functioning once the sequenced message for the yellow light is received (even though it may have no record of receiving such a message from a client system 114).

The command bus 111B of the data subsystem 110 is used by other modules (e.g., any of processing instances 150) to communicate messages to the matching engine 102 for sequencing. In general, messages that are communicated via the command bus are "Command" messages and may be referred to as Commands herein for ease of description. Thus, in the case of the traffic light example above, an Update Light Color Command could be communicated from the order port 130 to the matching engine 102 via the command bus when the light changes to yellow. In some embodiments, only the matching engine 102 will be able to listen and/or receive commands communicated on the command bus 111A. However, in other embodiments, other components of the system 100 may listen and potentially act upon such commands that are communicated using the command bus 111B.

It should be noted that different terms other than communicated may be used herein in connection with describing the communication of messages via the sequenced message bus 111A, the command bus 111B, or to/from the systems described herein. Other terms include sent/sending, transmitted/transmitting, received/receiving, submit, picked up, and the like. In some implementations, the communication of messages via the sequenced message bus 111A may be carried out by broadcasting or multicasting the messages. In other words, when broadcast, the messages are communicated to all destinations on the sequenced message bus 111A (or do not specify a specific destination). In some implementations, messages that are communicated from the matching engine may specify a specific destination (e.g., a specific processing instance). In some examples, the communication of messages may include guaranteed delivery (e.g., via TCP or other similar protocols) of such messages to a destination. In other examples, the communication of messages may not include a guarantee of delivery (e.g., via UDP) and may only refer to the process of communicating a message from a given component—irrespective of whether any other component receives that message.

Accordingly, in general (and except for external communications and for communication of messages performed via the command bus 111B), as related to the communications relevant to the description herein, modules within the distributed computing system 100 receive and operate based on messages that are communicated from the matching engine 102 (or more specifically the sequencer 120 in certain examples) via the sequenced message bus 111A.

However, in some embodiments, other, non-sequenced data may also be communicated to the modules within the distributed computing system. For example, the incoming data feed 116 may be a separate part of the data subsystem 110 that communicates data to the modules in the distributed computing system 100. In some examples, market data 169 is a type of incoming data feed 116. Due to the quantity of messages included in this feed, a separate messaging bus may be used to communicate market data messages to one or more components of system 100. As noted herein (e.g., in discussion with FIG. 1B), such data may be used by, for example, the routing module, to make a routing decision for where a given data transaction request should be transmitted to for processing. In other embodiments, data (or certain data) from the incoming data feed 116 may be sequenced.

c) Processing Instances

Turning now more specifically to the processing instances 150, the distributed computing system 100 includes a plurality of processing instances 150 (which may also be referred to as "processing modules" or similar herein) that are distributed across computing nodes of the distributed computing system 100. Each processing instance includes program logic (e.g., in the form of software code, firmware, and/or hardware) that is used to process data, or otherwise provide the indicated functionality within the given processing instance. Any or all of the matching engine 102 (which may be considered a special type of processing instance as it includes the sequencer 120), one or more order ports 130, outgoing data feed module 132, routing gateways 152, routing module 154, are examples of different types of processing instances that can be implemented, hosted, and/or executed by the distributed computing system 100 in some embodiments.

Each of the various processing instances may be implemented in different ways—e.g., to take into account design considerations of the distributed computing system 100 and/or the task(s) a given processing instance is designed to perform. For example, in some embodiments, one or more processing instances may be implemented in the form of a software application (e.g., an .exe or a daemon computer process) that, when instantiated and executed, runs with its own computer process space using the underlying computing resources (e.g., processor(s), memories, and/or other hardware resources) of the distributed computing system 100. Alternatively, or additionally, in some embodiments, different ones of the processing instances may be different threads or other sub-processes within a given computer process. In some embodiments, each, any, or all of the processing instances may be implemented by using a virtualized container or more full virtualized system. For example, each processing instance may be its own Docker container. Each virtual container may include the program logic that, when executed, carries out the tasks associated with that specific processing instance. Alternatively, or additionally, in some embodiments, each, any, or all of the processing instances may be implemented as field programmable gate arrays (FPGAs) or Application Specific Integrated Circuits (ASICs). Alternatively, or additionally, in some embodiments, a variety of the various approaches noted above for implementing these processing instances may be used; e.g., one processing instance may be implemented using a Docker container, another may be implemented as a software application that is running in a non-virtualized environment, and another may be implemented in the form of an FPGA. Accordingly, the techniques herein may be flexibly employed depending on the needs of a particular implementation for a distributed computing system and/or electronic trading platform.

In general, functionality that is provided in the processing instances 150 is that which is separate from that provided by the matching engine 102. The processing instances and matching engine then communicate using the Data Subsystem 110. With this architecture, the processing instances 150 are able to provide additional, sometimes complex, functionality while allow the processing that is performed by the matching engine 102 to fast, efficient, and/or maintainable. For example, the logic for handling how orders are to be routed (e.g., which may be more complex in terms of rules or processing than unmanaged/native orders) is able to reside within routing module 154, while having other processing (e.g., potentially less complex processing, which may include logic for processing unmanaged/native orders) reside in the matching engine 102.

In addition to the functional processing performed by each of the processing instances, any or all of the processing instances may have their own local data store 140 (which, when specific to a given one of these instances, are referenced as 140A, 140B, 140C, 140D, 140N herein) that are accessible in local memory of the computing resources on which these instances are executing (e.g., memory that is accessible without using network resources). In general, these data stores are updated based on sequenced messages received from the sequenced bus. As a simple example, order port 130 (discussed below) may include a local data structure that stores the status of each order associated with that order port. However, the status of the orders will not be updated upon receipt of new requests from client system 114. Rather, the status for such orders will be updated upon receipt of sequence messages that indicate such updates. Additional details of individual ones of the data stores in connection with specific ones of the processing instances are also described below.

i. Order Ports

When a data transaction request message is received at the distributed computing system 100 (e.g., from client system 114), it may be received at one of the order ports 130. Order ports 130 are examples of processing instances 150 and also an example of a processing instance that communicates with computing systems that are external to system 100. In some examples, the protocol that is used for the communication of such external messages is OUCH.

OUCH is a messaging protocol that can be used to communicate with certain example electronic trading platforms, including system 100. In certain instances, this protocol allows customers, via client systems 114, to submit messages (OUCH messages) that include data transaction requests and also receive status updates on previously submitted requests (e.g., that the message was received and is being or has been processed by the platform). In some examples, handling of OUCH messages (reception and/or transmission) may be performed by a FPGA (e.g., the functionality of order port 130 may be provided via an FPGA).

Once a new data message is received from a client system 114, then the order port 130 may perform validation processing (e.g., to validate the values in the fields of the received message) and then generate a further message in another format that is internal to the distributed computing system 100 (e.g., by taking the received data transaction request message and modifying it or generating a new data transaction request message). In addition, the order port 130 may perform processing that includes determine what type of message should be generated, annotating the generated message with additional data (e.g., that was not expressly included in the received request). In some examples, the type of message that is generated and communicated to the matching engine is based on one or more value or properties of the received message. For example, if the received message includes a routing attribute or strategy, then the order port may be configured to treat that request as a managed order request and correspondingly generate and transmit (as shown in FIG. 2A) a new parent request to the matching engine 102 for processing thereon.

Different communication technologies may be used for the communication of messages between client system 114 and order ports 130. In some embodiments, communication from client systems 114 may occur via a network connection in which the client system 114 establishes a socket or similar connection to the order port 130 (e.g., via the Internet or other network). In some embodiments, the connection between client systems 114 and the order port 130 may be more direct; for example, the client system 114 may be directly connected via a cross-connect cable (or similar) to the computing resource that is hosting the order port 130. In some embodiments, communication between order port 130 and client system 114 may occur via a message queue or the like where a dedicated space of memory or the like is used to write incoming message and a dedicated space of memory is used to write outgoing messages. In some embodiments, client systems may be computing nodes in a cloud-based computer system and may communicate with order nodes in the cloud-based computer system that makeup system 100. Accordingly, it should be appreciated that different communication techniques between client systems 114 and order port 130 are contemplated in connection with use of distributed computing system 100 by client systems 114.

In some embodiments, each client of the distributed computing system 100 may have their own order port 130 that is dedicated to handling requests from that client. For example, a client may have multiple different client computer systems that each communicate with distributed computing system 100 via a dedicated order port that that specific client. Each of the order port modules 130 may be separated logically and/or physically, and/or may be executed in separate computer processes (e.g., within separate processing instances). The order port modules 130 may include a number of different types of order ports. For example, one type of order port may only handle unmanaged/native data transaction requests (i.e., not managed data transaction requests) and another may handle managed data transaction requests.

An example of an order port is an OUCH port that handles sending and/or transmitting OUCH messages to/from client systems 114. In some implementations, the order ports 130 referred to herein may be called "order entry gateways" or "gateways" and may be used in a manner that is the same or similar to that discussed in connection with the order port 130 that is described herein. In some embodiments, one or more of the order ports may be called "FIX gateways" and may be programmed to handle protocol messages that use the FIX message protocol. In some embodiments, the order ports of the system 100 may support multiple different types of messaging protocols (such as FIX and OUCH), which may allow for multiple different message protocols to be used when communicating to/from system 100. In some embodiments, different order ports may be used to support such different types of messaging protocols. In some embodiments, the same order port may support such different types of messaging protocols.

For ease of description of the technical features described herein, the term "gateway" is used to refer to outgoing data messages from the subject system (e.g., routing gateways

152 or external gateways 168) while the term "order port" is used to refer to data messages that are incoming to the subject system. But, consistent with the above explanation, in some instances the terms gateway and order port may be used in contexts different from this strict understanding.

ii. Outgoing Data Feed Module

Another type of processing instance is the outgoing data feed module 132 that is used to communicate (by sending, receiving, or both sending and receiving) messages to external systems via the outgoing data feed 112. The outgoing data feed module 132 may transmit and/or receive data as a data feed, and/or via using one or more protocols such as the ITCH protocol. Some of the information transmitted over this data feed may be updates regarding changes to the order book 124, which will be described in further detail below, actions performed by the matching engine 102, or actions performed by other components of system 100 (or external). The outgoing data feed module 132 may have a local data store 140A that stores data relevant to the processing performed by the outgoing data feed module 132. The outgoing data feed module 132 may, for any or all of the messages that are communicated via the sequenced message bus 111A (including those discussed elsewhere herein), generate and transmit a corresponding message via the outgoing data feed 112. The message that is generated and transmitted in this manner may have less information than the message received from the sequenced message bus (e.g., data related to certain fields may not be included in the message communicated from the outgoing data feed module 132), may have additional information that was not included in the message received from the sequenced message bus (e.g., such information may instead be derived from the local data store 140A), or may contain the same information provided via messages received via the sequenced message bus.

It will be appreciated that due to the architecture of system 100 that multiple processing instances may respond and/or act based on the same message that has been communicated over the sequenced message bus. For example, an execution message may cause an order port 130 to report a message back to a client system 114 and that same execution message may cause the outgoing data feed module 132 to generate a transmit an execution message for the outgoing data feed 112 (e.g., to be received by third-party computer systems).

iii. Incoming Data Feed Module

Incoming data feed module 156 a type of processing instance that is responsible for handling incoming data messages from externally sourced data feeds including incoming data feed 116. Incoming data feeds may include market data (e.g., 169) from these other electronic trading platforms, data regarding the current national best bid and offer (NBBO), and/or similar data. In some examples, the data received by the data messages is communicated to the matching engine 102 for sequencing. In other examples, such data is not provided to matching engine for sequencing. It will be appreciated that the quantity of data messages, especially market data, that may be included such externally sourced data feeds can be substantial. This may include gigabytes or terabytes of data and millions or billions of messages per day. Due to the large amount of processing resources that may need to be dedicated to processing, for example, market data, the functionality associated with such processing may be split off into a separate system that will not adversely impact to the processing speed of, for example, the matching engine 102 or system 100. Accordingly, in certain examples (and as discussed further in connection with routing subsystem 160 herein), market data 169 may only be provided to routing subsystem 160 for processing (e.g., to make routing decisions) and may not entirely be provided to system 100.

iv. Routing Module

Routing Module 154 is a type of processing instance 150 that is the owner of parent requests that are received (or classified as such) by system 100 that include or are associated with a routing strategy. Routing module 154 includes a local data store that is used to track data on parent requests for which the routing module 154 is the owner, any child requests of such parent requests, and data on the routing gateways that are used to communicate data messages to the routing subsystem 160. Data that is stored for each of the routing gateways may include the total number of data transaction requests for which that given gateway is responsible for, the total open orders handled by that gateway, and/or whether there is any hard or soft alpha-split for how the routing gateways are allocated. For example, a given routing gateway may be assigned to handle all data transaction requests that are for ticker symbols that start with the letter "a." The information stored in data store 140D may be kept up to date based on sequenced data messages that are communicated from the matching engine regarding routing gateways activity (e.g., Gateway Request Message 238, Gateway Accept Message 260, etc.)

In some examples, data transaction request messages that are received by system 100 may include a routing attribute or value that indicates how the data transaction request messages should be routed. In other examples, such attribute information may be added to the data transaction request message upon being received by the distributed computing system (e.g., by order port 130). In some instances, the specification of a routing attribute in a data transaction request message may cause the distributed computing system to treat the data transaction request message as a managed data transaction request message.

In general, once the routing module 154 receives an indication that it is now responsible for a specified parent request (e.g., 228 from FIG. 2A), it is then the responsibility of the routing module 154 to determine how child requests for that parent request are to be generated and handled—whether locally by the matching engine 102 or forwarded to routing subsystem 160. As discussed in connection with the drawings herein, depending on the particular routing strategy and/or programmed functionality of the routing module 154, different types of messages may be used to generate local child data transaction requests and/or requests that are to be communicated via routing gateways 152 to routing subsystem 160.

When routing module 154 determines that a data transaction request should be sent to routing subsystem 160 for routing, routing module 154 will also perform a selection process to select one of the multiple possible routing gateways 152 that are available to system 100.

The selection process for selecting one of the routing gateways 152 may include performing a process that load balances between the available routing gateways 152. The criteria used in selecting one of the gateways may be based on the information stored in the local data store. info The routing module 154 is also responsible for determining how follow-on requests (e.g., modification, cancelations, etc.) for an already submitted data transaction requests are to be handled. As noted herein, the matching engine may include some processing logic (e.g., in connection with cancelation requests). However, in certain examples, most of the programmed functionality for how such requests are handled is separated into routing module 154. This type of implementation advantageously allows for separation of responsibilities between the matching engine 102 and the routing module 154 as more complex decision making, or "edge" cases, can be handled in a more efficient manner by the routing module 154.

With this type of architecture, the routing module 154 can translate a and manage a data transaction request that is initially received by the distributed computing system, even after the data transaction request is routed to another distributed computing system via the routing subsystem 160. This allows the distributed computing system to be responsible for managing communications back to the client system 114 that initially submitted the data transaction request for processing.

v. Routing Gateway

Routing gateway 152 is a processing instance 150 that is responsible for handling, maintaining, and communicating data transaction requests to/from routing subsystem 160. When a data transaction request is communicated to the routing subsystem 160, it is referred to herein as an "away data transaction request", an "away request", an "away order", or similar. Note that in some instances, an away request may be routed (via the routing subsystem 160) back to the system 100. In such cases, the away request may still be considered an away request—even though it is being handled by the same "system" (e.g., 100) that is also handling the parent request.

As discussed herein, there may be multiple instances of the routing gateway 152 that operate within system 100. Each instance of routing gateway 152 may be referred to as a gateway or a "gateway instance" herein. With each gateway instance handling a subset of all of the data transaction requests that are communicated to routing subsystem 160. As an illustrative example, there may be 26 different instances of routing gateway 152, with each instance handling ticker symbols that start with a different letter (and possibly 10 additional instances for those that start with numbers). In other examples, data transaction requests that are being communicated to routing subsystem 160 may be dynamically allocated to one of the operating routing gateways 152. The selection of which one of the operating gateways to use may be made by the routing module 154. In other examples, the matching engine or another processing instance may be responsible for selecting one of the routing gateways.

In some examples, each instance of the routing gateway 152 may correspond to a separate physical communication link or separate communication channel to an order port 166 of routing subsystem 160. As one illustrative example, each routing gateway 152 may correspond to its own physical port (e.g., network interface device 1300). As another example, each routing gateway 152 may correspond to its own logical port (e.g., a port used by the TCP/IP stack). In Various other different types of networking implementations are also contemplated.

Each Routing Gateway 152 also includes its own data store 140C that stores data on any away request that is currently being processed or handled by that respective routing gateway 152. The information stored within each routing gateway may include a sequence number that acts as a transaction identifier for a given gateway and/or each data transaction request that his handled by that gateway. This identifier is unique and increases with each successive message that is communicated from a given gateway and/or data transaction of that gateway.

For example, suppose there are 5 gateways (A, B, C, D, E), each time a request is handled by a given gateway (e.g., to enter a new order), that request is now associated with that given gateway and will remain associated with that gateway throughout the lifetime of that request. Thus, for example, when messages are received from the routing system 160 for that request (e.g., a cancelation or execution), that same gateway will be used in connection with delivering and handling the message. The sequence number that is stored locally with the gateway may be unique per request and acts as a sequence number for messages related to that request. The use of the sequence number allows the routing gateway 152 and/or the routing system 160 to know the ordering of messages. And allows for ignoring any messages that have a lower sequence number than the last processed sequence number that is stored in data store 140C.

In some examples, data store 140C may also store parent related information (e.g., the parentID) and any other child data for that parent. Data store 140C may also store a total number of leaves for each parent request (e.g., how many total shares are associated with one or more away request(s)). As discussed in greater detail below, this information may be updated upon receipt of message from the sequenced message bus 111A, the routing subsystem 160 (e.g., via an OUCH message), and/or a combination thereof.

When an away data transaction request is submitted to the routing subsystem 160 for routing, it is the responsibility of the routing gateway 152 to maintain or monitor the connection for that request. As noted above, this connection may allow for updates or other messages related to the communicated away data transaction request to be received over the same routing gateway 152 and then communicated from the routing gateway 152 to the matching engine 102 for sequencing and further processing by system 100.

vi. Additional Details of Processing Instances

Multiple instances of the same type of processing instance (including the matching engine 120) may be implemented within the system 100 according to certain example embodiments. It will also be appreciated that each processing instance that is implemented within system 100 may be configured to setup to perform a specific task or provide specific functionality within the system 100. Thus, different processing instances may be configured to, and perform, different operations depending on functionality desired for the system 100.

The sequencer 120 and matcher module 122 may be implemented in different ways depending on implementation needs. For example, in some embodiments the sequencer 120 and matcher module 122 are implemented in separate threads or may be on the same thread within an example computer process. In some embodiments, the sequencer 120 and the matcher module 122 are included within the same computer process (e.g., the matching engine 102 operates as a single computer process that includes the functionality of the sequencer 120 and the matcher module 122). Such an implementation may be beneficial from a performance perspective as it may decrease the amount of time the system 100 needs to process new data transaction requests and take action to determine if newly received requests are matchable. This is because the matcher module 122 may operate on a message (e.g., a new data transaction request) in nearly the same instant that that message is sequenced by the sequencer 120. In some embodiments, the process of sequencing a newly received data transaction request message and then performing match processing for that request may be executed atomically by the matching engine 102.

In a variation on what is shown in FIG. 1A, in some embodiments, the sequencer 120 is implemented outside of the matching engine 102, as a separate module (e.g., as a separate computer process or a separate thread). In such an implementation, the matching engine 102 (and the matcher module 122) may receive sequenced messages that have been processed by the sequencer 120 via the sequenced bus 111A, in the same manner that other modules (e.g., processing instances 150) receive sequenced messages via the bus 111A. In other words, the sequencer 120 may receive messages (e.g., via command bus 111B as discussed herein), sequence those messages, and provide such sequenced messages for any interested modules (including the matching engine 102) via the sequenced bus 111A.

In some embodiments, the matching engine 102 may be physically co-located with the sequencer 120 on the same computing device or even use the same processor (or core) of a given computing device. This may decrease the latency between when the matching engine 102 receives messages from the sequencer 120 and can act on them (e.g., in comparison to a design where the matching engine 102 is not physically co-located). In other embodiments, the matching engine 102 may be deployed on separate computing hardware and receive messages from the sequencer 120 via, for example, a physical network or other communications technology (e.g., cross-connect cables, fiber backplane or other technologies that allow different computing systems or the like to communicate within the same or different data centers). This design may enhance the speed or throughput at which messages are sequenced by the sequencer, with a trade-off with respect to the latency of when a matching process is performed by the matcher 122.

In the example implementation shown in FIG. 1A, the sequencer 120 and the matcher 122 are implemented within the matching engine 102 (e.g., the same computer process). In some places in this specification, the matching engine 102 will be referred to as a synecdoche for its constituent components (i.e., for the sequencer 120 and/or the matcher 122), and it should be understood that (a) whenever the matching engine 102 is described in this specification as performing operations such as sequencing messages or similar, such operations may be performed in some embodiments by the sequencer 120, and (b) whenever the matching engine 102 is described in this specification as performing operations such as match processing or similar, such operations may be performed in some embodiments by the matcher module 122.

In some embodiments, multiple matching engine 102 instances may be included in the distributed computing system 100. Each instance of matching engine 102 may be used to handle data transaction requests of a given type or types, and/or to handle data transaction requests for particular assets that are traded in the system 100. For example, in an instance where the system 100 is used to trade a set of securities, multiple matching engine 102 instances may be used, with each instance responsible for handling a subset (e.g., one or more, 10 or more, or possibly thousands of different securities—each having thousands or millions, or more transactions per day) of the set of securities. In connection with understanding the scope of system 100, each command that is communicated over the command bus 111B (e.g., a command to generate a new parent request, a command to modify a native order, a command cancel a parent request, the other commands noted herein, and others) may be considered a "transaction" for purposes of understanding the architecture and/or scope of system 100.

System 100 may be designed to handle a large number of securities (e.g., thousands or tens of thousands), with each instance of the matching engine being tasked with handling the transactions that are associated with a subset of the total number of securities. In some instances, the matching engine instances may be balanced to handle a roughly similar number of transactions per day. Thus, for example, if the system is expected to handle 1 billion transactions per day, and 4 matching engine instances may be configured to such that approximately 250 million transactions are being handled by each instance of the matching engine. It will be understood, however, that the load balance between the instances of the matching engine may fluctuate as the number of transactions for a given security may vary from day to day. In some embodiments, all transactions concerning one security are handled by the same instance of the matching engine. Accordingly, one instance of the matching engine 102 may be assigned fewer total securities than others (e.g., because those securities may tend to have more transactions associated with them—they are more active).

As noted herein, the matching engine 102 may be executed within its own virtual machine and/or virtual container. For example, by using a Java Virtual Machine (JVM) or the like. In some embodiments, multiple virtual machines (e.g., partitions or instances) may be executed on the same underlying physical computing resources (e.g., computing device 1500). For example, multiple JVMs (e.g., 2, 3, 4, or more) may be deployed to the same computing device 1500, with each virtual machine or container being used to execute a corresponding instance of the matching engine 102. In some embodiments, each core of a multi-core processor may be assigned to a given JVM (and the instance of the matching engine 102 that is executing therein).

In some embodiments, instances of the matching engine 102 may be deployed on an ad-hoc basis. For example, an instance of matching engine may be deployed within system 100 to handle an initial public offering (IPO) or other circumstances that could results in a very large amount of transaction being submitted a short amount of time. The system 100 described herein is designed accommodate such deployment scenarios and can thus be configured to meet periods of high demand.

6) Additional Details of Distributed Computing System

Although not shown in FIG. 1A, the distributed computing system 100 may also include backup processing instances that may host or be configured to host any or all of the matching engine 102, sequencer module 120, matcher module 122, processing instances 150, order ports 130, outgoing data feed 132, or any other component or module that is executing within the distributed computing systems 100. In some embodiments, a backup matching engine is executing in parallel with a "primary" matching engine 102. In case of failure of the primary, the backup may automatically take over and continue processing. Other types of modules that may, in some embodiments, be included in the distributed computing system 100 and that are not shown in FIG. 1A include modules that handle routing to external electronic trading platforms, and/or other types of modules or computing systems.

The distributed computing system 100 may be composed of one or more computing nodes. In some embodiments, the one or more computing nodes may be implemented using the example computing device of FIG. 15. Each computing node includes its own computing resources (e.g., hardware components such as electronic memory or storage, input/output (I/O), hardware processors, and the like). In some embodiments, the computing nodes that comprise the distributed computing system 100 may be referred to herein as the "computing resources" of the distributed computing system 100.

In connection with the features discussed herein, whenever it is described that a native order (whether a child/native or unmanaged/native, or quantity from such an order) is "canceled," "removed", "canceled down", or similar, the distributed computing system 100 (e.g., the matching engine 102, processing instance 150, etc.) may perform "cancelation processing" or "cancel processing." In some embodiments, cancellation processing may also be applied to the cancelation of parent requests and other data. Such cancelation processing includes modifying or deleting data from memory (e.g., 1304) of the computing resources storing or otherwise using the data of the element that is being canceled. For example, if a native order is resting in order book 124 and that corresponding native order is canceled in connection with a cancelation request, then the matching engine 102 may perform cancelation processing by, for example, deleting the data for that native order from order book that is stored in the memory of the computing resources on which the matching engine 102 is operating. In certain instances, cancelation processing may involve modifying the value of a field of a native order. For example, if a request includes the cancelation of a certain quantity from a native order (e.g., a partial cancelation), then the cancelation processing that is performed may include modifying the quantity field of the native order to carry out that cancelation request (e.g., changing the value of the quantity field from 200 to 100 if the request is to cancel 100). As another example, if an IOC order is received and a match is not found, then the data for that IOC order may be subject to cancelation processing by having, for example, the data marked as being canceled in the memory of the computing resources on which the matching engine 102 is operating. Techniques that may be used to carry out cancelation processing may include: (a) modifying a value of a field (e.g., the quantity field of a native order), (b) marking data as being deleted (e.g., by changing the value for a "deleted" bit field in an object that is storing the data to be true or the like), (c) overwriting data with other data, or (d) otherwise causing the data that is stored within computing resources of the distributed computing system 100 to be modified such that it is understood by the distributed computing system 100 (or components thereof, such as the matching engine 102 or processing instance 150) that the element (whether a native order, a parent request, or the like), or data thereof, has now been canceled.

As discussed in connection with some of the examples described below, cancelation processing may include communicating, via the routing subsystem 160, requests to cancel any away data transaction requests. It will be appreciated that the cancelation processing performed on those destination systems may be different from that performed on system 100.

In some examples, the distributed computing system 100 (e.g., the matching engine 102, processing instances 150, etc.) may perform "cleanup processing" that includes resetting or cleaning the state of the computing resources on which the functionality of the distributed computing system 100 is operating. For example, in cleaning up the state of the parent data structure when a parent request is canceled, removed, or otherwise deleted, cleanup processing may be performed. Cleanup processing can include: (a) setting a pointer to null or updating a pointer that pointed to a data structure(s) to no longer do so, (b) performing garbage collection, (c) freeing up memory corresponding to and/or associated with data that has been canceled (e.g., such as a native order that has been canceled), (d) deleting data (or an index to data), (e) overwriting data (e.g., overwriting data to all 0s) and the like. As an example of cleanup processing, if a data transaction request has been fully matched, then the distributed computing system 100 may perform cleanup processing for that data transaction request to remove it from the distributed computing system 100.

In some examples, data that is subject to cancelation processing may also be subject to cleanup processing as computing resources are available to handle such processing. For example, data for a native order may be marked as canceled (e.g., by setting bit in memory for that native order that it has been canceled) during cancelation processing and then overwritten with 0s during cleanup processing that is subsequently performed. As another example, if the quantity field for a native order is set to 0 (as a result of the above cancelation processing or being fully executed as a result of a match), then the cleanup processing may perform cleanup processing on the memory that had been allocated to that native order. Cleanup processing may also be performed in connection with the parent request data structure, data store 126, and other data locally stored in connection with processing instances other than the matching engine. Cleanup processing may be performed automatically (e.g., without being based on messages from external computing systems or manual prompts) by components (e.g., matching engine 102, processing instances 150, etc.) of system 100.

In some example, system 100 may be configured to handle: 1) parent requests that result in away data transaction requests (as described below), 2) parent requests that are associated with other types of managed data transaction requests, and/or 3) native data transaction requests without a parent request. Native data transaction requests associated with parent requests and those without parent requests may be processed and match against one another, and may be stored within the same order book. The described architecture for system 100 (and 50) thus allows for flexible handling many different functionality, will also maintaining the throughput metrics of less flexible systems (e.g., those that cannot handle the routing techniques described herein and the like).

Description of FIG. 1B

FIG. 1B is another example implementation of a system that includes multiple distributed computing systems where functionality of the routing system 160 of FIG. 1A is provided within system 100 (which is represented as system 190 in the Example shown in FIG. 1A) according to some embodiments.

More specifically, in this example implementation, market data 169 is directly provided to system 190 and routing module 194 thereof. The market data included in 169 is used to generate a local data store 140D2 that, for example, represents a "state" of each potential destination system. As new updates from each system are received via market data feed 169, the routing module 194 updates the local data store 140D2 to thereby generate a new, updated stated of the corresponding destination system. This updated state may then be used when a routing decision is being made for a given data transaction request.

The gateways 192 of system 190 operate by communicating directly with other destination systems (system 170 or system 180). In some examples, each (or multiple such gateways) may be dedicated to communicating requests to specific destination systems. The gateways 192 may store connection details or other such information in local data store 140C2.

In operation, the routing module 192 may be configured to perform a routing determination based on: 1) a routing strategy specified in a newly received data transaction request; 2) one or more other properties of that request; and/or 3) the current state (as represented in data store 140D2) of each potential destination system.

Upon making a decision as to which destination system is to receive the request, the routing module may generate and transmit a command to the matching engine that causes a specified routing gateway (or any routing gateway) to generate and submit a data transaction request to the specified system. As with the messages discussed in connection with the following Figures, this may be, for example, an OUCH message or other type of protocol (e.g., a FIX message).

In other examples, the routing decision may be performed in a processing instance that is separate from management/handling of the parent request in question. This type of implementation may allow for further distribution of processing load as, in some examples, the processing load for performing routing decisions can be substantial. Thus, for example, instead of the routing module 194 triggering a gateway request for a gateway, the routing module 194 may instead send a message that triggers another of processing instances 150 to perform a routing determination. This other processing instance may then send a gateway message (with the selected gateway and/or destination system) that causes a request to be routed to a destination system. Other variations for how the routing functionality that is provided via the routing subsystem 160 may be incorporated into the processing instance architecture of system 100 are also possible.

Description of FIGS. 2A-2B

FIGS. 2A-2B are sequence diagrams that show a process by which, in some embodiments, data transaction requests are received by distributed computing system 100 and then routed, via routing subsystem 160, to a destination distributed computing system (e.g., distributed computing systems 170 or 180, or even back to system 100). As will be described in further detail below, some of the Figures discussed herein describe operations that occur before or after receiving a new data transaction request and routing it to another destination as is described in FIGS. 2A-2B.

At 220, the client system 114 sends an electronic data message to the distributed computing system 100, and the message is received by the order port 130 of the distributed computing system 100. The message may include a data transaction request. In some embodiments, this communication from the client system to the order port is performed using one or more a communication protocols. In some embodiments, the communication protocol is the OUCH protocol. In some embodiments, the FIX protocol may be used. In some embodiments, the SOUP protocol, or other protocols (e.g., transport layer protocols, such as TCP, and the like) may be used to facilitate delivery of messages to/from order port 130 that are in the OUCH (or FIX) message format.

The message communicated may include tens or hundreds of different fields that each include values/attributes. Example fields may include, a ticker symbol, quantity, price, client identifier, routing strategy (discussed in greater detail herein), and many others. It will be appreciated that thousands or millions of such messages may be communicated during a given operational period (e.g., a trading day or the like). And, for each message, order port 130 may be responsible for initially handling how the message will be processed by system 100 (and matching engine 102). Given the quantity of such messages, it will be appreciated that the processing performed by the order port 130 may be designed to handle such volume.

The order port 130 that receives the message may be dedicated for the client on whose behalf the client system 114 operates. The message may include details of a new order that the client is submitting and may include values for one or more fields for the new order. For example, data values in the message (e.g., one or more fields) may specify a routing strategy (which may be expressed, as one non-limiting example, as a 4-character string or the like) that will be used to determine how the data transaction request should be handled. As discussed in greater detail herein, the determination of how a given message should/will be handled may be performed by the order port 130, the matching engine 102, the routing module 154, the routing subsystem 160, or any combination thereof.

At 222, the order port 130 processes the received message. The processing at 222 may include determining what type of data transaction request (or what properties/attributes are included in the data transaction request) has been communicated from the client system 114. As noted herein, different types of requests can be communicated from client system(s) 114. For example, the processing at 222 may include determining that a routing strategy has been provided as part of the data transaction request. The processing may then include determining what type of request has been communicated. For example, the message may include a request to cancel an existing order, modify an existing order, cancel an existing order, add/create a new order, or otherwise handle an order (whether new or existing).

The processing performed at 222 may include determining what type of message (a command) is generated by the order port 130 that is then communicated to the matching engine 102 over the command bus 111B. In the case of when a new request message includes a routing strategy, the order port 130 may automatically determine that the type of command to be communicated to the matching engine 102 should be a New Parent Request Command. More specifically, when a new data transaction request is received from a client system 114 and includes valid routing strategy attribute, the distributed system 100 (the order port 130) may be configured to treat such a request as a parent request or a managed request. Examples of other types of parent requests and processing for such parent requests is described in U.S. Pat. No. 11,503,108, the entire contents of which are incorporated by reference.

In some examples, the processing performed at 222 by the order port 130 may include annotating or otherwise adding additional data (e.g., beyond the data included in the message that is received) to the message that is generated and communicated using the command bus 111B. For example, processing may include performing symbol lookup based on data stored in data store 140B and/or any information related to the client that submitted the request (e.g., they are a market maker, their client identifier, etc.).

In some examples, the order port 130 may include, as part of processing a request and/or generating the New Parent Request Command, data that indicates which module (e.g., which processing instance) is to be owner of this parent. More specifically, when the order port 130 determines that a routing strategy is provided in the received message, it may then determine or specify that the "owner" will be the routing module 154 for the to be created parent request. The owner module may be indicated by including an identifier (e.g., "routing" or the like) as an attribute of the New Parent Request Command that is then communicated to the matching engine 102. Advantageously, this technical implementation allows for the matching engine 102 to not be responsible for including functionality that determines what processing instance is to be the owner of a new parent request. Rather, that decision may be offloaded to the order port (or other processing instance).

At 224, the New Parent Request Command that has been generated by the order port 130 is communicated, via the command bus 111B, to the matching engine 102.

At 226, the New Parent Request Command is received by the matching engine 102 and the matching engine 102 processes the command. Processing the command includes performing new parent processing by generating, for the new parent request, parent data for a parent request data structure. Such parent data may include generating a new parent request identifier (also called a "ParentID" or "parent identifier" herein) and allocating storage within data store 126 to store the parent request identifier and other data for that parent request. The parent request identifier that is generated may be an identifier that is unique with respect all other parent requests and/or all other orders (or at least unique with a given operational period). This allows, for example, a given parent request to be uniquely referenced by components of the system 100, including matching engine 102. Data stored/tracked/updated within the parent request data structure for a given parent request may include: 1) a total number of shares (e.g., a quantity) associated with a given parent; 2) the quantity of shares that have been routed to a destination system; and/or 3) a routing sequence number, details of which are discussed elsewhere herein.

As part of the processing that is performed at 226, a New Parent Message is generated and then communicated using the sequenced bus 111A at 228. This message may include the parentID of the newly created parent request, an owner type that is set to routing (e.g., so that the routing module 154 recognizes that it is the owner for this parent request), and other data as needed (e.g., quantity, price, or other information that may be used by the routing module 154 to generate native orders or requests for such orders). The New Parent Message may be used to inform processing instances 150 that a new parent request has been created within the system 100. The properties of the message may be used by the processing instances 150 to determine how the system 100 should handle further processing for this parent request.

At 230, the order port 130 receives the New Parent Message that was communicated from the matching engine 102 and then generates and transmits a Request Accepted Message back to the client system 114. This message may indicate to the client system 114 that the request from 220 has been received and accepted by system 100. This may be considered an acknowledgement message of the message that was initially communicated to system 100 at 220.

At 232, the routing module 154 receives and processes the New Parent Message and performs a process for selecting one of the routing gateways 152 (a gateway selection process). This processing may include storing, to data store 140D, details of the parent request and then selecting one of the multiple routing gateways 152 that will be used to communicate with the routing subsystem 160 for this parent request. More specifically, as noted above, the routing module 154 may store, in data store 140D, data on for each of the routing gateways that are available. This data may be updated in response to gateway messages (discussed elsewhere herein—such as at 238) that may be received by the routing module. The data (which may be called "usage data" herein) that is tracked, and stored, by the routing module 154 for each routing gateway may include the number of data transaction requests that are "in flight" per gateway and the number of open data transaction requests that have been handled by that specific gateway. In some examples, this stored data may be used to perform a load balancing process (e.g., to make a load balancing determination) to balance the load on each of the multiple gateways.

In some examples, each routing gateway 152 may be assigned to handle data transaction requests that are associated with a specific symbol or ticker. As a simple example, one gateway may handle all data transaction requests for symbols that are start with the letter "A" and another all symbols that start with the letter "B." In some instances, other types of data may be acquired and used in connection with load balancing, for example, network capacity/utilization for each gateway, memory or cache utilization, CPU utilization, and other types of data. In any event, the processing (e.g., load balance processing) of selecting one of the multiple routing gateways 152 is performed. In some examples, data for the load balancing processing that is performed by the routing module 154 is based on sequenced data messages that are received via the sequenced bus 111A. More specifically, the routing module may store and update data regarding each of the routing gateways 152 based on sequenced messages that relate to processing performed by such gateways. For example, when sequence gateway request message is communicated, or when a sequenced gateway accept is communicated. Such messages may be used to update data store 140D to reflect a current state of each routing gateway 152.

In any event, once one of routing gateways 152 is selected, then a Gateway Request Command is generated by the routing module 154 and transmitted to the matching engine 102 at 234. This message may include an identifier for the selected gateway (selected from the processing performed at 232), the parentID, and other data such as, for example, order data (e.g., price, quantity, etc.) that is associated with the parent request.

At 236, the matching engine 102 receives the Gateway Request Command. At 236, the matching engine 102 will update the parent request data structure to include data regarding the gateway that has been selected for this gateway request and then sequence the command to generate a Gateway Request Message that is communicated at 238. This message may include the identifier for the selected Routing Gateway 152 and any details that are needed for generating a data transaction request (e.g., an order) that is to be routed to another system.

At 240, the selected routing gateway 152 receives the Gateway Request Message from the sequenced message bus 111A. The processing performed by the Routing Gateway 152 includes storing data locally for the selected routing gateway 152 for this request (e.g., the ParentID for the request, the number of leaves for the request, etc.).

The routing gateway 152 then generates a New Data Transaction Request Message. In some examples, this message may be an OUCH message, such as an Enter Order message.

At 242, the generated New Data Transaction Request Message is communicated to the routing system 160.

Continuing in FIG. 2B and at 250, the New Data Transaction Request Message is received at the routing subsystem 160 (e.g., by one of order ports 166) and processed. More specifically, the message that is received at the routing system 160 may be sequenced by sequencer 162 (e.g., RASH engine) and then processed using the router 164 to determine which other distributed computing system the received request should be communicated to. The selected system is shown as the Destination System 202. This system may be second distributed computing system 170 (e.g., which may be operated by the same or related organization or entity that operates system 100) or the external distributed computer system 180 (e.g., which may be operated by a different organization or entity).

Once a destination system 202 has been selected, then communication is performed between the routing subsystem 160 and the destination system 202 at 252. This communication may include multiple different messages (e.g., requests/validations/acknowledges/etc.). It will be appreciated that the communication that is performed at 252 may continue to be performed after other aspects shown in FIG. 2B are performed. For example, communication at 252 may be performed after elements 262 and 264 (discussed below) occur. Accordingly, the communication that is shown at 252 may be asynchronous with respect to other communications that are performed within system 100 and/or between routing subsystem 160 and system 100.

In some examples, the communication that is performed with the destination system 202 may not include data that indicates that the data transaction request that was routed to the destination system 202 originated with system 100. In other words, while routing subsystem 160 may "know" that system 100 originally received the data transaction request, this data may not be sent or revealed to destination system 202 as part of the communications that are performed at 252. In other examples, the messages communicated to the destination system 202 may include data that identifies system 100 as the system that originally received the data transaction request and/or the computer system that submitted the request to the routing subsystem 160.

In any event, once the routing subsystem 160 receives and processes the new data transaction request message (and potentially any messages in connection with the communications performed at 252), it then transmits, at 254, an Accepted Message back to the routing gateway 152. This message is provided as a confirmation message and may include the total shares quantity that have been accepted and/or other details of the order that has been accepted by the destination system 202. In some examples, this message may be an OUCH Order Accepted message.

At 256, the routing gateway 152 receives the accepted message and generates and transmits a Gateway Accept Command to the matching engine 102. This command may include the total number of shares or quantity that have been accepted by the routing subsystem. In some examples, the command may include the parent ID associated with the message accepted by the routing subsystem 160.

At 258, the matching engine 102 receives the command and sequences it. The processing by the matching engine 102 may also include updating the parent data structure with the total number of shares (e.g., the total quantity) that have been accepted and/or routed by the routing subsystem 160 to destination system 202. This field within the parent data structure may be represented by a total number of shares that have been routed to other, external, destination systems. Accordingly, for example, the total quantity that is represented within the data structure may correspond to sum of the pending quantity of all other away data transaction requests that have been routed to other destination systems. Note, however, that as such away data transaction requests are processed by the destination system that the total quantity value may be kept up to date based on the notification messages communicated back to the routing subsystem 260 and then the system 100.

At 260, a Gateway Accept Message is generated (e.g., via the sequencing process performed by the sequencer 120) by the matching engine 102 and then transmitted using the sequenced message bus 111A.

At 262, the Gateway Accept Message is received and processed by the routing module 154. The processing performed at 262 may include updating data for the gateway that served the request and the status of the request. Accordingly, the routing module 154 may track the status of each request that has been routed to an external system and the status of each of the routing gateways 152 that are used in communicating with the routing subsystem 160.

At 264 the routing gateway that was responsible for the communication of the request to the routing subsystem 160, may receive the indication from the sequenced message bus 111A that the request that was previously submitted was accepted and may update its internal data store to reflect this new data. Note that the status of the request that is communicated to the routing subsystem 160 may not be acknowledged as being accepted until the matching engine 102 has sequenced the gateway accept command.

In some examples, the order port 130 may perform processing based on the Gateway Accept Message at 260 to, for example, generate and transmit a notification to client system 114 that the data transaction request has been routed to another distributed computing system. However, in other examples (as shown in FIG. 2B), no such processing is performed by the order port and thus the client system 114 may not be informed.

Further details of additional processing that is performed based on additional actions from client system 114, destination system 202, or other systems is described in connection with the sequence diagrams discussed below.
Description of FIG. 3

FIG. 3 is a sequence diagram showing an example of how a data transaction request that was submitted to system 100, routed to another distributed computing system (e.g., as shown in FIGS. 2A-2B), and then executed thereon, is reported back to a client system 114 according to some embodiments. In other words, the processing shown in FIG. 3 shows how reporting of the execution of a previously routed data transaction request is handled.

At 300, one or more messages are exchanged between routing system 160 and destination system 202. One of these messages may be an execution message that is transmitted from destination system 202 to routing subsystem 160. This execution message may include transaction details related to the execution of the data transaction request that was previously routed to destination system 202. This may include, for example, the quantity executed, the price, and the like. In the example shown in FIG. 3, the execution message that is communicated from the destination system 202 may be a full execution message that indicates that the data transaction request previously routed to destination system has been executed in full. In some examples the messaging may occur, for example, using OUCH or FIX messages. Other types of messaging specifications may also be used according to certain example embodiments.

At 302, the routing subsystem 160 processes the one or messages received from the destination system 202 that indicate full execution of the data transaction request. The routing subsystem 160 generates and transmits, via the order port 166 that is responsible for this data transaction request, an Execution Message to routing gateway 152 of the system 100. In some examples, the execution message that is transmitted may be an OUCH Order Executed message that includes the execution details. The execution message that is communicated may be a type of notification message that is used to update system regarding the change in the status (e.g. a status change) of the away data transaction request.

At 304, the routing gateway 152 that originally communicated the request (e.g., from 242). In response to reception of the execution message, the routing gateway 152 generates and transmits, via the command bus, a Gateway Execution Request Command. This command may include data regarding the parent (which may be the parent identifier and/or a locate identifier) and the quantity that was executed.

At 308, the command is received by the matching engine 102. The matching engine 102 retrieves data for the identified parent from the parent request data structure and subtracts or updates the quantity indicated in the command from the total routed quantity associated with this parent request.

At 310, the matching engine 102 generates and transmits, via the sequenced message bus 111A, a Gateway Execution Message to notify any interested processing instances 150 that a data transaction request that was previously routed has been executed.

At 312, order port 130 receives the Gateway Execution Message and generates an Executed Message that is communicated back to the client system 114. This message may include the parent identifier and any other execution data that may be interest to the client system 114 and/or provided by system 100.

At 314, the routing module 154 also receives the Gateway Execution Message and processes it. In some examples, this may include updating or checking if there is any additional shares or quantity that is outstanding of this parent request. In this example the execution for the original request from the client system 114 has been fully executed and so the remaining quantity is zero (e.g., 0 routed quantity and 0 quantity in the order book of the matching engine 102). Accordingly, the routing module 154 generates a Parent Cancel Request Command that is sent to the matching engine 102. This command may include data for identifying the parent request (e.g., and identifier or a locate id).

As discussed elsewhere herein, in some examples, the routing module 154 may take other actions if there is remaining quantity associated with the parent request. In some examples, a new data transaction request may be submitted to the matching engine 102 (e.g., for inclusion into the order book), and/or in other examples another gateway request may be generated.

The routing gateway 152 may also receive and perform processing in response to the gateway execution message 310. This processing may include, for example, updating the routed quantity for the request (e.g., to subtract the executed amount). In some examples, this will result in updating the routed quantity to be zero (e.g., as all of the quantity for the away routed request have been executed). This may result, for example, in the routing gateway 152 performing clean up and/or otherwise closing the connection that was created for this request to the routing subsystem 160. In some examples this processing may be performed at 304, however in other examples the processing may be performed in response to the Gateway Execution Message at 310.

At 318, upon receiving the Parent Cancel Request Command the matching engine 102 performs parent cancel processing. This processing may include performing multiple operations in an atomic manner. For example, cleanup processing may be performed for the parent request data structure that is associated with the parent ID. At 320, a parent cancel message is generated and communicated using the sequenced message bus at 320. And then a parent state message is communicated at 322 with a status of "Out" (e.g., to indicate that processing for the indicated parent request has completed and has been removed from the matching engine).

Description of FIG. 4

FIG. 4 is a sequence diagram showing an example of how a data transaction request that was previously routed to destination system 202 (e.g., as shown in FIGS. 2A-2B) and is then canceled by that destination system is handled according to some embodiments.

At 402, one or more messages are exchanged between routing system 160 and destination system 202. One of these messages may be a cancelation message that is transmitted from destination system 202 to routing subsystem 160. In some examples, this cancelation message may include transaction details related why the originally routed request has been canceled by the destination system 202. This may include, for example, the quantity cancelled (e.g., whether it was a partial cancel) or whether it was a full cancel, and the like. As with the other messages discussed herein that occur between the routing subsystem 160 and the destination system 202, the messaging may occur, for example, using OUCH or FIX messages. However, other types of messaging specifications may also be used according to certain example embodiments.

At 404, the routing subsystem 160 receives the one or more messages from the destination system 202 and generates and transmits, to the routing gateway 152 of the system 100, a Cancel Message. In some examples, may be an OUCH Order Canceled messaged. In some examples the Cancel Message at 404 may include an indication that this a full cancel and/or a total number of shares that have been canceled.

At 406, the Cancel Message is received by the routing gateway 152. In response to reception of this message the routing gateway 152 generates and transmits, using the command bus 111B, a Gateway Out command to the matching engine 102. In some examples, the Gateway Out command is used to indicate that a quantity of a request has been canceled (e.g., outted) for the indicated away data transaction request. Note that this may be the full quantity (e.g., all remaining quantity) or a partial quantity if the cancelation is less than for a full amount (e.g., as discussed in FIGS. 10A-10B). In other examples, this command is used to indicate that the routing gateway 152 has completed working with this request (e.g., that the order has been canceled and this message is the last message in connection with the now canceled order). In some examples, the routing gateway 152 may perform processing in response to reception of the message from 404 by looking up additional data that is associated with the request that has been canceled. For example, the routing gateway 152 may determine the specific parent request that is associated with this request and then include such data (e.g., the parent ID and/or the locate ID) into the command that is sent to the matching engine 102.

At 408, the matching engine 102 receives and sequences the Gateway Out Command. This includes updating the routing quantity value for that parent to no longer include the quantity that has been canceled. In some instances, this may be all of the routed quantity for this parent request. However, in other instances, there may be other routed quantity that is associated with other data transaction requests that have been routed.

At 410, the matching engine 102 generates and transmits a Gateway Out Message using the sequenced message bus 111A. This message may include the parent identifier, an identifier for the data transaction request that has been canceled or other information associated with the now cancelled request. One or more of the processing instances 150 may respond and act on this message. The routing gateway may receive and perform processing based on the gateway out message. This processing may include decreasing the leaves (away routed quantity) for the data transaction request. Further, if the total away quantity is zero, then the resources the gateway has allocated for that data transaction request may be deallocated and the routing gateway may otherwise perform cleanup processing.

At 412, the routing module 412 receives the Gateway Out Message. Based on this message the routing module updates its local data store and the reinitiates the process of selecting one of the routing gateways 152 to handle communicating a data transaction request to the routing subsystem 160. In other words, the routing module 154 may be configured, in certain examples, to respond to cancelations that originate from destination system 202 by resubmitting a data transaction request to the routing subsystem for routing. In some examples, the client system 114 may not be informed or notified of the cancelation that was triggered by the destination system 202. However, in other examples, the client system 114 may be informed and the message for that cancelation may include, or not, the reasons for the cancelation.

In some examples, the selection process that is performed by the routing module 154 for selecting a routing gateway 152 may ignore or be independent of the reasons for the cancelation (or even that there was a cancelation). Accordingly, for example, the same routing gateway that previously handled a request may again be selected and similarly the same destination system 202 may be selected by the routing subsystem 160.

Alternatively, in some examples, the selection of a routing gateway and/or the selection of a destination system 202 by the routing subsystem 160 may be based on the reasons the for cancelation of the prior request (or that there was a cancelation)

In some examples, the routing module 154 may keep track of a tally of the number of times a particular data transaction request has been canceled. If the number of times exceed a set number, then the additional processing may be performed. Additional processing may include adjusting the routing strategy (e.g., that was initially specified from the client system 114) and/or informing the client of the cancelations.

In any event, once a new routing gateway is selected then a new Gateway Order Request Command is generated and sent, at 414, to the matching engine 102 for processing. The subsequent processing that is shown in FIG. 4 is similar or the same as that shown in FIGS. 2A-2B. For example, 414 corresponds to 234, 416 to 238, 418 to 242, 420 to 252, 422 to 254, 424 to 256, and 426 to 260. The additional described processing performed based on these messages may also be performed as described and shown in connection with FIGS. 2A-2B.

Description of FIGS. 5A-5B

FIG. 5A-5B are sequence diagrams showing an example of how a previously routed data transaction request that a client computer system requests to be canceled is handled according to some embodiments. The processing shown in FIGS. 5A and 5B occurs subsequent to 120-164 in FIGS. 2A and 2B. As noted below, there may be additional circumstances that are addressed during cancelation processing—such as handling any native data transaction requests that are stored into the order book data structure of the matching engine 102.

At 500, a cancelation request message is transmitted from client system 114 to order port 130. The order port 130 receives the message and may determine, based on the contents of the message that the request is for a request that is a parent request within system 100. The order port 130 then generates and transmits, at 502 and via the command bus 111B, a Parent Cancel Command (e.g., as opposed to an order cancel command for a native order or the like). In the example shown in FIG. 5A, the cancelation request is for the full quantity that is associated with the request. Accordingly, all data transaction requests that are associated with this parent request will be canceled. In other examples, the cancelation request may be partial and thus only some of the quantity (and data transaction requests with such quantity) may be canceled.

In any event, the matching engine 102 receives the Parent Cancel Command at 504 and sequences that command by communicating a Parent Cancel Message using the sequenced message bus 111A. The processing may include looking up or determining what data transaction requests are associated with this parent request. If any are stored within the order book data structure locally, then they may be canceled at this point (e.g., as part of the atomic processing that is performed in connection with the Parent Cancel Command). In some examples, the processing of canceling locally stored data transaction requests my occur at 532 that is shown in FIG. 5B. In some examples, the cancelation of native data transactions within the order book may be handled directly by the routing module 154 (e.g., the routing module 154 may determine which child data transactions requests or which away data transaction requests of a parent request that are to be canceled and/or how much quantity to remove from such requests).

Part of the parent cancelation processing performed at 504 includes determining if there one or more data transaction requests that have been routed to destination system 202. This determination may be based on checking the parent request data structure for the indicated parent request and determining if the total away routed quantity (which may either represent total shares routed away or total orders routed away) is greater than zero (or in the case of a partial cancelation as discussed in FIG. 10A-10B if the amount is greater than the requested floor value). If there are such data transaction requests, then the matching engine 102 generates and transmits, at 508, a Parent State message that has a status of "pending Routed Out" or similar. In some example embodiments, the status for the parent request is stored to the parent request data structure for the parent request and can thus be referenced should additional commands be received for this parent request.

This status message is used to indicate to other processing instances with system 100 that this parent request (indicated by the included parentID in the message) is in the process of being canceled, but there are still pending data transaction requests (e.g., away data transaction requested) associated therewith that are still pending. In some examples, it is the responsibility of other processing instances (e.g., the routing module) to initiate and handle canceling any away routed data transaction requests.

Based on the message communicated at 508, the order port 130 may receive the parent state (or the parent cancel message) and generate and transmit a Pending Cancel message back to the client system 114. Note that this message may operate like an acknowledgement message as the cancelation has not yet been completed for the away routed data transaction request(s). In other examples, no such pending cancel message may be communicated. In other words, the client system 114 may only be informed upon completion of the cancelation process at 538. In cases where the native data transaction requests stored in order book 124 have been canceled, the pending cancel message may include data indicating as such—e.g., that the data transaction requests local to system 100 have been canceled.

At 512, the routing module 154 receives the Parent State message (and/or the Parent Cancel Message) and begins processing operations for canceling any away routed data transaction requests associated with the indicated parent request. This includes, for each away routed request, generating and transmitting, at 514 and to the matching engine 102, a Gateway Cancel Request Command that includes an order identifier for the to be cancelled data transaction request and a gateway identifier that was handling that specific data transaction request. Note that in some examples, the routing module may determine that any native data transaction requests associated with the parent request are to be canceled at this point in time and issue commands for such native data transaction requests to the matching engine 102.

The Gateway Cancel Request Command is received by the matching engine 102 that then sequences that command and communicates it back using the sequenced message bus at 516 as a Gateway Cancel Message. This message includes an identifier for the gateway that is responsible for the to be canceled data transaction request along with, for example, an OrderID to identify the away data transaction request that is to be canceled Based on the gateway ID included in the Gateway Cancel Message, the appropriate routing gateway 152 will receive and process the message. In response to this message, the routing gateway 152 will generate and transmit a Cancel Request at 518. In some examples, this Cancel Request message may be an OUCH Cancel Request message.

The Cancel Request message from 518 is received and processed by the routing subsystem 160. Based on this instruction, the routing subsystem 160 communicates with the destinations system 202 to cause the previously routed data transaction request to be canceled. Depending on the protocol used by destination system 202, the type of communication may be different as some systems may use one type of protocol and others may use other types of protocols. The messaging that is performed at 520 may include multiple messages communicated from/to the routing subsystem to the destination system 202 or may include one message that is sent and one that is received (e.g., a confirmation of cancelation). In any event, once the routing subsystem 160 receives confirmation that the data transaction request has been canceled, the routing subsystem 160 generates and transmits, at 522, a Cancel Message to the routing gateway 152. This Cancel Message may be the same or similar to the Cancel Message discussed in connection 404 in FIG. 4. In some example embodiments, the Cancel Message communicated at 522 may be an OUCH Order Canceled message.

At 524, the routing gateway 152 receives the Cancel Message and generates and transmits a Gateway Out Command to the matching engine 102 for sequencing.

At 526, the matching engine 102 receives the Gateway Out Command and updates the total routed quantity, at 525, for the parent request that is associated with the now cancelled order. The matching engine 102 also sequences the message by communicating a Gateway Out Message using the sequenced message bus 111A. This message may include the gateway ID, the parent ID, and the order ID of the now canceled data transaction request and may indicate to the processing instances that this order ID has now been canceled. The various processing instances of the system 100 may perform processing based on this message. In some embodiments, the Gateway Out Message may be received by the routing gateway 152 which may now perform cleanup processing for that order ID in connection with the used resources for that routing gateway.

At 528, the routing module 154 receives the Gateway Out Message and then confirms that there are no other away routed data transaction requests for this parent ID. For example, if multiple away routed data transaction requests are being canceled, then the routing module 154 may wait until confirmation for each message has been received (or the total away quantity for the parent request is zero). Upon all such confirmations being received, the routing module 154 may generate and transmit a Parent Cancel Command at 530 (which may be similar to or the same as the command communicated at 506).

At 532, the matching engine 102 receives the Parent Cancel Command and performs parent cancel processing. This may include canceling any pending native data transaction requests that are stored in order book 124. As noted above, the parent cancel processing may, in some examples, be performed alternatively at 504 or elsewhere. In some examples, whenever a child data transaction request message is canceled, such a cancelation may be communicated via the sequenced message bus 111A (e.g., via a separate sequenced message).

In any event, as part of the parent cancel processing, a Parent Cancel Message is sequenced and communicated out over the sequenced message bus at 534. And then a Parent State Message with the statue of "Out" is communicated at 536 for the parent request.

At 538, the order port 130 receives the Parent State Message and then generates and transmits a Cancel message back to client system 114 that indicates that the requested cancelation provided at 500 has been performed. Any details of the cancelation may be provided in this cancelation message as well.

Description of FIGS. 6-8

FIGS. 6-8 are sequence diagrams showing examples of how a data transaction request received by system 100 may perform a match process before being routed using the routing subsystem according to some embodiments. More specifically, FIG. 6 shows no match being determined on system 100. FIG. 7 shows a full match being determined on system 100. FIG. 8 shows a partial match being determined on system 100. It will be appreciated that elements 600-612 are the same in each of FIGS. 6-8 and illustrate aspects for accepting and processing a new data transaction request. FIGS. 6-8 differ in the results of the match processing that is performed in steps 614, 714, and 814 and the subsequent processing that is carried out as a result of the different results in each of the respective figures.

The processing and/or communication performed in connection with 600, 602, 604, 606, 608, and 610 corresponds, respectively, to 220, 222, 224, 226, 228, and 230 that is described in connection with FIG. 2A. The difference for the examples shown in FIGS. 6-8 is that the new request message at 600 that is communicated from the client system 114 may include a property that specifies the type handling for this request is one that will attempt to use the matching engine of system 100 before using the functionality of the routing subsystem 600. Specifically, a first match attempt will be made by the matching engine 102 and if that attempt is unsuccessful (or partly successful), then a request will be routed via the routing subsystem. Such functionality may be referred to as "scrape then route" according to some examples.

At 611, the New Parent Message is received by the routing module 154 and processed. The New Parent Message that is communicated at 608 may include the properties that indicate that it is to first try and match using the matching engine 102 of the system 100 before routing a request to destination system 202. Accordingly, the routing module 154 will determine, based on the properties included in the New Parent Message, that a data transaction request should be created for this parent request and submitted to the matching engine 102.

At 612, routing module 154 generates and transmits, to the matching engine 102 and via the command bus, a New Child Data Transaction Request Command. This command will include the parent ID (or other identifier for the parent such as a locate ID) and a property that the to be created transaction request is to be an IOC (immediate or cancel) request (e.g., a data transaction request that includes an IOC attribute). Additional properties that are included may be quantity, price, and other values (e.g., properties that are used to create an order used by the matching engine 102).

Once the New Child Data Transaction Request Command is received, the matching engine 102 performs processing at 614 that includes generating a new data transaction request (including a new order identifier to identify this new data transaction request), generating and transmitting an accepted message at 616 (e.g., that includes the newly created order ID), performing matching, and then, in connection with not determining matches, generating and transmitting a Child Out Message at 618. In some examples the accepted message generated and transmitted at 616 may also include data for the quantity of shares of a match (e.g., for a quantity matched field of the generated message). Note that in the example shown in FIG. 7 a full match is determined. And in the example shown in FIG. 8 a partial match is determined.

In any event, the routing module 154 receives and processes the messages communicated at 616 and/or 618. Based on these messages the routing module determines, at 620, that there is still quantity remaining for this parent request and performs processing to select one of the routing gateways 152 to handle submitting a request to the routing subsystem 160. This may be the same or similar to the process discussed in connection with 232 in FIG. 2A.

The subsequent processing is the same or similar to that discussed in connection with elements 234-264 of FIGS. 2A-2B.

Turning to the description of FIG. 7, here the match processing performed at 714 results in a complete match of the data transaction request that was submitted for processing at 612. In this case, the matching engine 102 generates and transmits an accepted message at 716 and then an executed message at 718. Both of these messages may indicate the parent request that is associated with this data transaction request and, in the case of the execution message, any execution details of the identified match. Note that in some examples one message may be communicated that indicates both acceptance of the data transaction request and the quantity that has been executed (e.g., as a different field within the message) by the matching engine 102. Accordingly the messages communicated at 716 and 718 may be combined into one message.

At 720, order port 130 receives the message that indicates execution of a data transaction request and then generates and transmits an Execution Message at 720 to notify the client system 114 of the execution. In some example embodiments this may be an OUCH Order Executed message.

At 722, the routing module 154 also receives the execution message and then determines, based on execution details within the message, that there is no remaining quantity associated with the parent request for the executed data transaction request. The routing module 154 then generates and transmits a Parent Cancel Command at 724 to the matching engine 102 to cancel/cleanup the parent request as there is no longer any remaining quantity for the parent request.

The Parent Cancel Command is received by the matching engine 102 that then sequences the command at 726 as the Parent Cancel Message. The matching engine 102 then performs cleanup processing for the parent request (e.g., to clean up the parent request data structure) and, once the parent request is deleted/removed, generates and transmits a Parent State Message with a status of "out" at 728.

Next the description of FIG. 8 will be provided. In this figure the match processing performed at 814 results in a partial match for the request communicated from 612. In other words, some quantity, but not the full quantity of the submitted request from 612 is matched by the matching engine 102.

The processing performed by the matching engine 102 when a partial match is executed includes generating the acceptance message at 816 and the execution message at 818 for the quantity that has been executed for the identified match. Then, because the request from 612 is an immediate or cancel request, a Child Out (or other Data Transaction Request Status message) is generated and communicated at 822 to indicate that the order is no longer present within the order book of the matching engine 102. In some examples, the message at 822 indicates the quantity that was canceled for the indicated order.

At 820, the order port 130 receives the execution message and then generates and transmits an Execution Message to the client system 114 to report that the indicated data transaction request has been executed. This message may include data of the execution (e.g., price, quantity, etc.). In some examples, this message may be an OUCH Order Executed message.

At 824, the routing module 154 receives the messages communicated at 816, 818, and/or 822 and then determines (e.g., based on the quantity executed in the execution message) that there is remaining quantity associated with the parent request and/or associated with the requested order from 612. The routing module then generates a request for a new away data transaction request that is for the unmatched quantity. As noted above, this quantity may be quantity that was unmated as a result of processing the data transaction request from 612 and/or may be any unmatched quantity that is associated with the parent request (note: the two values may be the same in certain examples). The routing module also selects one of the routing gateways 152. With this determined data, the routing module generates and transmits a Gateway Request Command to the matching engine that includes the selected routing gateway along with the indicated quantity for this new away data transaction request. The processing after 824 is the same or similar to that shown in connection with 234-264 of FIGS. 2A-2B.

Description of FIG. 9

FIG. 9 is a sequence diagram showing an example of how an away data transaction request is first routed to a destination system 202 before attempting to process any remaining quantity (e.g., that has not been matched) in the distributed system 100 that initially received the request according to some embodiments. In some examples, this type of functionality may be referred to scaping or pinging using the routing subsystem before posting or being processed by system 100.

The processing shown in FIG. 9 occurs after elements 220-240 of FIG. 2A with additional data that the request communicated from the client indicates that system 100 is to use the routing subsystem first before attempting to process the request using matching engine 102. As noted above, one attribute or parameter of the New Request Message that is communicated from client system 114 may be a routing strategy and pinging or scraping on routing first may be one such strategy or instruction. In general, this instruction is carried out by having the request that is communicated to the routing subsystem (and then destination system 202) be one that is an immediate or cancel order or has a time in force (TIF) value of 0.

Accordingly, at 900 and picking up after 240 from FIG. 2A, the request that is generated by the routing gateway 152 and transmitted to the routing subsystem 160 may be one that indicates that it for an immediate or cancel or indicates, in the time in force/time to live field of the request, a value of 0.

The routing subsystem 160 receives the New Data Transaction Request Message and then performs routing using the router 164. The routing subsystem 160 communicates with destination system 202. This may include, for example, transmitting the initial data transaction request and receiving any further messages (e.g., execution messages, cancelation messages, etc.) from destination system 202. In this example, one of the messages received from the destination system is a cancelation message that indicates a total quantity that has been canceled (e.g., not matched).

At 904, the routing subsystem 160 generates and transmits, back to the routing gateway 152, a Cancel Message. The Cancel message may indicate the quantity that has been canceled by destination system 202 (and thus remains executed or matched). In some examples, this message may be an OUCH Order Canceled Message.

In some examples, the routing subsystem 160 may receive multiple possible messages relating to one request. For example, if a request results in a partial execution, then the routing subsystem 160 may receive both an execution message (indicating the quantity executed) along with a cancelation message (indicating the number of shares that have been unmatched). In some examples, the routing subsystem 160 may use one or the other, or both, of such messages to trigger the processing at 904. Thus, for example, the Cancel Message at 904 may be generated in response to an execution message (with the canceled quantity being the difference between the original quantity and the executed quantity) or the canceled message. Such configuration may be based on the nature of the destination system and/or the messaging protocol that is being used. For example, if it is possible that multiple executions could be performed for a single request, then the routing subsystem may wait for the cancel message as opposed to operating based on the first execution message.

In any event, at 906, the Cancel Message is received by the routing gateway 152. This causes the routing gateway 152 to generate and transmit a Gateway Out Command to the matching engine 102 to indicate that the routing for this request has completed. This command may include the quantity remaining for the parent request (e.g., that has been canceled by destination system 202) or the quantity that has been removed.

At 908, the Gateway Out Command is received by the matching engine 102. The matching engine may update, in the parent request data structure, the routed quantity for this parent request based on the quantity that was canceled (as that quantity is no longer routed). This may be similar to 408 from FIG. 8. The matching engine 102 then sequences the command by communicating a Gateway Out Message using the sequenced bus 111A to the processing instances for consumption thereby.

At 910, the Gateway Out Message is received by the routing module 154. At this point, the scrape or ping part of the original submitted request has been completed and the routing module 154 now performs processing to determine how the remaining quantity associated with the request will be handled by system 100. Based on this processing, at 912, a Parent Restatement Command is communicated to the matching engine 102 for processing. This processing will include an identifier of the new owner for this request.

In general, there are two options for how to proceed. The first is that another processing instance becomes the owner for a new parent request. This is discussed in connection with 914. The second is described in connection with 916 when there is no subsequent owner for the request. In other words, a non-parent request will be generated (a native data transaction request) that does not have a parent request associated therewith.

For 914, the Parent Restatement Command communicated from the routing module 154 will include an identifier for the processing instance that will be the owner of the new parent request. The matching engine 102, in response to the Parent Restatement Command, generates new parent request data (e.g., a new parent identifier, locate identifier, etc.) and creates/instantiates a new parent request for the parent request data structure.

The matching engine 102 also generates and transmits, via the sequenced message bus 111A, a Parent Replace message that includes (a) the identifier of the old parent request, (b) the identifier for the newly generated parent request, (c) data to identify the owner processing instance, and a flag that is used to indicate to the order port 130 to ignore or not relay the Parent Replace message to the client system 114. The parent replace message may be used by the new owner processing instance to inform it that it is now the owner for the indicated parent request.

The matching engine 102 also generates and communicates, via the sequenced message bus 111A, a Parent State message for the old parent request with a status of "Out."

For 916, and the case of when there is to be no new parent, the matching engine 102 will generate, in response to the Parent Restatement Command, a parent replace message that includes "none" or "null" as the owner. In some examples, the parent replace message may include a newly generated ID for the "new" parent request. This may be considered a temporary value in some examples. However, in other examples, the parent request ID may be the same as the new data transaction request ID that is generated (discussed below). The matching engine 102 will then perform cleanup processing for the data associated with the "old" parent request and generate a Parent State message with a status of Out for the old parent. The matching engine 102 then generates a new data transaction request ID and communicates a New Native Data Transaction Request Accepted message using the sequenced message bus. The Matching then performs match processing for the new request against pending data transaction requests in order book 124. The matching engine 102 also, if a new parent ID was used/generated transmit a Parent State message with a status of out for the new parent ID.

Description of FIGS. 10A-10B

FIGS. 10A-10B are sequence diagrams showing an example of how an existing data transaction request may be partially canceled using the system shown in FIG. 1A according to some embodiments. The example shown in FIGS. 5A-5B occurs subsequent to the processing shown in FIGS. 2A-2B. The partial cancel processing may also be similar in some respects to the processing for a full cancel as discussed in connection with FIGS. 5A-5B. However, in this example, some of the quantity associated with the parent request remains pending.

At 1000, a cancel request is communicated from the client system 114 to order port 130 of the system 100. The cancel request may include a value that indicates the total quantity that is to remain associated with the data transaction request that is specified for cancelation. In some examples, the Cancel request may be an OUCH Cancel Order Request that includes a quantity field with a value that is the new intended size of the order.

The cancel request is received at the order port 130 that then determines that this order is associated with an existing parent request and then generates and transmits, using the command bus, a Parent Cancel Command at 1002. This command includes an identifier for the parent request and the quantity that will be remaining on the order after the cancelation process. In alternative implementations, the command may include some other quantity value (e.g., the amount to cancel).

At 1004, matching engine 102 receives the Parent Cancel Command and based on this command, the matching engine 102 looks up the current details for the parent request (e.g., by accessing the parent request data structure). The details include the total quantity that is live and/or routed to destination system 202. If the live amount is greater than the cancel request amount (e.g., the amount that is to remain pending with the request), then the parent cancel request may be ignored as its conditions have already been met (e.g., the pending quantity for the request has been reduced to at least the requested amount included in the message received from the client at 1000). In some examples, ignoring includes taking no further action (including sequencing the parent cancel command).

If, however, the pending routed quantity is greater than the requested cancelation amount, then the matching engine 102 generates and transmits, via the sequenced message bus, a Parent Cancel message at 1006. The matching engine 102 also generates and transmits, at 1008, a Parent State message with a status of pending routed out. This status is used to indicate that the routing module 154 is now responsible for determining how to handle the cancelation request and/or that there is quantity associated with the indicated parent that is still pending with destination system 202. In some examples, the status of a given parent request (e.g., pending, pending routed out, pending cancel, etc.) may be stored within the parent request data structure that is maintained by the matching engine 102. In some examples, the status of a given parent request may be stored at the routing module 154 (e.g., in data store 140D).

At 1010, the Parent State message is received by the routing module 154 that then performs processing for determining how to cancel or reduce the amount of quantity for a given data transaction request. This processing may include determining how much quantity to cancel from a data transaction request that was routed to destination system 202. In any event, the routing module 154 is responsible for determining how the quantity of the one or more child data transaction requests associated with the parent request should adjusted.

In connection with FIGS. 10A-10B and also other figures herein, the routing module 154 may generally be responsible for determining how a given request (e.g., a child data transaction request that is stored within system 100 or an away data transaction request that is handled by destination system 202) that is associated with a parent request should be handled. This functionality allows for modification of how such status changes or the like (e.g., cancelation, modification, replacement, execution, etc.) should be handled and/or more complex processing for such requests without adversely affecting performance of the matching engine 102. Accordingly, routing module 154 may transmit commands (e.g., a cancelation command, a modify command, etc.) to the matching engine at this point to cause changes to any child data transaction requests that are currently pending. Such changes may be carried out without waiting for a response regarding changes to any away data transaction request.

In some examples, when a request is received by the routing module 154, the processing may include first changing (e.g., removing quantity, canceling, updating attributes thereof, etc.) any child data transaction requests of the parent request before changing any away data transaction requests. Thus, for example, if a parent request is associated with one child data transaction request and one away data transaction request, then the routing module 154 may be programmed to: 1) first carry out changes to the child data transaction request, and then, if needed, carry out changes to the away data transaction request; or 2) first carry out changes to the away data transaction request, then, if needed, carry out changes to the child data transaction request. As one specific example, if a parent request is for 100, with an associated child data transaction request being for 50 and an associated away data transaction request for another 50, and a cancelation request is received, then the routing module 154 may change both (e.g., proportionally), or one of the requests in priority over the other. It will be appreciated that this type of implementation allows for other more complex use cases (e.g., in connection with handling requests for routed data transaction requests) to be provided within the functionality of the routing module 154 while also maintaining performance of the matching engine 102.

Returning to FIG. 10A, at 1012, the routing module 154 generates and sends a Gateway Cancel Request Command to the matching engine 102 for sequencing. This command may include the quantity that the order indicated in the command is to cancel down to, or a complete cancelation. The command may also include an identifier for the gateway that is handling the order and/or the parent request identifier. This command is used to instruct (e.g., after sequencing by the matching engine) the routing gateway 152 to handle cancelation of the away data transaction request that it is associated with.

At 1014, the matching engine 102 receives the Gateway Cancel Request Command and sequences this command. The sequencing results in the generation and transmission of, via the sequenced message bus 111A, a Gateway Cancel Message that includes the gateway identifier that is associated with this order, the order ID of the to be canceled order, and the quantity that is to be canceled. As with other quantity values herein, the quantity may be the total quantity that can order will be canceled down to (e.g., zero in the case of a full cancelation of the indicated order) or a quantity to cancel, or some other value that is used in the cancelation processing that is to be performed.

At 1016, the routing gate 152 receives the Gateway Cancel Message and generates and transmits a Cancel Request to the routing subsystem 160. This request may be a OUCH Order Cancel Request message that includes a quantity field with the total number of shares to be remaining for this order.

At 1018, the routing subsystem 160 receives the Cancel Message, processes it, and then communicates with the Destination system 202 to carry out the cancel request.

Once the cancel request is completed—e.g., the destination system 202 has confirmed cancelation of the away data transaction request—then a Cancel Message is generated at 1020 by the routing subsystem 160 and transmitted back to the routing gateway 152. In some examples, this message is an OUCH Order Canceled message. Note that in some examples, this message may indicate the quantity canceled from a still pending data transaction request. If the quantity provided is zero, then that may indicate the full quantity of the data transaction request has been canceled (e.g., a full cancel as discussed in connection with FIGS. 5A-5B).

Continuing on in FIG. 10B, the Cancel Message is received by the routing gateway that then generates and transmits a Gateway Out Command (e.g., to indicate that the quantity associated with the away request has been decreased) at 1022 that is communicated, via the command bus 111B, to the matching engine 102 for processing.

At 1024 the matching engine 102 receives the command communicated at 1022 and updates the quantity of the routed shares for the parent request in the parent request data structure. The matching engine 102 sequences the received Gateway Out command and communicates a Gateway Out message at 1026. The Gateway Out message that is communicated at 1026 may include the parent identifier for the parent request, the order Id of the request that was just outed for the routing gateway, the new quantity associated with the away data transaction request (assuming there is any remaining quantity), and the gateway that has been outed. The communicated Gateway Out message may be received by the routing gateway that may then perform cleanup processing for the connection that had been maintained for that away data transaction request by that gateway.

The Gateway Out message is also received by the routing module 154 that performs processing at 1028. This message will be used by the routing module to reassess the status of the originally requested Parent Cancel request (from 1006). In other words, from 1008 onwards, the state of the parent that is stored with the routing module is "pending routed out" (e.g., that the state of the parent request is pending while away data transaction requests are handled). When the Gateway Out message is received by the routing module 154, it then recognizes that that away data transaction request has been handled (as the identifier for the order is included in that gateway message and/or the parent request identifier is included) and that the parent cancel command that was previously requested may be reinitiated for the parent request associated with the now canceled away data transaction request. Accordingly, at 1028, the routing module 154 performs processing by reassessing the quantity that is associated with the parent request to determine if the original partial cancel request has been satisfied (e.g., if the requested cancel down quantity associated with the request from 1000 is now associated with the parent request).

As part of the processing performed at 1028, the routing module 154 will generate (again) the parent cancel command because the status of the initially requested parent cancel (e.g., from 1002) was in a state of pending. Thus, from the perspective of the matching engine 102, when the parent request is still pending it is waiting until some further action occurs. In this case the further action is controlled by the routing module 154. Accordingly, when the gateway out message 1026 is received for the indicated parent request by the routing module 154, then at 1030, the Parent Cancel command is regenerated and submitted to the matching engine 102 for processing. This Parent Cancel command may be the identical or similar to the one communicated at 1002 and include the same amount value specified from the client system (communicated at 1000) and any parent request identifying data. At 1034, the matching engine 102 sequences the Parent Cancel command and generates and transmits a Parent Cancel message (e.g., similar to 1006).

By having the matching engine 102 process, at 1032, the parent cancel message again, the parent state of the indicated parent request may be updated based on the newly updated change in quantity for any away data transaction requests (e.g., as updated at 1024). Specifically, at 1032, the matching engine 102 will process the Parent Cancel command by determining that the total quantity associated with the parent request satisfies the requested amount that the parent request is to cancel down to. This may be done by comparing the away quantity that is stored in the parent request data structure for the specified parent request to the requested cancel remaining amount that is included in the Parent Cancel Command. If that amount is satisfied, then the matching engine 102 may determine that the Parent Cancel command has been satisfied and then generate a communicate and updated Parent State message at 1036.

Note that if the quantity for the parent request is still greater than the requested amount (assuming the requested amount is above 0), then there may be additional away data transaction requests to be canceled and accordingly the processing may return to 1008. Also, there may be additional native data transaction requests that are stored in order book 124 and associated with the indicated parent request. In this case, then these native orders may be cancelled as part of the processing performed at 1032 (e.g., similar to the processing performed at 532) until the requested outstanding quantity remains for the parent request. In some examples, if there is still remaining quantity with the parent request (e.g., there is still one or more away data transaction requests associated with the parent request), then the matching engine may repeat the processing shown at 504 and the status of the parent request may remain pending.

In any event, the Parent State message that is communicated at 1036 may include, as a statue value for the parent request, a state of "Partial Cancel" to indicate that a partial cancelation request for the indicated parent request has been successfully processed.

At 1038, the updated Parent State message may be received by the order port 130, which then generates and transmits a Cancel Message back to the client system 114 to indicate that cancelation request has been successfully processed. Note that throughout the processing shown in FIGS. 10A-10B, system 100 may not respond or report back to client while the processing for handling the away data transaction requests is occurring. Accordingly, this processing may be hidden or opaque to the client system 114. However, in other examples, additional data messages may be communicated from the order port 130 back to the client system 114 that indicate how the away (or native) data transaction requests associated with the parent request have been changed.

Description of FIGS. 11A-11B

FIG. 11A-11B are sequence diagrams showing an example of how an existing data transaction request may be modified using the system 100 shown in FIG. 1A according to some embodiments.

The processing that his shown in FIGS. 11A-11B is similar in many respects to that shown in connection with the partial cancelation processing that is shown in FIGS. 10A-10B. However, where the message or command is for cancelation in FIGS. 10A-10B, a new message for modification may be used in connection with the examples shown in FIGS. 11A-11B.

One difference between the processing shown in FIGS. 10A-10B may be that the modification messages of FIG. 11A-11B may include additional fields to allow for modification of properties of an existing data transaction request other than just the quantity value of an existing data transaction request that is changed as shown in connection with the partial cancel request of FIGS. 10A-10B.

In some examples, there may be additional processing performed when handling modification messages/commands than handling partial cancelation requests. Specifically, when a modification command is processed by the matching engine (or by destination systems 202) it may result in updating a timestamp associated with the data transaction request to the time of modification as opposed to when the data transaction request was first received. In contrast, in some examples, a partial cancelation request may not include such an update to the timestamp. Such timestamps (or other values) may be used to determine the priority data transaction requests are to be processed. Accordingly, modifying a data transaction request (as opposed to performing a partial cancel) may result in the data transaction requests loosing priority (e.g., for purposes of match processing and the like).

In some examples, the modification and cancelation processing may be combined to use the same message. For example, the modification message may be used for the partial (or full) cancelation process that is shown in FIGS. 10A-10B. In some examples, the message communicated from the client system 114 to the system 100 for modification and cancels may be different, but the messaging used internally may be the same. For example, when a cancelation message is received as shown in FIG. 10A-10B, the order port may communicate a modification message to the sequencer that includes the amount specified in the original cancelation request. In the examples shown below in FIGS. 11A-11B, a separate modification message is also used internally within system 100.

Turning now more specifically to FIGS. 11A-11B, after an initially submitted request has been processed as described in connection with 220-264, at 1100, a modify request is communicated from the client system 114 at order port 130 of the system 100. The modify request may include one or more (e.g., a plurality data values) that indicate what fields of the specified data transaction request identified by the modify are to be changed. This may include, for example, quantity, price, type of order, and other attributes for an order (which in this example is a parent request managed by system 100). In some examples, the modify request may be an OUCH Modify Order Request that includes the fields that are to be modified.

The modify request is received at the order port 130 that then determines that this request is for an existing parent request. As with other requests received from client systems 114, this determination may be performed by looking up, in data store 140B, information that is used to identify that the order identified in the modify request is a parent request. The order port 130 then generates and transmits, using the command bus, a Parent Modify Command at 1102. This command includes an identifier for the parent request and the properties of the identified parent request that are to be modified.

At 1104, matching engine 102 receives the Parent Modify Command and based on this command, the matching engine 102 looks up the current details for the parent request (e.g., by accessing the parent request data structure). The details can include the total quantity that is live and/or routed to destination system 202 (as with the processing performed for a partial cancel).

At 1106, the matching engine 102 sequences the Parent Modify Command and generates and transmits, via the sequenced message bus, a Parent Modify message. The matching engine 102 also generates and transmits, at 1108, a Parent State message with a status of pending routed modify. This status is used to indicate that the routing module 154 is now responsible for determining how to handle the modify request and/or that there is an away request associated with the indicated parent that is still pending with destination system 202. In other words, it is up to the routing module 154 to determine how to handle the modification of the away request (and potentially any native data transaction requests pending with the order book of the matching engine 102).

At 1110, the Parent State message, with the status of pending routed modify, is received by the routing module 154 that then performs processing for determining how to the modification of the away request should be handled. This processing may include determining whether to cancel (and then eventually resubmit a request) or whether to modify the away request via an appropriate message that will be sent to the destination system 202. In the example shown in FIG. 11A, a Gateway Modify Request Command is generated and communicated to the matching engine 102 at 1112.

The Gateway Modify Request Command may include the properties of the order indicated in the command that are to be modified. The command may also include an identifier for the gateway that is handling the order and/or the parent request identifier (e.g., as the gateway that is responsible for the away request is stored within data store 140D).

At 1114, the matching engine 102 receives the Gateway Modify command and sequences this command. The sequencing results in generation and transmission of, via the sequenced message bus 111A, a Gateway Modify Message that includes the gateway identifier that is associated with this order, the order ID, and the properties of the order to be modified.

At 1116, the routing gateway 152 receives the Gateway Modify Message and generates and transmits a Modify Request. This request may be a OUCH Order Modify Request message that includes one or more properties that are to be modified for the identified away order.

At 1118, the routing subsystem 160 receives the Modify Message and communicates with the destination system 202 to carry out the modify request.

Once the modify request is completed—e.g., the destination system 202 has confirmed modification of the away request—then a Modify Message is generated at 1120 by the routing subsystem 160 and transmitted back to the routing gateway 152. In some examples, this message is an OUCH Order Modified message.

Continuing on in FIG. 11B, the Modify Message is received by the routing gateway 152 that then generates and transmits a Gateway Modify Command at 1122 that is communicated, via the command bus 111B, to the matching engine 102 for processing.

At 1124 the matching engine 102 receives the command communicated at 1122 and updates (as needed) the quantity of the routed shares for the parent request in the parent request data structure. The matching engine 102 sequences the received Gateway Modify command and communicates a Gateway Modify message at 1126. The Gateway Modify message at 1126 may include the parent identifier for the parent request, the order Id of the request that was just modified, the new properties of the now modified away request, and the gateway associated with the modification request. The communicated Gateway Modify message may be received by the routing gateway 152, which may then update any properties stored for that away request and/or perform cleanup processing for that gateway as needed.

The Gateway Modify message is also received by the routing module 154 that performs processing at 1128. This message will be used by the routing module to reassess the status of the originally requested Parent Modify request (from 1106). In other words, from 1108 onwards, the state of the parent that is stored with the routing module 154 is "pending routed modify" (e.g., that the state of the parent request is pending while modification of the away request(s) are handled). When the Gateway Modify message is received by the routing module 154, it then recognizes that that away request has been handled and that the Parent Modify command that was previously requested may be reinitiated. Accordingly, at 1128, the routing module 154 performs processing by reassessing (as needed) the quantity that is associated with the parent request and/or other properties of the parent request to determine if the original Parent Modify request has been satisfied.

As part of the processing performed at 1128, the routing module 154 will generate (again) the Parent Modify command because the status of the initially requested parent cancel (e.g., from 1102) was a state of pending. Thus, from the perspective of the matching engine 102, when the parent request is still pending it is waiting for some further action to occur. In this case the further action is controlled by the routing module 154. Accordingly, when the gateway out message 1126 is received for the indicated parent request by the routing module 154, then at 1130, the Parent Modify command is regenerated and submitted to the matching engine 102 for processing. This Parent Modify command may be the identical or similar to the one communicated at 1102 and include the same properties specified from the client system (communicated at 1100) and any parent request identifying data. At 1134, the matching engine 102 sequences the Parent Modify command and generates and transmits a Parent Modify message (e.g., similar to 1106).

In any event, a Parent State message is communicated at 1136 and includes, as a statue value for the parent request, a state of "Modify" to indicate that a modify request for the indicated parent request has been successfully processed.

At 1038, the updated Parent State message may be received by the order port 130, which then generates and transmits a Modify Message back to the client system 114 to indicate that modify request has been successfully processed.

In certain implementations, the processing of a modify message by system 100 and/or routing subsystem 160 may include the same or similar processing that is performed for a partial cancel request. In other words, the processing that is performed for a modify may be a superset of the processing performed for a partial cancel (e.g., a modify includes the ability to perform a partial cancel). An advantage of providing separate commands is that modification of the properties of a data transaction request may include additional validations and the like in connection with updating any given property of an order. However, the processing of a partial cancel may be more focused (e.g., less complex) as only the quantity of a data transaction request is being adjusted. This separation of or creation of different messages to handle a specific instance (partial cancel) of a more general task (modification) is thus an advantage over other types of implementations that use just one message for handling all modifications.

Description of FIGS. 12A-12B

FIG. 12A-12B are sequence diagrams showing an example of how an existing data transaction request may be replaced using the system 100 shown in FIG. 1A according to some embodiments.

Replacement of an existing data transaction request may occur when, for example, a client desires to have an away data transaction request be handled instead by system 100 (or no longer have a parent request that includes a routing property). In general, a replace request will result in a new data transaction request being created within the "old" data transaction request canceled or otherwise removed. In some examples, such replacement may thereby result in using timestamp information with respect to when the replacement takes places as opposed to when the initial data transaction request that is being replaced was received. Such functionality may be different than, for example, a partial cancelation where the timestamp of the order that is partially cancelled is not changed (e.g., the timestamp of the original order is not updated when the partial cancelation is processed).

In some examples, replacement may be include changing the type of routing strategy or the like or other property of the originally received data transaction request. Other properties that may be changed may include a listed or hidden match value, a hidden or listed quantity value, and other properties of a previously processed data transaction request.

In any event, the replacement processing shown in FIGS. 12A-12B begins with a replace request at 1202 that is received after an initially submitted request has been processed as described in connection with 220-264 of FIGS. 2A-2B. The replace request that is communicated at 1202 may include one or more (e.g., a plurality data values) that indicate what fields of the data transaction request identified by the modify are to be changed. This may include, for example, the current client identifier (e.g., for the current data transaction request that will be replaced), a new client identifier (e.g., for the new data transaction request), quantity, price, type of order, and other attributes for an order. In some examples, the replace request may be an OUCH Replace Order Request that includes the fields that are to be modified.

The Replace Request transmitted by the client system 114 is received by the Order Port 130 that performs processing on the request. For example, the Order Port 130 may determine what parent request is associated with the Replace Request by looking up (e.g., from data store 140B) the internal identifier (e.g., the ParentID or other identifier) that is associated with the provided currently client identifier that is included in the Replace Request message communicated form the client system 114.

At 1204, the order port 130 generates and transmits a Parent Replace Request Command. This command may include a parameter that indicates the full quantity of the identified parent request (e.g., the ParentID included in the command) is to be replaced. In some examples, the order port may include an identifier for the processing instance that is to be the new owner of the new parent request. In some examples, this aspect may also be handled by the routing module 154 (which may perform the same task as the order port 130 or may perform the task instead of the order port 130).

At 1206, the matching engine 102 receives the command and processes it. This processing may include determining if there is one or more away data transaction requests associated with the identified parent request (e.g., if the total quantity of away routed shares is greater than 0). If the total quantity is greater than zero, then the matching engine 102 sequences a Parent Replace Request message at 1208 (which may include the identifier associated with the parent request) that is communicated to other components of system 100 using the sequenced message bus 111A. The Parent Replace Request may be used to inform other processing instances of system 100 that a parent replace action is currently underway (e.g., has been requested), however there are additional tasks (e.g., handling any away data transaction requests) to complete before the parent replace is to be handled/completed by the matching engine 102.

In some examples, the parent request data structure (stored in data store 126 of matching engine 102) for the indicated parent request may be updated to indicate that a replace of this parent request is pending, requested, or the like.

Note that in some examples, if there are no away routed data transaction requests associated with the indicated parent request (e.g., the away routed shares count is zero), then the matching engine 102 may immediately operate on the parent replace request by, for example, canceling any child data transaction request that are associated with indicated parent request and then sequencing (e.g., atomically) a parent replace message (e.g., as communicated at 1236).

Returning to FIG. 12A, the Parent Replace Request Message is communicated using the sequence message bus 111A. In some examples, the communication of the Parent Replace Request Message may be processed by the order port 130 that causes the generation and transmission of a Pending Replace message at 1210 that is communicated to client system 114. Note that other similar "pending" messages may also be communicated to client system 114 for cancelations/modifications and other processing performed by system 100. This message may be used to indicate to the client system 114 that the replace is currently being processed by system 100. The communication of a message at 1210 may be advantageous in certain situations as the sequence of processes used in handling a replace request may be lengthy (as discussed below). Accordingly, the pending replace message may be used to notify a client system that the replace operation is in progress and to await further notification (as provided in connection with 1238). The pending replace message may also be used to indirectly (or directly) notify the client system 114 that the original request (e.g., associated with operations performed at 220-264) resulted in an away data transaction request being used (and thus processing the replace request may take longer than otherwise). In some examples, how the earlier request was handled may be opaque to the client system 114. In some examples, no message is communicated to the client system 114. In such circumstances, the replace message at 1238 may be the first message that is received from system 100 as to the status of the replace request from 1202.

At 1212 the Parent Replace Request Message is received by the routing module 154. As with other messages communicated using the sequenced message bus 111A, the processing instance (the routing module 154 in this case) may recognize or process the message (from all other messages being communicated using the sequence message bus) due to the parentID that is included in the communicated message (in this example the Parent Replace Request Message) being matched against the identifiers stored in data store 140D for those parent requests for which the routing module 154 is the owner. Note that in some examples, the type of processing instance that is to operate on the message will be identified as a parameter within the message. In some examples, the type of message may also be used to determine when a given processing instance will process a message.

The processing performed at 1212 by the routing module will determine how the parent replace request will be processed. This may include sending, for each away routing data transaction request, a Gateway Cancel Request Command to the matching engine 102 at 1214. Note that in some examples, only one such command may be sent as there is only one away data transaction request. The Gateway Cancel Request Command may include the gateway that is responsible for the away data transaction request and the orderID that identifies that request.

At 1216, the matching engine 102 receives the Gateway Cancel Request Command and sequences it out to the sequenced message bus. The next steps in the processing may be the same or similar to the full cancelation that is shown in FIGS. 5A-5B (e.g., from 514 onwards). Specifically, the routing gateway 152 that is identified in the Gateway Cancel Message from 1216 will process that message by generating and transmitting a Cancel Request at 1218 to the routing subsystem 160. The routing subsystem 160 will then communicate with the Destination System 202 to carry out cancelation of the away data transaction request at 1220. The acknowledgement of the cancelation is then communicated back to the routing gateway 152 from routing subsystem 160 via a Cancel Message at 1222.

Continuing on in FIG. 12B, the Cancelation Message is processed by the routing gateway 152. This causes the Routing Gateway to generate and transmit, at 1224, a Gateway Out Command to the matching engine 102.

At 1226, the matching engine 102 receives the Gateway Out Command and then updates the away routed quantity that is associated with the parent request that is stored in the parent request data structure. In some examples, if that is the only or last away routed data transaction request for this parent request, then the away quantity may be reduced to 0.

At 1228, the matching engine 102 transmits the result of sequencing the gateway out command by transmitting a Gateway Out Message. This message may include the parent ID that is associated with the now canceled away data transaction request, the routing gateway that has been outed, and/or information of the away data transaction request that has now been canceled. This message may also be picked up by the routing gateway 152 that may then perform cleanup processing for the message that has now been processed by the matching engine 102.

As noted above, when processing is performed at 1212, the routing module 154 may place the indicated parent request into a pending state that is pending for the one or more requested gateway requests communicated at 1214. When the Gateway Out Message is received, the routing module 154 may update the state of the parent request associated with the message (e.g., as stored in data store 140D). If the routing module 154 determines that there are no more pending gateway requests to be processed, then the routing module 154 generates and transmits a Parent Restate Command at 1232. Alternatively, if only 1 message is ever sent at 1214 (e.g., there is only ever one away data transaction request for a given parent), then the routing module may recognize the message as an indication that the single away data transaction has been canceled and continue performing processing for the replacement that has been requested by the client system 114.

In some examples, processing performed at 1230 may include determining which other processing instance 150 is to be owner of the new parent request (e.g., based on the properties included in the original parent replace message from 1208). Note that in some examples, the new owner may be "none." This may indicate that existing parent request is to be replaced with a new native data transaction request. In some examples, the routing module 154 will also be the owner of the new parent request. For example, if the routing strategy or other property is being changed.

At 1232, the routing module 154 generates and transmits a Parent Restate Command. This command may include an identifier for the processing instance 150 that is to be the owner of the new parent request (or none as discussed above).

At 1234, the matching engine 102 receives the Parent Restate Command and performs parent cancel processing. Note that the matching engine 102 checks (similar to 1206) if there are any away data transaction requests associated with the parent request. In this case, there are no away data transaction requests (as they have now been canceled as described above), and the matching engine 102 performs parent request cancelation processing and new parent processing to handle the parent replace command. This may include: 1) generating a new parent identifier; 2) canceling the old parent request; 3) canceling any child data transactions of the old parent request; and/or 4) sending messages associated with each or any of these actions—including updated Parent State messages (e.g., to out the old parent request). All of these actions may be performed atomically by the matching engine 102.

As part of the Parent Replace Processing, at 1236, the matching engine 102 generates and transmits a Parent Replace message that includes the identifier of the old parent request, the newly generated identifier for the new parent request, and/or an identifier to indicate which processing instance is the owner of this new parent request. In the example shown in FIG. 12B, the new owner is also the routing module 154.

At 1238, the order port receives and processes the Parent Replace message by generating and transmitting a Replace message back to the client system 114. This message is used to confirm to the client that system 100 has now carried out the original replace request from 1202.

At 1240 the routing module 154, identifies that it is responsible for this new parent request and performs processing similar to that from 232 onwards in FIGS. 2A and 2B. In other words, the routing module may again request the use of a gateway for handling an away data transaction request.

The processing shown in FIGS. 12A-12B thus shows how, in some examples, a replace request can be handled by a first system—even when some or all of an original request has been distributed for processing to other systems, such as destination system 202.

In alternative implementations a replace request may not result in cancelation of the away request. This may occur when, for example, the replace request increases the quantity that is associated with the original parent request. In this type of implementation, the routing module may determine or issue a new away (or native) data transaction request to provide for the additional quantity that has been requested.

In such an implementation, two different data transaction requests (which may both be away data transactions or one being a native child request and the other being the away data transaction request) may be associated with or children of the parent request.

Description of FIG. 13

FIG. 13 is a block diagram of an example computing device 1300 (which may also be referred to, for example, as a "computing device," "computer system," or "computing system") according to some embodiments. In some embodiments, the computing device 1300 includes one or more of the following: one or more processors 1302 (which may be referred to as "hardware processors" or individually as a "hardware processor"); one or more memory devices 1304; one or more network interface devices 1306; one or more display interfaces 1308; and one or more user input adapters 1310. Additionally, in some embodiments, the computing device 1300 is connected to or includes a display device 1312. As will explained below, these elements (e.g., the processors 1302, memory devices 1304, network interface devices 1306, display interfaces 1308, user input adapters 1310, display device 1312) are hardware devices (for example, electronic circuits or combinations of circuits) that are configured to perform various different functions for the computing device 1300. In some embodiments, these components of the computing device 1300 may be collectively referred to as computing resources (e.g., resources that are used to carry out execution of instructions and include the processors (one or more processors 1302), storage (one or more memory devices 1304), and 1/O (network interface devices 1306, one or more display interfaces 1308, and one or more user input adapters 1310). In some instances, the term processing resources may be used interchangeably with the term computing resources. In some embodiments, multiple instances of computing device 1300 may arranged into a distributed computing system.

In some embodiments, each or any of the processors 1302 is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 1302 uses an instruction set architecture such as x86 or Advanced RISC Machine (ARM).

In some embodiments, each or any of the memory devices 1304 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 1302). Memory devices 1304 are examples of non-transitory computer-readable storage media.

In some examples, memory devices 1504 that are located within the computing device 1500 may be called "local memory" and distinguished from "external memory" in that access to local memory for a given process that is executing does not require communicating with another computing device via network interface devices 1506. Local memory can include, for example, memory devices 1304, which are accessible on the computing device 1300 that is hosting or otherwise executing the given process.

In some embodiments, each or any of the network interface devices 1306 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), LTE Pro, Fifth Generation New Radio (5G NR) and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, data is communicated to/from different destinations/origins using an electronic data network (which may also be referred to, for example, as a "data plane," "data bus," "bus," or similar terminology). In some embodiments, communication via an electronic data network includes communication of data from one computer process space to another computer process space. In some examples, an electronic data network may use, for example, inter-process communication, pipes, sockets, and/or the like. In some embodiments, an electronic data network may be implemented using one or more physical/electrical links (e.g., corresponding to technologies that relate to the Physical Layer of the OSI model). Examples of different physical layer technologies that may be used in connection with certain example implementations of an electronic data network include direct cable, cross-connect cables, fiber channel, and other wired and/or wireless technologies. In certain examples, network interface devices 1306 may include ports or other connections that enable such connections to be made via an electronic data network and communicate data (e.g., electronically or otherwise) among the various components of a distributed computing system using the example electronic data network.

In some embodiments, each or any of the display interfaces 1308 is or includes one or more circuits that receive data from the processors 1302, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device 1312, which displays the image data. Alternatively or additionally, in some embodiments, each or any of the display interfaces 1308 is or includes, for example, a video card, video adapter, or graphics processing unit (GPU).

In some embodiments, each or any of the user input adapters 1310 is or includes one or more circuits that receive and process user input data from one or more user input devices (not shown in FIG. 13) that are included in, attached to, or otherwise in communication with the computing device 1300, and that output data based on the received input data to the processors 1302. Alternatively or additionally, in some embodiments each or any of the user input adapters 1310 is or includes, for example, a PS/2 interface, a USB interface, a touchscreen controller, or the like; and/or the user input adapters 1310 facilitates input from user input devices (not shown in FIG. 13) such as, for example, a keyboard, mouse, trackpad, touchscreen, etc.

In some embodiments, the display device 1312 may be a Liquid Crystal Display (LCD) display, Light Emitting Diode (LED) display, or other type of display device. In embodiments where the display device 1312 is a component of the computing device 1300 (e.g., the computing device and the display device are included in a unified housing), the display device 1312 may be a touchscreen display or non-touchscreen display. In embodiments where the display device 1312 is connected to the computing device 1300 (e.g., is external to the computing device 1300 and communicates with the computing device 1300 via a wire and/or via wireless communication technology), the display device 1312 is, for example, an external monitor, projector, television, display screen, etc.

In various embodiments, the computing device 1300 includes one, or two, or three, four, or more of each or any of the above-mentioned elements (e.g., the processors 1302, memory devices 1304, network interface devices 1306, display interfaces 1308, and user input adapters 1310). Alternatively or additionally, in some embodiments, the computing device 1300 includes one or more of: a processing system that includes the processors 1302; a memory or storage system that includes the memory devices 1304; and a network interface system that includes the network interface devices 1306. Alternatively, or additionally, in some embodiments, the computing device 1300 includes a system-on-a-chip (SoC) or multiple SoCs, and each or any of the above-mentioned elements (or various combinations or subsets thereof) is included in the single SoC or distributed across the multiple SoCs in various combinations. For example, the single SoC (or the multiple SoCs) may include the processors 1302 and the network interface devices 1306; or the single SoC (or the multiple SoCs) may include the processors 1302, the network interface devices 1306, and the memory devices 1304; and so on. The computing device 1300 may be arranged in some embodiments such that: the processors 1302 include a multi or single-core processor; the network interface devices 1306 include a first network interface device (which implements, for example, WiFi, Bluetooth, NFC, etc.) and a second network interface device that implements one or more cellular communication technologies (e.g., 3G, 4G LTE, CDMA, etc.); the memory devices 1304 include RAM, flash memory, or a hard disk. As another example, the computing device 1300 may be arranged such that: the processors 1302 include two, three, four, five, or more multi-core processors; the network interface devices 1306 include a first network interface device that implements Ethernet and a second network interface device that implements WiFi and/or Bluetooth; and the memory devices 1304 include a RAM and a flash memory or hard disk.

As previously noted, whenever it is described in this document that a software module or software process performs any action, the action is in actuality performed by underlying hardware elements according to the instructions that comprise the software module. Consistent with the foregoing, in various embodiments, each or any combination of the matching engine 102, sequencer module 120, matcher module 122, processing instances 150 (including order ports 130, routing gateways 152, and routing module 154), rash engine/sequencer 162, router 164, client system 114, routing subsystem 160, order books 124, data store 126, routing module 194, routing gateways 192, and data stores of any of the processing instances 150, each of which will be referred to individually for clarity as a "component" for the remainder of this paragraph, are implemented using an example of the computing device 1300 of FIG. 13. In such embodiments, the following applies for each component: (a) the elements of the 1300 computing device 1300 shown in FIG. 13 (i.e., the one or more processors 1302, one or more memory devices 1304, one or more network interface devices 1306, one or more display interfaces 1308, and one or more user input adapters 1310), or appropriate combinations or subsets of the foregoing) are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some embodiments, such software modules (as well as any data described herein as handled and/or used by the software modules) are stored in the memory devices 1304 (e.g., in various embodiments, in a volatile memory device such as a RAM or an instruction register and/or in a non-volatile memory device such as a flash memory or hard disk) and all actions described herein as performed by the software modules are performed by the processors 1302 in conjunction with, as appropriate, the other elements in and/or connected to the computing device 1300 (i.e., the network interface devices 1306, display interfaces 1308, user input adapters 1310, and/or display device 1312); (c) alternatively or additionally, to the extent it is described herein that the component processes and/or otherwise handles data, in some embodiments, such data is stored in the memory devices 1304 (e.g., in some embodiments, in a volatile memory device such as a RAM and/or in a non-volatile memory device such as a flash memory or hard disk) and/or is processed/handled by the processors 1302 in conjunction, as appropriate, the other elements in and/or connected to the computing device 1300 (i.e., the network interface devices 1306, display interfaces 1308, user input adapters 1310, and/or display device 1312); (d) alternatively or additionally, in some embodiments, the memory devices 1302 store instructions that, when executed by the processors 1302, cause the processors 1302 to perform, in conjunction with, as appropriate, the other elements in and/or connected to the computing device 1300 (i.e., the memory devices 1304, network interface devices 1306, display interfaces 1308, user input adapters 1310, and/or display device 1312), each or any combination of actions described herein as performed by the component and/or by any software modules described herein as included within the component.

Consistent with the preceding paragraph, as one example, in an embodiment where plurality instances of the computing device 1300 are used to provide a distributed computing system, memory devices 1304 of one or more of the instances may store a dual-sided data structure (e.g., an order book) and parent request data structure. Different processors 1302 of different instances may execute different ones of processing instances 150 (such as routing module and routing gateways shown in FIG. 1A) and the matching engine 102 of system 100. The processing instances/matching engine mentioned in the preceding sentence may communicate via respective network interface devices 1506. Different processors 1302 of different instances may also be used to execute the routing subsystem 160 and the components thereof.

The hardware configurations shown in FIG. 13 and described above are provided as examples, and the subject matter described herein may be utilized in conjunction with a variety of different hardware architectures and elements.

For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 13, (e) via other hardware arrangements, architectures, and configurations, and/or via combinations of the technology described in (a) through (e).

Technical Advantages of Described Subject Matter

The following paragraphs describe technical advantages that may be realized in accordance with various embodiments discussed herein.

In some embodiments, a distributed computing system is provided that executes multiple different processing instances across different computing nodes of the distributed system. In the distributed computing system, communication between a matching engine and other processing instances is performed using a command bus (to provide commands to the matching engine) and a sequenced message bus (that provides messages from the matching engine). This implementation (e.g., the use of the command bus and sequenced message bus) allows processing instances (e.g., the routing gateways 152 and routing module 154) to directly respond to and act upon sequenced messages (e.g., provided from the matching engine 102) provided via the sequenced message bus and/or without relying on other intermediary systems or processes. This improvement has the effect of reducing latency in the distributed computing system and improving the overall efficiency in the distributed computing system. An example of this is shown in FIG. 4 where the routing module responds to the gateway out message 410 and determines what additional action should be taken without relying on external processes or systems for such determination. Another example of this is shown in FIG. 7 where the execution message at 718 is used by both the order port 130 and the routing module 154 to perform (e.g., concurrently) further processing.

In the architecture for the distributed computing system 100 described herein, processing instances are used to provide or facilitate routing functionality that is provided by the distributed computing system (this architecture is referred to below as the "described architecture"). The described architecture is different from prior architectures that had requests submitted first to a routing system or the like. One example of such a prior architecture is the architecture that is used for the Nasdaq Stock Market that involved the use of the external Routing and Special Handling (RASH) system. The described architecture achieves latency improvements (e.g., which may be significant) over prior architectures. In some illustrative examples, the described architecture allows for requests that are first received (e.g., those submitted by client systems) by the distributed computing system 100 to both be initially processed more quickly than before, while also handling (or facilitating the handling of) any routing requests in connection with the original request. For example, in the described architecture (e.g., as shown in FIGS. 6-8), a request that includes a routing property may initially be processed by the matching engine at a speed that is the same or similar to other requests that are not routed. Such a request may then also use the described architecture to facilitate the routing of request(s) to a routing subsystem and then onto other destination systems. In contrast, analogous processing in prior architectures would first require submission of a request to a router that would then decide how to route the request to one of multiple possible destinations. Accordingly, the described architecture results in latency improvements (e.g., by about an order of magnitude) over prior architectures in some examples—while also allowing for the flexibility of routing requests to other destination systems. It will be understood that different latency times may be achieved as a result of using different hardware (e.g., faster/slower processers, memory, network technology, etc.) in connection with implementing the described architecture and/or the prior architecture.

In addition to the per-operation latency improvements noted in the preceding paragraph for certain instances of handling requests, the described architecture provides for further, more-granular performance improvements. In some instances, processing instances perform processing in response to changes in the data within the distributed computing system's matching engine (e.g., the order book). Because processing instances (including the routing module and routing gateway(s)) of the described architecture are included within the distributed computing system itself (as opposed to being external to the distributed computing system), the processing instances receive information (e.g., via the sequenced message bus) regarding the changes to the order book more quickly than prior architectures. And as the processing instances can act on such changes more quickly, the total amount of time it takes for the distributed computing system on the whole to respond to a change (e.g., from a change in order book data) is decreased. This manifests as decreased latency and overall enhanced performance for the distributed computing system.

In some examples, implementing the functionality within the processing instances (e.g., the routing module and/or the routing gateway) described herein allows those processing instances to act upon and use data that would not otherwise be available. In particular, not all of the data communicated from the matching engine (or other sources in some examples) may be available to systems that are external to the distributed computer system. For example, not all of the data (e.g., messages communicated via the sequenced message bus) relating to changes or the status of the order book(s) or other messages processed by the matching engine may be provided to external systems. Such benefits may be realized in connection with data transaction requests that can potentially interact with both the order book of the matching engine within the distributed system, and also other destinations systems (e.g., as discussed in connection with FIGS. 6-9). In such cases, more accurate, detailed, and/or up-to-date data can be advantageous as it may be used to improve the responsiveness, accuracy, and/or efficiency of the functionality provided by, for example, the routing module that is part of the distributed computing system. This technical advantage of being able to use "better" data (e.g., than is available in connection with prior architectures) may be combined with the technical advantage of separating the processing load performed by the routing module and routing gateways away and separate from the matching engine.

In some embodiments, the distributed computing system allows processing in the matching engine to remain efficient while also allowing for more complex processing/behaviors for routing requests to be handled by processing instances that are distributed among other computing resources of the distributed system. With this type of implementation, the throughput of the matching engine of the distributed computing system may be relatively unaffected while at the same time the distributed computing system may offer processing of increased complexity via the different types of processing instances (e.g., the routing module/routing gateway(s)). In other words, the amount of time it takes the matching engine to process, for example, any of the Commands discussed herein, data transaction requests that do not include a routing property, and/or the amount of time to perform match processing for any received data transaction request may be relatively unaffected, while at the same time the increased complexity of handling data transaction requests that require routing may be supported by the distributed computing system of the described architecture. The processing performed by the routing module 154 as discussed in connection with the techniques herein are all examples of processing that is advantageously distributed away from the matching engine and a separate processing instances (e.g., the routing module 154) for processing. For example, the process of selecting a gateway (including the load balance determination) as discussed in connection with FIG. 2A-2B is distributed out from the matching engine. As another example and as shown in FIGS. 3-4 and 9, the processing for determining how to handle status changes in an away routed orders may be distributed from the matching engine (to the routing module 154). As a further example, and as shown in FIGS. 10-12B, the logic for handling changes that are requests from client computer systems may be distributed from the matching engine and to the routing module 154. By distributing the processing logic for each or any of these features to a processing instances (e.g., the routing module) as opposed to the matching engine 102, the overall system is caused to operate more efficiently (as noted above and in the succeeding paragraphs).

In some examples, separating the functionality of the processing instances from the matching engine provides for increased extensibility of the overall distributed computer system. This extensibility may be realized by providing (and allowing) further new or updated functionality for parent requests (e.g., in the processing instances) without modifying or impacting (e.g., significantly) how the matching engine operates and/or the performance of the matching engine 102 (e.g., the sequencer and/or the matcher). The functionality provided by the routing module 154 and the functionality provided by routing gateways 152 are examples of such extensibility that is realized by this architecture.

The described architecture also provides for technical advantages over other types of implementations that implement the functionality provided by the routing module, routing gateway, or routing subsystem within the matching engine (as opposed to in separate modules in the described architecture). A technical advantage over such other types of implementations relates to the amount of time (sometimes called book latency) it takes to process and/or book newly submitted orders (which includes both unmanaged/native and managed/native orders, including orders that have a routing property) by the matching engine. In the described architecture, the book latency for entering orders into the system is relatively similar (e.g., on average) to architectures that may only handle booking unmanaged orders. In contrast, book latency in other types of implementations that include the functionality for the processing instances discussed herein within the matching engine may adversely result in increased book latency. The increased book latency in such implementations may be due to the increased amount of code, or corresponding operations performed by such code, needed to run the matching engine. In other words, the increased complexity of such other implementations may adversely make the matching engine slower (e.g., cause a decrease in throughput) as the time from when a command is received by the matching engine to when it is processed and/or reported out via the sequenced bus may be increased. Increased latency of such other implementations may also be due to the time the matching engine must spend in determining how to book (and/or manage) any given order (due to the complexity in how such orders, as discussed herein, may be processed). For example, software code for handling how and/when to handle routing may need to be run frequently to keep orders that have those features up to date. The extra time it takes to book (or manage) such orders may then result in slowing down the time it takes to book other new orders that are communicated to the matching engine. Such orders may end up being queued up to wait until the matching engine finishes with the more complex processing associated with an order that has a routing property. Note that while it may take less time to fully process an order that is routed in such other types of implementations, that the overall performance of the system may be decreased. Such a decrease in performance may be reflected in an increase in book latency (e.g., on average). Such a result may be based on the matching engine handling millions or billions of requests per day. Thus, even small increases in latency on a per order basis can add up to slowing down the overall throughput of the system (e.g., increasing book latency) and decreasing performance. Such technical problems may be at least partly addressed through use of the described architecture as the complex processing associated with requests that are routed to other destinations is moved to a separate processing instance that may be executed on other computing resources of the distributed system. Thus, for example, the code or processing logic for determining how to select a routing gateway (e.g., 232 in FIG. 2A) may be distributed away from the matching engine.

Another technical advantage of the described architecture over systems that implement the functionality of one or more (or all) of the processing instances (e.g., the routing module 154) within the matching engine may be that the described architecture decreases the complexity of the code base for the matching engine. This then advantageously results in making the software code for the matching engine (and also other processing instances) more manageable to maintain, test, and/or use. For example, code related to performing routing functionality may be separate and distinct from the code that is used to operate the matching engine 102.

Another technical advantage of the described architecture is that certain existing messages, commands, code bases, and the like may be leveraged to provide the functionality described herein. For example, orders that are included into the order book may be treated the same by the matching engine (for purpose of matching and the like) regardless of whether such orders are unmanaged/native orders or managed/native orders. This technical improvement is illustrated by the features shown in, for example, FIGS. 6-8. Another example is that certain functionality of how parent requests are handled can be leveraged to provide the described functionality for routing and messages/requests (e.g., modifications, cancelations, executions, etc.).

In some embodiments, the matching engine may perform two or more operations or tasks in an atomic manner. For example, deleting data for a parent request and deleting data for all child orders may be performed in an atomic manner (e.g., which may be a technical implementation used for cancelation requests). These tasks may be performed atomically by the matching engine to ensure that commands communicated to the matching engine are acted upon promptly. This type of implementation may be a technical advantage over other types of implementations where, for example, such tasks are not executed in an atomic manner. Atomic execution (performing operations atomically as discussed herein) of such tasks ensures that no other commands are processed by the matching engine between the parent and child cancelations. In addition to providing determinism in the described architecture, performing certain multiple operations atomically may result in more efficient operation of the system. This is because the matching engine may perform multiple operations in response to a single command without having to wait for individual commands for each one of the operations (e.g., a separate cancel child command for each child of a parent request). Accordingly, performing certain multiple operations atomically may also improve the overall efficiency of the system. The use of such atomic processing is shown in, for example, FIGS. 8, 10B, and 11B that illustrate the multiple different sequenced messages being communicated by the matching engine during such atomic processing. Such advantageous atomic operations may be performed in connection with processing of cancelation commands and others.

In some embodiments, the described architecture may store selective data within the matching engine to allow for (relatively) quick determination of how to handle a given Command. An example of this is the inclusion of an away routed quantity value within the parent request data structure of the matching engine. This value can be used by the matching engine to quickly determine (e.g., without relying on another processing instance) when a given parent request has any away routed data transaction requests. If there are none, then the matching engine may immediately act upon, for example, a cancelation request or the like. However, if an away data transaction request is associated with a parent request, then the matching engine may notify (via the sequenced message bus) the matching module of such, which may then determine how the away data transaction request should be handled. The additional functionality (which may complex) of handling such away requests may thus be offloaded to routing module, while also maintaining the flexibility of allowing the matching engine the immediately act upon a request/command.

Additional technical advantages embodied in the subject matter of this specification beyond those outlined above may be apparent to the skilled person.

Selected Terminology

The elements described in this document include actions, features, components, items, attributes, and other terms. Whenever it is described in this document that a given element is present in "some embodiments," "various embodiments," "certain embodiments," "certain example embodiments, "some example embodiments," "an exemplary embodiment," "an example," "an instance," "an example instance," or whenever any other similar language is used, it should be understood that the given element is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments.

Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an", and "the" should be read as meaning "at least one," "one or more," or the like; the term "example", which may be used interchangeably with the term embodiment, is used to provide examples of the subject matter under discussion, not an exhaustive or limiting list thereof; the terms "comprise" and "include" (and other conjugations and other variations thereof) specify the presence of the associated listed elements but do not preclude the presence or addition of one or more other elements; and if an element is described as "optional," such description should not be understood to indicate that other elements, not so described, are required.

As used herein, the term "non-transitory computer-readable storage medium" includes a register, a cache memory, a ROM, a semiconductor memory device (such as D-RAM, S-RAM, or other RAM), a magnetic medium such as a flash memory, a hard disk, a magneto-optical medium, an optical medium such as a CD-ROM, a DVD, or Blu-Ray Disc, or other types of volatile or non-volatile storage devices for non-transitory electronic data storage. The term "non-transitory computer-readable storage medium" does not include a transitory, propagating electromagnetic signal.

The claims are not intended to invoke means-plus-function construction/interpretation unless they expressly use the phrase "means for" or "step for." Claim elements intended to be construed/interpreted as means-plus-function language, if any, will expressly manifest that intention by reciting the phrase "means for" or "step for"; the foregoing applies to claim elements in all types of claims (method claims, apparatus claims, or claims of other types) and, for the avoidance of doubt, also applies to claim elements that are nested within method claims. Consistent with the preceding sentence, no claim element (in any claim of any type) should be construed/interpreted using means plus function construction/interpretation unless the claim element is expressly recited using the phrase "means for" or "step for."

Whenever it is stated herein that a hardware element (e.g., a processor, a network interface, a display interface, a user input adapter, a memory device, or other hardware element), or combination of hardware elements, is "configured to" perform some action, it should be understood that such language specifies a physical state of configuration of the hardware element(s) and not mere intended use or capability of the hardware element(s). The physical state of configuration of the hardware elements(s) fundamentally ties the action(s) recited following the "configured to" phrase to the physical characteristics of the hardware element(s) recited before the "configured to" phrase. In some embodiments, the physical state of configuration of the hardware elements may be realized as an application specific integrated circuit (ASIC) that includes one or more electronic circuits arranged to perform the action, or a field programmable gate array (FPGA) that includes programmable electronic logic circuits that are arranged in series or parallel to perform the action in accordance with one or more instructions (e.g., via a configuration file for the FPGA). In some embodiments, the physical state of configuration of the hardware element may be specified through storing (e.g., in a memory device) program code (e.g., instructions in the form of firmware, software, etc.) that, when executed by a hardware processor, causes the hardware elements (e.g., by configuration of registers, memory, etc.) to perform the actions in accordance with the program code.

A hardware element (or elements) can therefore be understood to be configured to perform an action even when the specified hardware element(s) is/are not currently performing the action or is not operational (e.g., is not on, powered, being used, or the like). Consistent with the preceding, the phrase "configured to" in claims should not be construed/interpreted, in any claim type (method claims, apparatus claims, or claims of other types), as being a means plus function; this includes claim elements (such as hardware elements) that are nested in method claims.

ADDITIONAL APPLICATIONS OF DESCRIBED SUBJECT MATTER

Although examples are provided herein with respect to the trading of equities (i.e., equity securities/stock), the technology described herein may also be used, mutatis mutandis, with any type of asset, including but not limited to other types of financial instruments (e.g., bonds, options, futures), currencies, cryptocurrencies, and/or non-financial assets. Further, although examples are provided herein with respect to electronic trading platforms, the technology described herein may also be used, mutatis mutandis, with other types of distributed computing systems, including but not limited to telecommunication networks, payment processing systems, industrial control systems, parallel scientific computation systems, smart contract systems, transaction processing systems, distributed databases, and/or other types of distributed systems.

Although process steps, algorithms or the like, including without limitation with reference to FIGS. 2A-12B, may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, element, component, or step in this document is intended to be dedicated to the public.

The invention claimed is:

1. A distributed computer system that is configured to communicate with a routing computer system that routes away data transaction requests to different destination computer systems, the distributed computer system comprising:
   a plurality of computing devices that communicate by using an electronic data network, each of the plurality of computing devices including at least one hardware processor;
   wherein the plurality of computing devices is configured to execute, across different ones of the plurality of computing devices:
      a plurality of processing instances including at least a first processing instance; and
      a matching engine;
   wherein the matching engine is configured to perform first operations comprising:
      accessing a parent request data structure in local memory;
      maintaining a dual-sided data structure, with each side of the data structure containing at least one pending data transaction request;
      processing a command for a new parent request that is based on a message communicated from a client computer system; and
      generating a parent identifier for the new parent request and transmitting a sequenced data message that includes the parent identifier;
   wherein the first processing instance is configured to perform second operations comprising:
      receiving the sequenced data message;
      based on contents of the sequenced data message, transmitting, to the matching engine, a request for a new child data transaction request to be processed by the matching engine;
   the first operations further comprising:
      based on reception of the request, generating the new child data transaction request;
      performing match processing for the new child data transaction request against pending data transaction requests of the dual-sided data structure;
      based on results of the matching processing, transmitting a result message that includes data based on performing the match process for the new child data transaction request; and
   the second operations further comprising:
      processing the result message and based on the data included in the result message, transmitting a request to send an away data transaction request to the routing computer system for routing to a destination computer system.

2. The distributed computer system of claim 1, wherein the request to send the away data transaction request to the routing computer system is communicated from the first processing instance to the matching engine.

3. The distributed computer system of claim 1, wherein the new child data transaction request includes an immediate or cancel property.

4. The distributed computer system of claim 1, the second operations further comprising:
   based on receiving a result message from the matching engine that indicates full execution of a data transaction request associated with another parent request for which the first processing instance is an owner, transmitting a parent cancel command to the matching engine for the other parent request.

5. The distributed computer system of claim 1, wherein the away data transaction request includes a quality value that is equal to a quantity specified in the message communicated from the client computer system.

6. The distributed computer system of claim 1, wherein the away data transaction request is for less than a quantity specified in the message communicated from the client computer system.

7. The distributed computer system of claim 1, wherein the performed match processing identifies a match between the new child data transaction request and a pending data transaction request.

8. The distributed computer system of claim 7, wherein the match for a quantity that is less than a requested quantity specified in the message communicated from the client computer system.

9. The distributed computer system of claim 8, wherein a quantity value of the away data transaction request is for a difference between the quantity that is less than a requested quantity and the requested quantity.

10. The distributed computer system of claim 1, wherein the performed match processing does not identify a match for the new child data transaction request.

11. The distributed computer system of claim 10, wherein a quantity value of the away data transaction request is for a requested quantity that was specified in the message communicated from the client computer system.

12. The distributed computer system of claim 1, wherein the first operations further comprise:
   updating, based on sending of the away data transaction request to the routing computer system, an away routed quantity property in the parent request data structure for the parent request.

13. A method implemented in a distributed computing system that includes a plurality of computing devices that communicate by using an electronic data network, each of the plurality of computing devices including at least one hardware processor, the distributed computing system configured to communicate with a routing computer system that routes away data transaction requests to different destination computer systems, the method comprising:
   executing a matching engine on at least a first computing device of the plurality of computing devices;
   executing, across different ones of the plurality of computing devices, a plurality of processing instances including at least a first processing instance;
   at the matching engine:
      accessing a parent request data structure in local memory;
      maintaining a dual-sided data structure, with each side of the data structure containing at least one pending data transaction request;
      processing a command for a new parent request that is based on a message communicated from a client computer system; and
      generating a parent identifier for the new parent request and transmitting a sequenced data message that includes the parent identifier;
   at the first processing instance:
      receiving the sequenced data message;
      based on contents of the sequenced data message, transmitting, to the matching engine, a request for a new child data transaction request to be processed by the matching engine;
   at the matching engine:
      based on reception of the request, generating the new child data transaction request;

performing match processing for the new child data transaction request against pending data transaction requests of the dual-sided data structure;

based on results of the matching processing, transmitting a result message that includes data based on performing the match process for the new child data transaction request; and at the first processing instance:

processing the result message and based on the data included in the result message, transmitting a request to send an away data transaction request to the routing computer system for routing to a destination computer system.

14. The method of claim 13, wherein the request to send the away data transaction request to the routing computer system is communicated from the first processing instance to the matching engine.

15. The method of claim 13, wherein the new child data transaction request includes an immediate or cancel property.

16. The method of claim 13, the method further comprising:

at the first processing instance:

based on receiving a result message from the matching engine that indicates full execution of a data transaction request associated with another parent request for which the first processing instance is an owner, transmitting a parent cancel command to the matching engine for the other parent request.

17. The method of claim 13, wherein the away data transaction request includes a quality value that is equal to a quantity specified in the message communicated from the client computer system.

18. The method of claim 13, wherein the away data transaction request is for less than a quantity specified in the message communicated from the client computer system.

19. The method of claim 13, wherein the performed match processing identifies a match between the new child data transaction request and a pending data transaction request.

20. A non-transitory computer readable storage medium storing instructions for use with a distributed computing system, the distributed computing system including a plurality of computing devices that communicate by using an electronic data network, each of the plurality of computing devices including at least one hardware processor, the distributed computing system configured to communicate with a routing computer system that routes away data transaction requests to different destination computer systems, the stored instructions comprising instructions that are configured to cause at least one hardware processor to perform operations comprising:

executing a matching engine on at least a first computing device of the plurality of computing devices;

executing, across different ones of the plurality of computing devices, a plurality of processing instances including at least a first processing instance;

at the matching engine:

accessing a parent request data structure in local memory;

maintaining a dual-sided data structure, with each side of the data structure containing at least one pending data transaction request;

processing a command for a new parent request that is based on a message communicated from a client computer system; and generating a parent identifier for the new parent request and transmitting a sequenced data message that includes the parent identifier;

at the first processing instance:

receiving the sequenced data message;

based on contents of the sequenced data message, transmitting, to the matching engine, a request for a new child data transaction request to be processed by the matching engine;

at the matching engine:

based on reception of the request, generating the new child data transaction request;

performing match processing for the new child data transaction request against pending data transaction requests of the dual-sided data structure;

based on results of the matching processing, transmitting a result message that includes data based on performing the match process for the new child data transaction request; and at the first processing instance, processing the result message and based on the data included in the result message, transmitting a request to send an away data transaction request to the routing computer system for routing to a destination computer system.

* * * * *